United States Patent
Katsuno et al.

(10) Patent No.: US 9,598,567 B2
(45) Date of Patent: Mar. 21, 2017

(54) PROPYLENE-ETHYLENE COPOLYMER RESIN COMPOSITION AND MOULDED ARTICLE, FILM AND SHEET THEREOF

(71) Applicant: JAPAN POLYPROPYLENE CORPORATION, Chiyoda-ku (JP)

(72) Inventors: Satoshi Katsuno, Mie (JP); Motokazu Terada, Mie (JP); Masato Takayama, Mie (JP)

(73) Assignee: JAPAN POLYPROPYLENE CORPORATION, Chiyoda-ku (JP)

( * ) Notice: Subject to any disclaimer, the term of this patent is extended or adjusted under 35 U.S.C. 154(b) by 0 days.

(21) Appl. No.: 15/064,625

(22) Filed: Mar. 9, 2016

(65) Prior Publication Data

US 2016/0185945 A1 Jun. 30, 2016

Related U.S. Application Data

(62) Division of application No. 14/379,194, filed as application No. PCT/JP2013/054469 on Feb. 22, 2013, now Pat. No. 9,328,232.

(30) Foreign Application Priority Data

Feb. 24, 2012 (JP) .................................. 2012-038099
Apr. 25, 2012 (JP) .................................. 2012-099402
Nov. 27, 2012 (JP) .................................. 2012-258605

(51) Int. Cl.

| | |
|---|---|
| *C08L 23/14* | (2006.01) |
| *C08F 10/06* | (2006.01) |
| *C08J 5/18* | (2006.01) |
| *C08L 23/12* | (2006.01) |
| *C08L 53/00* | (2006.01) |
| *C08L 23/10* | (2006.01) |
| *B32B 27/08* | (2006.01) |
| *B32B 27/32* | (2006.01) |
| *C08F 4/659* | (2006.01) |

(52) U.S. Cl.
CPC .............. *C08L 23/14* (2013.01); *B32B 27/08* (2013.01); *B32B 27/32* (2013.01); *B32B 27/327* (2013.01); *C08F 10/06* (2013.01); *C08J 5/18* (2013.01); *C08L 23/10* (2013.01); *C08L 23/12* (2013.01); *C08L 53/00* (2013.01); *B32B 2307/412* (2013.01); *B32B 2307/518* (2013.01); *B32B 2439/70* (2013.01); *B32B 2553/00* (2013.01); *C08F 4/65916* (2013.01); *C08J 2323/10* (2013.01); *C08J 2323/12* (2013.01); *C08J 2323/14* (2013.01); *C08J 2423/14* (2013.01); *C08L 23/142* (2013.01); *C08L 2201/10* (2013.01); *C08L 2203/16* (2013.01); *C08L 2203/162* (2013.01); *C08L 2205/02* (2013.01); *C08L 2205/025* (2013.01); *C08L 2314/02* (2013.01); *C08L 2314/06* (2013.01)

(58) Field of Classification Search
CPC .... C08L 23/14; C08L 23/08; C08L 2205/025; C08L 2205/03; C08L 2314/06
See application file for complete search history.

(56) References Cited

U.S. PATENT DOCUMENTS

| | | | |
|---|---|---|---|
| 5,331,054 A | 7/1994 | Fujita et al. | |
| 7,662,888 B2 | 2/2010 | Kanai et al. | |
| 8,399,079 B2 | 3/2013 | Rosell-Uriz et al. | |
| 2006/0246308 A1 | 11/2006 | Kanai et al. | |
| 2008/0161474 A1 | 7/2008 | Shimouse et al. | |
| 2009/0118414 A1 | 5/2009 | Kitade et al. | |
| 2009/0317615 A1 | 12/2009 | Itakura et al. | |
| 2011/0127696 A1 | 6/2011 | Shimouse et al. | |
| 2011/0311742 A1 | 12/2011 | Kadowaki et al. | |
| 2015/0004394 A1* | 1/2015 | Hotta et al. ............... | B32B 5/18 428/319.7 |

FOREIGN PATENT DOCUMENTS

| | | |
|---|---|---|
| EP | 1 939 251 A1 | 7/2008 |
| JP | 04-110308 A | 4/1992 |
| JP | 05-112683 A | 5/1993 |
| JP | 10-338705 A | 12/1998 |
| JP | 11-060842 A | 3/1999 |
| JP | 11-292944 A | 10/1999 |
| JP | 11-302470 A | 11/1999 |
| JP | 2000-136274 A | 5/2000 |
| JP | 10-338704 A | 3/2001 |
| JP | 2001-064314 A | 3/2001 |
| JP | 2001-226497 A | 8/2001 |
| JP | 2001-253913 A | 9/2001 |
| JP | 2001-253922 A | 9/2001 |
| JP | 2001-288220 A | 10/2001 |

(Continued)

OTHER PUBLICATIONS

Notification of Reasons for Refusal issued May 24, 2016 in Japanese Patent Application No. 2013-032778 (with English language translation).

International Search Report issued May 28, 2013 in PCT/JP2013/054469 filed Feb. 22, 2013.

Kenkichi Murakami. "Extrusion Moulding," Plastics Age K.K., 7th Edition, 1989, p. 82-83, 106.

Combined Chinese Office Action and Search Report issued Sep. 17, 2015 in Patent Application No. 201380010727.1 (with English Translation and English Translation of Categories of Cited Documents).

(Continued)

*Primary Examiner* — Nathan M Nutter
(74) *Attorney, Agent, or Firm* — Oblon, McClelland, Maier & Neustadt, L.L.P.

(57) ABSTRACT

A propylene-ethylene copolymer resin composition including: 97 to 65 parts by weight of a propylene-ethylene copolymer (D) produced with a metallocene catalyst and having properties (D-i) to (D-ii) and 3 to 35 parts by weight of a propylene-ethylene copolymer (B) having properties (B-i) to (B-ii).

9 Claims, 3 Drawing Sheets

(56) References Cited

FOREIGN PATENT DOCUMENTS

| | | |
|---|---|---|
| JP | 2001-293828 A | 10/2001 |
| JP | 2004-269650 A | 9/2004 |
| JP | 2005-90550 A | 4/2005 |
| JP | 2005-132979 A | 5/2005 |
| JP | 2005-305782 A | 11/2005 |
| JP | 2006-045457 A | 2/2006 |
| JP | 2006-103147 A | 4/2006 |
| JP | 2008-045008 A | 2/2008 |
| JP | 2008-265218 A | 11/2008 |
| JP | 2009-155357 A | 7/2009 |
| JP | 2010-121119 | 6/2010 |
| JP | 2010-121119 A | 6/2010 |
| JP | 2010-121120 A | 6/2010 |
| JP | 2010-180282 A | 8/2010 |
| JP | 2011-068116 | 4/2011 |
| JP | 2012-087263 A | 5/2012 |
| WO | 94/16009 A1 | 7/1994 |
| WO | 02/08304 A1 | 1/2002 |

OTHER PUBLICATIONS

Supplementary European Search Report issued on Dec. 15, 2014 in European Patent Application No. 13751174.7.
Office Action issued Jun. 27, 2016 in Japanese Application No. 2013-077777 (with English language translation).
Notification of Reasons for Refusal issued in corresponding Japanese Patent Application No. 2013-077750, drafted Aug. 15, 2016, (with Machine-Translated English-language Translation by *Global Dossier*).

* cited by examiner

PROPYLENE-ETHYLENE COPOLYMER RESIN COMPOSITION AND MOULDED ARTICLE, FILM AND SHEET THEREOF

REFERENCE TO PRIOR APPLICATIONS

This application is a division of U.S. application Ser. No. 14/379,194, filed Aug. 15, 2014, now allowed; which is a 371 of PCT/JP2013/054469, filed Feb. 22, 2013, the disclosures of which are incorporated herein by reference in their entireties. This application claims priority to Japanese Patent Application No. 2012-038099, filed Feb. 24, 2012; Japanese Patent Application No. 2012-099402, filed Apr. 25, 2012; and Japanese Patent Application No. 2012-258605, filed Nov. 27, 2012, the disclosures of which are incorporated herein by reference in their entireties.

TECHNICAL FIELD

The present invention relates to a propylene-ethylene copolymer resin composition and a moulded article, a film and a sheet thereof and more specifically, to a propylene-ethylene copolymer resin composition which retains excellent properties of a propylene (co)polymer obtained with a metallocene catalyst such as excellent transparency, high rigidity and excellent heat sealability while having excellent extrusion property even with extrusion at low temperatures, and to a moulded article, a film and a sheet obtained by moulding the composition.

BACKGROUND ART

Polypropylenes have wide applications because of excellent optical properties and mechanical properties thereof. In recent years propylene-ethylene copolymers produced with a metallocene catalyst have been developed. Because the copolymers have narrow composition distribution and do not contain low molecular weight compounds or low crystallinity components that may cause stickiness or reduction in rigidity, they are known to provide practically excellent films having low stickiness or blocking (see Patent Literature 1) and thus have been used in the field of films and sheets.

Further, olefin thermoplastic elastomers have been developed which are obtained with a metallocene catalyst and have preferable properties such as appropriate flexibility and strength, transparency, appropriate heat resistance, improvement in blocking property and being devoid of deterioration in appearance over time (see Patent Literature 2) and have been widely used not only for films and sheets but also for fibres, non-woven fabric, various containers and moulded products.

In recent years reduction in the moulding temperature has been sought in view of improvement inaccuracy of the thickness in the width direction of films, reduction in production cost and reduction in solidification time during moulding. The metallocene type copolymers have not only narrow composition distribution but also narrow molecular weight distribution and thus generally have low extrusion property. It is an industrial issue in terms of extrusion property that films discharged from dies by extrusion moulding have impractical appearances as a result of surface roughness referred to as sharkskin and melt fracture.

The surface roughness may be addressed by adjustments of moulding conditions such as an increased temperature of dies or an increased width of the outlet of dies. However, an increase in the temperature may cause problems of heat deterioration of propylene-ethylene copolymers resulting in generation of odour, an increase in the neck-in upon taking up onto rolls from dies and an increase in variation of the thickness. When the width of the outlet of dies is increased, not only the issues other than the heat deterioration are difficult to be solved but also the accuracy of the thickness in the width direction of films is decreased (see Non Patent Literature 1).

In order to improve the extrusion property of propylene-ethylene copolymers obtained with metallocene catalysts, various attempts have been made so far.

First, in order to widen the molecular weight distribution by adjusting a catalyst or a polymerization method, there have been proposed (1) to use a specific metallocene catalyst in order to widen the molecular weight distribution (Patent Literature 3 and 4), (2) to carry out multi-stage polymerization in order to obtain propylene-ethylene copolymers containing two components having different molecular weights (Patent Literature 5 to 7) and (3) to carry out graft modification or copolymerize a macromonomer or a diene to introduce long chain branches (Patent Literature 8 to 12).

With regard to the above proposal (1), Patent Literature 2 for example discloses a propylene copolymer obtained with a metallocene catalyst and having Mw/Mn of 4.0 to 7.7. However, Patent Literature 2 does not disclose Mz/Mn which indicates the presence of an ultrahigh molecular weight component contributing to an improvement in the extrusion property. Moreover, it is well known that when a propylene copolymer obtained with a Ziegler-Natta catalyst and a propylene copolymer obtained with a metallocene catalyst both of which have the same weight average molecular weight are compared for the Mz/Mn thereof, the propylene copolymer obtained with a Ziegler-Natta catalyst has an apparently higher Mz/Mn and has better extrusion property, and thus it is apparent that the above proposal is insufficient for improving the extrusion property.

With regard to the above proposal (2), in order to improve the surface roughness while maintaining the melt flowability, it is required to confer a difference in molecular weight between the low molecular weight component and the high molecular weight component. However, it is difficult to produce a high molecular weight component with a metallocene catalyst and thus the molecular weight of the high molecular weight component needs to be increased. This results in an increase in the difference in the molecular weight and is not preferable because appearance defects referred to as gel or fisheye may be produced.

With regard to the above proposal (3), it is difficult to control a side reaction of crosslinking which may induce production of gel and thus increase appearance defects.

In order to blend materials having excellent extrusion property, there have been proposed (4) to blend with another resin such as polyethylene (Patent Literature 13) and (5) to blend with a propylene-ethylene copolymer having a wide molecular weight distribution (Patent Literature 14 and 15).

With regard to the above proposal (4), polypropylene is not compatible with polyethylene, and thus when another resin is blended until an improvement in the extrusion property is obtained, transparency is significantly deteriorated, resulting in limitation in use application thereof.

With regard to the above proposal (5), Patent Literature 14 for example discloses a copolymer resin composition containing 1 to 70% by weight of a propylene random copolymer (A) obtained with a metallocene catalyst and 30 to 99% by weight of a conventional propylene random copolymer (B) obtained with a Ziegler-Natta catalyst. However, the propylene random copolymer (B) used in the invention has a MFR of as high as 9.2 and does not contain a high molecular weight component that is required in order to improve the surface roughness, and thus the invention does not provide an improvement in the surface roughness.

Meanwhile, Patent Literature 15 discloses a method for improving extrusion property by blending a polypropylene obtained with a metallocene catalyst with a polypropylene having a high melt tension obtained by two-stage polymerization using a metallocene catalyst. However, the polypropylene having high melt tension used in the invention does not include a comonomer and thus when extrusion moulding is carried out at a relatively low temperature of about 180° C., a long molecular chain having long relaxation time causes oriented crystallization while flowing in dies, resulting in solid-liquid phase separation-like situation at the outlet of the dies. Thus when a draft ratio (ratio between the cooling roll take-up speed and the resin discharge speed) is increased, the obtained moulded products may not be suitable for practical use because cracks are produced in the liquid layer.

Further, there has been a proposal (6) to use a specific additive to improve the surface roughness (Patent Literature 16). In this proposal, addition of a fluoroelastomer as a processing aid to suppress production of melt fracture is disclosed. It is generally known that addition of a fluoroelastomer provides a fluoroelastomer coating on the surface of dies during the flow of a resin therein, reduces the resin pressure in the vicinity of the wall of the dies and thus suppresses production of melt fracture as a result. However, when continuous moulding over a prolonged period of time is carried out with this manner, the fluoroelastomer coating on the wall of the dies is deteriorated due to heat, is burnt and appears as black spots in films, causing practical issues.

An invention of a biaxially stretched multi-layer film has been disclosed which exploits excellent properties of a propylene polymer obtained with a metallocene catalyst such as excellent transparency and gloss and low stickiness and blocking. Patent Literature 17 for example discloses an invention of a biaxially stretched multi-layer film including a polypropylene film and a sealant layer stacked thereon containing specific silica particles and a propylene random copolymer obtained with a specific metallocene catalyst. However, propylene resins obtained with a metallocene catalyst have inferior mouldability and thus have drawbacks in terms of film mouldability per se. When, in spite of these drawbacks, such a resin is further coextruded with a propylene resin having a different flowability to form a laminate film, the laminate film has significantly deteriorated optical properties due to sharkskin produced at the outlet of dies or appearance defects resulting from the roughness at the interface of the stacked layers produced in the dies. Further, narrow molecular weight distribution and composition distribution which are characteristics of propylene resins obtained with a metallocene catalyst cause deterioration in hot tack property expressing high speed filling ability and heat sealability. Thus the film has insufficient properties so as to be used as films for packages.

Patent Literature 18 discloses an invention of a polypropylene biaxially stretched multi-layer film obtained by laminating on a substrate layer of an olefin polymer a surface layer of a propylene-ethylene random block copolymer obtained by sequential polymerization so that the heat seal strength and the thickness of the surface layer fulfil specific formulae. Although the propylene-ethylene random block copolymer obtained with a metallocene catalyst may provide a multi-layer film having excellent heat sealability at low temperatures and blocking resistance, issues such as deterioration in mouldability and reduction in hot tack property are not solved.

In order to address low mouldability of propylene (co) polymers obtained with a metallocene catalyst, Patent Literature 19 discloses an invention of a polypropylene resin composition including a propylene homopolymer obtained with a metallocene catalyst and having a relatively low intrinsic viscosity [η] and a propylene homopolymer obtained with a metallocene catalyst and having a relatively high intrinsic viscosity [η].

However, the propylene homopolymers do not exhibit sufficient heat sealability at low temperatures. Further, the difference in the intrinsic viscosity [η] between two propylene homopolymers obtained with a metallocene catalyst is low and the intrinsic viscosity [η] of the propylene homopolymer having a relatively low intrinsic viscosity [η] and obtained with a metallocene catalyst is merely within the range from 1.0 to 2.0 dl/g, which range of intrinsic viscosity [η] cannot sufficiently improve the mouldability. Thus the laminate film obtained by coextrusion has significantly deteriorated optical properties due to sharkskin produced at the outlet of dies or appearance defects resulting from the roughness at the interface of the stacked layers produced in the dies.

Patent Literature 20 discloses an invention of a laminate film including a first layer of a polyolefin resin A having a molecular weight distribution of 3.5 or less and a second layer of a polyolefin resin B, wherein the flowability parameter represented by zero shear viscosity [η0] and the molecular weight distribution W of the resins is within a specific range. Patent Literature 20 describes that the laminate film does not generate appearance defects (scale patterns) and has excellent blocking resistance, transparency, moisture proof property and heat sealability.

However, merely adjusting the zero shear viscosity [η0] and the molecular weight distribution W of the polyolefin resin B used in the substrate layer and the polyolefin resin A used in the sealant layer could not sufficiently improve the mouldability. Particularly, the invention disclosed in Patent Literature 20 provides an improvement in properties of the polyolefin resin B used in the substrate layer and thus when the polyolefin resin A is the one obtained with a metallocene catalyst, low mouldability which is intrinsic to polyolefin resins (e.g., propylene random copolymers) obtained with a metallocene catalyst is not addressed.

Further, Patent Literature 21 discloses an invention pertaining to a propylene laminate film including 50 to 99% by weight of a high molecular weight ethylene-propylene random copolymer (A) having an ethylene content of 1.0 to 6.0% by weight and a Mw of 270000 to 460000 and polymerized using a metallocene catalyst and to 50% by weight of an ultralow molecular weight ethylene-propylene random copolymer (B) having an ethylene content of 1.0 to 6.0% by weight and a Mw of 29000 to 130000 and polymerized using a metallocene catalyst, the film including a sealant layer of a propylene resin composition having a MFR of 2.0 to 20 g/10 min.

This invention provides sufficient improvement in interface roughness, however, does not improve the hot tack property. Further, recently there is a need for an increase in static flow length in dies in order to improve accuracy of the thickness of films or an increase in a discharge amount in order to improve productivity. It appears that the invention of Patent Literature 21 which has insufficient relaxation time of the composition causes problems of surface roughness and thus may not be able to meet these requirements.

CITATION LIST

Non Patent Literature

Non Patent Literature 1: Extrusion Moulding, 7th ed., Kenkichi MURAKAMI, Plastics Age K.K., 1989

Patent Literature

Patent Literature 1: Japanese Patent Application Laid-open No. H11-302470
Patent Literature 2: Japanese Patent Application Laid-open No. 2005-132979
Patent Literature 3: Japanese Patent Application Laid-open No. H4-110308
Patent Literature 4: Japanese Patent Application Laid-open No. 2001-288220
Patent Literature 5: Japanese Patent Application Laid-open No. H10-338705
Patent Literature 6: WO 94/16009
Patent Literature 7: Japanese Patent Application Laid-open No. 2001-64314
Patent Literature 8: Japanese Patent Application Laid-open No. H10-338704
Patent Literature 9: Japanese Patent Application Laid-open No. H11-292944
Patent Literature 10: Japanese Patent Application Laid-open No. 2001-226497
Patent Literature 11: Japanese Patent Application Laid-open No. 2001-253913
Patent Literature 12: Japanese Patent Application Laid-open No. 2001-253922
Patent Literature 13: Japanese Patent Application Laid-open No. 2000-136274
Patent Literature 14: Japanese Patent Application Laid-open No. H5-112683
Patent Literature 15: WO 02/8304
Patent Literature 16: Japanese Patent Application Laid-open No. 2009-155357
Patent Literature 17: Japanese Patent Application Laid-open No. 2001-293828
Patent Literature 18: Japanese Patent Application Laid-open No. 2005-305782
Patent Literature 19: Japanese Patent Application Laid-open No. H11-60842
Patent Literature 20: Japanese Patent Application Laid-open No. 2006-103147
Patent Literature 21: Japanese Patent Application Laid-open No. 2008-265218

SUMMARY OF INVENTION

Technical Problem

With the foregoing in view, it is an object of the present invention to provide a propylene-ethylene copolymer resin composition which retains excellent properties of a propylene (co) polymer obtained with a metallocene catalyst such as excellent transparency, high rigidity and excellent heat sealability while having excellent extrusion property even with extrusion at low temperatures, and a moulded article, a film or a sheet having an excellent quality obtained by moulding the composition.
The present invention also aims to achieve the practical use of a soft propylene-ethylene copolymer resin composition which retains excellent properties of a soft propylene-ethylene copolymer obtained with a metallocene catalyst such as excellent transparency, flexibility and blocking property while having excellent extrusion property even with extrusion at low temperatures, and a moulded article, a film and a sheet obtained by moulding the composition.
It is an further object of the present invention to provide a moulded article, a film, a sheet and the like having excellent quality which retain excellent properties of a propylene-ethylene copolymer having a narrow molecular weight distribution such as excellent transparency and gloss and low stickiness and blocking while having improved stacking ability and extrusion mouldability.

Solution to Problem

The present inventors have carried out various studies in light of the technical situation typically represented by the above Patent Literature and the like and as a result have found that a composition containing a specific amount of a specific propylene-ethylene copolymer obtained with a metallocene catalyst and a specific amount of a specific propylene-ethylene copolymer can achieve the above objects and thus completed the present invention.
According to the present invention, the following propylene-ethylene copolymer resin composition, moulded article, film or sheet and laminate film or laminate sheet and laminate stretched film are provided.
Thus the first invention of the present invention is a propylene-ethylene copolymer resin composition as [1] below.
[1] A propylene-ethylene copolymer resin composition including: based on 100 parts by weight of the sum of the following (A) and (B), 97 to 65 parts by weight of a propylene polymer (A) produced with a metallocene catalyst and having the following properties (A-i) to (A-iii); and 3 to 35 parts by weight of a propylene-ethylene copolymer (B) having the following properties (B-i) to (B-ii), wherein the propylene-ethylene copolymer (B) includes: based on 100% by weight of the sum of (B1) and (B2), 65 to 95% by weight of a propylene polymer component (B1) having the following property (B1-i); and 5 to 35% by weight of a propylene-ethylene copolymer component (B2) having the following properties (B2-i) and (B2-ii), (A-i) the polymer (A) has an ethylene content E(A) within the range from 0 to 6.0 wt %;
(A-ii) the polymer (A) has a melt flow rate MFR(A) within the range from 0.1 to 100 g/10 min;
(A-iii) the polymer (A) has the ratio Mw/Mn(A) between the weight average molecular weight Mw and the number average molecular weight Mn as measured by GPC within the range from 2 to 4;
(B-i) the copolymer (B) has an ethylene content E(B) within the range from 0.4 to 13 wt %;
(B-ii) the copolymer (B) has a melt flow rate MFR(B) within the range from 0.5 to 20 g/10 min;
(B1-i) the polymer component (B1) has an ethylene content E(B1) within the range from 0 to 6.0 wt %;
(B2-i) the copolymer component (B2) has an ethylene content E(B2) within the range from 8 to 25 wt %; and
(B2-ii) the copolymer component (B2) has a melt flow rate MFR(B2) within the range from 0.0001 to 0.5 g/10 min.

The second invention of the present invention is a propylene-ethylene copolymer resin composition as [2] below.
[2] A propylene-ethylene copolymer resin composition including: based on 100 parts by weight of the sum of the following (D) and (B), 97 to 65 parts by weight of a propylene-ethylene copolymer (D) produced with a metallocene catalyst and having the following properties (D-i) to (D-ii); and 3 to 35 parts by weight of a propylene-ethylene copolymer (B) having the following properties (B-i) to (B-ii), wherein the propylene-ethylene copolymer (D) includes: 30 to 99% by weight of a propylene polymer component (D1) having the following properties (D1-i) to (D1-ii); and 1 to 70% by weight of a propylene-ethylene copolymer component (D2) having the following property (D2-i), and the propylene-ethylene copolymer (B) includes: based on 100% by weight of the sum of (B1) and (B2), 65 to 95% by weight of a propylene polymer component (B1) having the following property (B1-i); and 5 to 35% by weight of a propylene-ethylene copolymer component (B2) having the following properties (B2-i) and (B2-ii), (D-i) the copolymer (D) has a melt flow rate MFR(D) within the range from 0.1 to 100 g/10 min;

(D-ii) the copolymer (D) shows a single peak at 0° C. or less in a temperature-loss tangent (tan δ) curve in Dynamic Mechanical Analysis that represents glass transition observed in the range from −60 to 20° C.;

(D1-i) the polymer component (D1) has an ethylene content E(D1) within the range from 0 to 6.0 wt %;

(D1-ii) the polymer component (D1) has the ratio Mw/Mn (D1) between the weight average molecular weight Mw and the number average molecular weight Mn as measured by GPC within the range from 2 to 4;

(D2-i) the copolymer component (D2) has an ethylene content E(D2) within the range from 8 to 15 wt %;

(B-i) the copolymer (B) has an ethylene content E(B) within the range from 0.4 to 13 wt %;

(B-ii) the copolymer (B) has a melt flow rate MFR(B) within the range from 0.5 to 20 g/10 min;

(B1-i) the polymer component (B1) has an ethylene content E(B1) within the range from 0 to 6.0 wt %;

(B2-i) the copolymer component (B2) has an ethylene content E(B2) within the range from 8 to 25 wt %; and (B2-ii) the copolymer component (B2) has a melt flow rate MFR(B2) within the range from 0.0001 to 0.5 g/10 min.

The present invention also provides the inventions of [3] to [11] below:

[3] The propylene-ethylene copolymer resin composition according to [1] or [2], wherein the propylene-ethylene copolymer (B) is produced with a Ziegler-Natta catalyst.

[4] The propylene-ethylene copolymer resin composition according to [2], wherein the propylene-ethylene copolymer (D) is produced by multi-stage polymerization including a step of producing the propylene polymer component (D1) and a step of producing the propylene-ethylene copolymer component (D2).

[5] The propylene-ethylene copolymer resin composition according to [1] to [4], wherein the propylene-ethylene polymer (B) is produced by multi-stage polymerization including a step of producing the propylene polymer component (B1) and a step of producing the propylene-ethylene copolymer component (B2).

[6] A moulded article formed of the propylene-ethylene copolymer resin composition according to any of [1] to [5].

[7] A film or sheet obtained by extrusion moulding of the propylene-ethylene copolymer resin composition according to any of [1] to [5].

[8] A laminate film or laminate sheet including the film or sheet according to [7] laminated as a surface layer.

[9] A propylene laminate stretched film including the propylene-ethylene copolymer resin composition according to any of [1] to [5] laminated as a surface layer and being biaxially stretched.

[10] A propylene laminate stretched film including the propylene-ethylene copolymer resin composition according to [1] having polymer (A) having an ethylene content E(A) of 0.5 to 6.0 wt %, laminated as a surface layer and being biaxially stretched, wherein the propylene laminate stretched film has a heat seal temperature (300 g/15 mm) of 80° C. or higher and 150° C. or lower.

[11] A propylene laminate stretched film including the propylene-ethylene copolymer resin composition according to [2] having polymer component (D1) having an ethylene content E(D1) of 0.5 to 6.0 wt %, laminated as a surface layer and being biaxially stretched, wherein the propylene laminate stretched film has a heat seal temperature (300 g/15 mm) of 80° C. or higher and 150° C. or lower.

Advantageous Effects of Invention

The propylene-ethylene copolymer resin composition of the present invention has an improved extrusion property of propylene (co) polymers obtained with a metallocene catalyst, and can suppress production of surface roughness referred to as melt fracture and sharkskin even under moulding conditions of extrusion moulding which are superior in terms of productivity and performance such as an increased extrusion amount, a decreased width of the outlet of the die and a decreased extrusion temperature.

The film/sheet obtained from the propylene-ethylene copolymer resin composition of the present invention, particularly from the propylene-ethylene copolymer resin composition according to the first invention retains high levels of excellent properties of propylene-ethylene copolymers obtained with a metallocene catalyst such as preferable appearance, excellent transparency, high rigidity and devoid of deterioration in blocking, and thus is suitably used as a film.

Specifically, the film obtained with the soft propylene-ethylene copolymer resin composition of the second invention retains high levels of excellent properties such as excellent transparency and flexibility as well as excellent blocking property.

The laminate film or laminate sheet including the propylene-ethylene copolymer resin composition of the present invention as a surface layer does not exhibit a phenomenon in which the laminate interface to the substrate layer of a propylene resin and the like having low flowability is destabilized; does not have surface roughness referred to as melt fracture and sharkskin even under moulding conditions of extrusion moulding which are superior in terms of productivity and performance such as an increased extrusion amount, a decreased width of the outlet of the die and an increased steady flow time; has excellent transparency and gloss; does not have deteriorated blocking; has excellent heat sealability; and has improved hot tack property.

Figure 1:
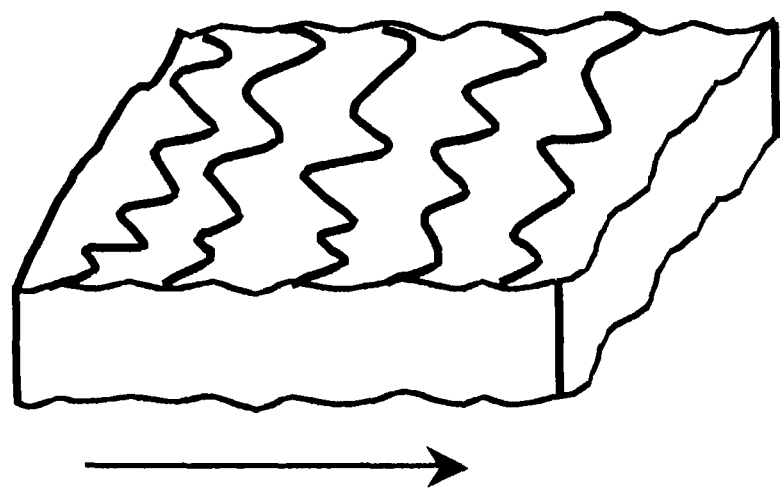
FIG. 1 is a perspective view showing an example of surface roughness on the surface of a film.

of a pressed sheet of a propylene-ethylene copolymer (D-9) obtained in Production Example (D-9), which shows an example of non-single peaks.

DESCRIPTION OF EMBODIMENTS

The propylene-ethylene copolymer resin composition of the first invention of the present invention is a resin composition including the following propylene polymer (A) produced with a metallocene catalyst and a specific amount of the specific propylene-ethylene copolymer (B) as described above.

The propylene-ethylene copolymer resin composition of the second invention of the present invention is a resin composition similarly including the propylene-ethylene copolymer (D) and the propylene-ethylene copolymer (B).

The propylene polymer (A), the propylene-ethylene copolymer (D) and the propylene-ethylene copolymer (B) are sequentially described hereinbelow.

<1> Propylene Polymer (A)

The propylene polymer (A) contained in the resin composition of the present invention is required to be produced with a metallocene catalyst and have the following properties (A-i) to (A-iii):

(A-i) the polymer has an ethylene content E(A) within the range from 0 to 6.0 wt %;

(A-ii) the polymer has a melt flow rate MFR(A) within the range from 0.1 to 100 g/10 min; and (A-iii) the polymer has the ratio Mw/Mn(A) between the weight average molecular weight Mw and the number average molecular weight Mn as measured by GPC within the range from 2 to 4.

(A-i) The polymer (A) has an ethylene content E(A) of 0 to 6.0 wt %, preferably 0.5 to 5.0 wt % and more preferably 1.0 to 5.0 wt %. When the ethylene content is higher than 6.0 wt %, the crystallinity is decreased and thus the blocking resistance is deteriorated.

(A-ii) The polymer (A) has a melt flow rate MFR(A) of 0.1 to 100 g/10 min, preferably 60 g/10 min or less, more preferably 30 g/10 min or less and still more preferably 25 g/10 min or less and preferably 0.5 g/10 min or more, more preferably 1.0 g/10 min or more, still more preferably 2 g/10 min or more and particularly preferably 3 g/10 min or more. When the MFR is less than 0.1 g/10 min, it is difficult to adjust the unevenness of the film thickness. The MFR of more than 100 g/10 min is not practically preferable because the neck-in upon taking up onto rolls from dies is increased which narrows the width of films.

The melt flow rate MFR (A) is measured according to JIS K7210 with a load of 2.16 kg.

(A-iii) The polymer (A) has Mw/Mn of 2 to 4. The Mw/Mn of more than 4 is not preferable because the low molecular weight component is increased, resulting in unfavourable impacts such as prevention of gloss on the film surface or deterioration of blocking resistance.

The specific method of GPC measurement is specifically described in Examples.

<1.1> Production Method of Propylene Polymer (A)

The propylene polymer (A) used is obtained by polymerization using a metallocene catalyst. The polymer obtained with a metallocene catalyst has, compared to polymers obtained with a Ziegler-Natta catalyst, narrower molecular weight distribution and narrower crystallinity distribution, contains a lower amount of low-crystallinity component, has higher rigidity and has better blocking resistance.

A suitable embodiment for producing the propylene polymer (A) is sequentially described hereinafter.

<1.2> Metallocene Catalyst

The type of the metallocene catalyst used for production of the propylene polymer (A) is not particularly limited.

Typical examples of the metallocene catalyst which can be used for the present invention may include the metallocene catalyst including the following components (a) and (b) and an optional component (c).

Component (a): at least one metallocene transition metal compound selected from transition metal compounds represented by the following general formula (1).

Component (b): at least one solid component selected from the following (b-1) to (b-4):

(b-1): a fine particle carrier carrying an organoaluminium oxy compound;

(b-2): a fine particle carrier carrying a Lewis acid or an ionic compound that reacts with the component (a) to convert the component (a) into a cation;

(b-3): solid acid fine particles; and (b-4): ion exchanging laminar silicate salt.

Component (c): an organoaluminium compound.

Component (a)

The component (a) is at least one metallocene transition metal compound selected from the transition metal compounds represented by the following general formula (1):

[C1]

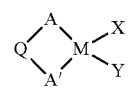

(1)

wherein A and A' are conjugated five-membered ring ligands which may have a substituent; Q is a bonding group which crosslinks two five-membered ring ligands at arbitrary positions; X and Y are a covalent bonding auxiliary ligands which allow olefin polymerization by reaction with the component (b); and M is a transition metal of the group 4 of the periodic table.

In the above general formula (1), the conjugated five-membered ring ligand is a cyclopentadienyl group derivative which may have a substituent. Examples of the substituent, when present, may include hydrocarbon groups with 1 to 30 carbon atoms (which may contain a hetero atom such as halogen, silicon, oxygen and sulphur). The hydrocarbon group may be attached to the cyclopentadienyl group as a monovalent group or two or more hydrocarbon groups may be present two among which may bind each other at the other ends (co-terminals) to form a ring with a part of the cyclopentadienyl. Examples of such a conjugated five-membered ring ligand may include an indenyl group, a fluorenyl group and a hydroazurenyl group among which an indenyl or hydroazurenyl group is preferred. These groups may further have a substituent.

The group Q may preferably include a methylene group, an ethylene group, a silylene group, a germylene group and a group derived therefrom having a substituent hydrocarbon group as well as a silafluorene group.

The auxiliary ligands as X and Y react with a cocatalyst such as the component (b) to produce active metallocene which allow olefin polymerization and may respectively include a hydrogen atom, a halogen atom, a hydrocarbon group or a hydrocarbon group which may contain a hetero atom such as oxygen, nitrogen or silicon. Among these, a hydrocarbon group with 1 to 10 carbon atoms or a halogen atom is preferred.

M is preferably titanium, zirconium or hafnium and particularly preferably zirconium or hafnium.

Among the above transition metal compounds, the one which allows stereoregular polymerization of propylene and produces a propylene polymer having a high molecular weight is preferable. Specifically, transition metal compounds described in Japanese Patent Application Laid-open No. H1-301704, Japanese Patent Application Laid-open No. H4-2211694, Japanese Patent Application Laid-open No. H6-100579, Japanese Translation of PCT Application No. 2002-535339, Japanese Patent Application Laid-open No. H6-239914, Japanese Patent Application Laid-open No. H10-226712, Japanese Patent Application Laid-open No. H3-193796 and Japanese Translation of PCT Application No. 2001-504824.

Non-limiting examples of the transition metal compound may include the followings:

(1) dichloro[1,1'-dimethylsilylenebis(2-methylcyclopentadienyl)]zirconium
(2) dichloro[1,1'-dimethylsilylenebis(2-methyl-4-phenylcyclopentadienyl)]zirconium
(3) dichloro[1,1'-dimethylsilylenebis(2,4,5-trimethylcyclopentadienyl)]zirconium
(4) dichloro[1,1'-dimethylsilylenebis(2-methyl-4-phenyl-indenyl)]zirconium
(5) dichloro[1,1'-dimethylsilylenebis(2-ethyl-4-phenyl-indenyl)]zirconium
(6) dichloro[1,1'-dimethylsilylene(2-methyl-4-phenyl-indenyl)(2-isopropyl-4-phenyl-indenyl)]zirconium
(7) dichloro[1,1'-dimethylsilylene(2-methyl-4-t-butylphenyl-indenyl)(2-isopropyl-4-t-butylphenyl-indenyl)]zirconium
(8) dichloro[1,1'-dimethylsilylenebis{2-(5-methyl-2-furyl)-4-phenyl-indenyl}]zirconium
(9) dichloro[1,1'-dimethylsilylenebis{2-(5-methyl-2-thienyl)-4-phenyl-indenyl}]zirconium
(10) dichloro[1,1'-dimethylsilylenebis{2-(5-methyl-2-furyl)-4-(2-naphthyl)-indenyl}]zirconium
(11) dichloro[1,1'-dimethylsilylenebis{2-(5-methyl-2-furyl)-4-(4-t-butylphenyl)-indenyl}]zirconium
(12) dichloro{1,1'-dimethylsilylenebis(2-methyl-4-phenyl-4H-azulenyl)}zirconium
(13) dichloro[1,1'-dimethylsilylenebis{2-methyl-4-(4-chlorophenyl)-4 H-azulenyl}]zirconium
(14) dichloro[1,1'-dimethylsilylenebis{2-methyl-4-(4-t-butylphenyl)-4H-azulenyl}]zirconium
(15) dichloro[1,1'-dimethylsilylenebis{2-ethyl-4-(2-fluoro-4-biphenyl)-4H-azulenyl}]zirconium
(16) dichloro[1,1'-dimethylsilylenebis{2-methyl-4-(4-chlorophenyl)-4 H-5,6,7,8-tetrahydroazurenyl}]zirconium
(17) dichloro{1,1'-dimethylsilylene(2,3-dimethylcyclopentadienyl)(2-methyl-4-phenyl-4H-azulenyl)}zirconium
(18) dichloro{1,1'-dimethylsilylene(2-methyl-4-phenylcyclopentadienyl) (2-methyl-4-phenyl-4H-azulenyl)}zirconium
(19) dichloro{(1,1'-dimethylsilylene(2,3,4-trimethylcyclopentadienyl) (2-methyl-4-phenyl-4H-azulenyl)}zirconium
(20) dichloro dimethylmethylene(3-t-butyl-5-methylcyclopentadienyl)fluorenyl) zirconium
(21) dichloro dimethylmethylene(3-t-butyl-5-methylcyclopentadienyl)(2,7-di-t-butylfluorenyl)zirconium and
(22) dichloro dimethylmethylene(3-t-butyl-5-methylcyclopentadienyl)(1,1,4,4,7,7,10,10-octamethyl-1,2,3,4,7,8,9, 10-octahydrodibenzofluorenyl) zirconium.

The above preferable compounds are merely typical compounds in order to avoid complicated illustration of numerous compounds. The above compounds have zirconium as a main metal. However, it is apparent that not only similar hafnium compounds but also various conjugated five-membered ring ligands, bonding groups and auxiliary ligands may be arbitrarily used.

Component (b)

The component (b) which is used is at least one solid component selected from the above components (b-1) to (b-4). These components are well known and can be appropriately selected from those well known in the art. Specific examples and production methods thereof can be found in Japanese Patent Application Laid-open Nos. 2002-284808, 2002-53609, 2002-69116 and the like.

The fine particle carriers used as the component (b-1) and component (b-2) may include inorganic oxides such as silica, alumina, magnesia, silica alumina and silica magnesia; inorganic halides such as magnesium chloride, magnesium oxychloride, aluminium chloride and lanthanum chloride; and porous organic carriers such as polypropylene, polyethylene, polystyrene, styrene-divinyl benzene copolymers and acrylate copolymers.

Non-limiting examples of the component (b) may include, for the component (b-1), fine particle carriers carrying methylalumoxane, isobutylalumoxane, methyl isobutylalumoxane, butylboronate aluminium tetraisobutyl and the like; for the component (b-2), fine particle carriers carrying triphenylborane, tris(3,5-difluorophenyl)borane, tris(pentafluorophenyl)borane, triphenylcarbonium tetrakis(pentafluorophenyl)borate, N,N-dimethylanilinium tetrakis(pentafluorophenyl)borate and the like; for the component (b-3), alumina, silica alumina, magnesium chloride, silica alumina which has been treated with a fluorine-containing compound and calcinated, silica carrying the reaction product of pentafluorophenol with an organic metal compound such as diethylzinc and further with water; and for the component (b-4), the smectite group, vermiculite group and mica group such as montmorillonite, sauconite, beidellite, nontronite, saponite, hectorite, stevensite, bentonite and taeniolite. These may form mixed layers.

Among the above components (b), the component (b-4), an ion exchanging laminar silicate salt is particularly preferred and an ion exchanging laminar silicate salt which has been subjected to chemical treatment such as acid treatment, alkaline treatment, salt treatment or treatment with an organic substance is further preferred.

Component (c)

Examples of the optional component (c), the organoaluminium compound, are halogen- or alkoxy-containing alkylaluminiums represented by the general formula:

$$AlR_aX_{3-a}$$

(wherein R represents a hydrocarbon group with 1 to 20 carbon atoms, X represents a hydrogen, a halogen or an alkoxy group and a represents a number of $0<a\leq3$) such as trialkylaluminiums including trimethylaluminium, triethylaluminium, tripropylaluminium and triisobutylaluminium or diethyaluminium monochloride and diethyaluminium monomethoxide.

Alternatively, aluminoxanes such as methylaluminoxane may be used.

Among these, the component (c) is particularly preferably a trialkylaluminium.

Formation of Catalyst

The catalyst is formed by contacting the component (a) and the component (b) and optionally the component (c). The manner of contacting is not particularly limited and may be in the order as described hereinbelow. These components may be contacted not only at the time of preparation of the catalyst but also during preliminary polymerization using an olefin.

1) The component (a) and the component (b) are contacted.

2) The component (a) and the component (b) are contacted followed by addition of the component (c).

3) The component (a) and the component (c) are contacted followed by addition of the component (b).

4) The component (b) and the component (c) are contacted followed by addition of the component (a).

5) Three components are contacted at the same time.

The amount of the components (a), (b) and (c) used in the present invention is arbitrary. For example, the amount of the component (a) relative to 1 g of the component (b) is preferably 0.1 μmol to 500 μmol and particularly preferably 0.5 μmol to 100 μmol. The amount of the component (c) relative to 1 g of the component (b) is preferably 0.001 mmol to 100 mmol and particularly preferably 0.005 mmol to 50 mmol in terms of the amount of the aluminium atom in the component (c). Thus, the amount of the component (c) relative to the component (a) is, in a molar ratio, 0.002 to $10^6$, preferably 0.02 to $10^5$ and particularly preferably 0.2 to $10^4$.

The metallocene catalyst is preferably subjected to preliminary polymerization in which an olefin is contacted to the catalyst to preliminarily carry out polymerization in some extent.

The olefin used is not particularly limited and may be ethylene, propylene, 1-butene, 1-hexene, 1-octene, 4-methyl-1-pentene, 3-methyl-1-butene, vinyl cycloalkanes, styrene and the like, among which propylene is particularly preferred.

An olefin may be arbitrarily supplied during preliminary polymerization treatment such as supplying an olefin to a reaction vessel so as to maintain a constant feeding rate and/or a constant pressure, or so as to change the rate or the pressure stepwise. The temperature and duration of preliminary polymerization are not particularly limited and are preferably in the ranges of −20° C. to 100° C. and 5 minutes to 24 hours. The extent of preliminary polymerization is preferably such that the amount of the polymer preliminarily polymerized is, relative to the component (b), 0.01 to 100 g/g and still more preferably 0.1 to 50 g/g. After completion of preliminary polymerization, the catalyst may be used as it is depending on the mode of use of the catalyst or may be dried, if required.

At the same time as or after contacting the above components, a polymer such as polyethylene, polypropylene and polystyrene or a solid of an inorganic oxide such as silica and titania may also be present.

<1.3> Polymerization Method

Polymerization Process

The polymerization process may be arbitrary.

First, mention is made on a temporal running manner. In this regard, a batch method or a continuous method may be used and a continuous method is generally desirable in view of productivity. In any case, the number of polymerization vessels may be arbitrarily selected. When more than one polymerization vessel is used, the vessels may be connected in series or in parallel. It is also possible to connect the vessels in series and in parallel in combination.

Next, the reaction phase may be in a liquid medium or in a gas medium. Specific examples may include a slurry method, a bulk method and a gas phase method. It is also possible to use a supercritical condition which is intermediate between the bulk method and the gas phase method and is included into the gas phase method because such condition is substantially the same as the gas phase method. A multi-vessel continuous polymerization process in which a polymerization reactor for a bulk method may be followed by a polymerization reactor for a gas phase method is referred to as a bulk method according to customary practice in the art. A batch method in which the first step may be carried out by a bulk method and the second step may be carried out by a gas phase method is also referred to as a bulk method. As described above, the reaction phase is not particularly limited. However, a slurry method uses an organic solvent such as hexane and heptane and thus requires accessory instruments, generally resulting in an increased production cost. Thus, a bulk method or a gas phase method is further preferred.

Various processes have been proposed as a bulk method and gas phase method. Although there are differences in the manner of stirring (mixing) or the manner of eliminating heat, the type of the process is not particularly limited in the present invention in this regard.

General Polymerization Conditions

A polymerization temperature range which is generally used may be used without causing problems. Specifically, the temperature may be in the range from 0° C. to 200° C. and preferably 40° C. to 100° C.

The polymerization pressure may vary according to the process selected and a pressure range which is generally used may be used without causing problems. Specifically, the pressure may be in the range from higher than 0 up to 200 MPa, preferably of 0.1 to 50 MPa. Inert gas such as nitrogen may be present during polymerization without causing problems.

Organoaluminium Compound

Metallocene catalysts do not require, unlike Ziegler catalysts, use of an organoaluminium compound as a cocatalyst. Thus, it is not necessary to add an organoaluminium compound into a polymerization reactor in order to form an activated catalyst. However, olefin polymerization reaction is distinct because extremely numerous catalyst cycles progress within an extremely short time compared to other catalytic reactions, and thus has a technical issue of being easily affected by impurities. In order to address this issue, it is well known to devise so as to use starting materials having extremely high purity compared to usual chemical products or to further purify starting materials. In this regard, it is a general practice to add a highly reactive organoaluminium compound into a polymerization reactor in order to allow reaction of an impurity with the organoaluminium compound before the impurity reacts with the metallocene catalyst and thus renders the impurity harmless.

In this regard, it is also desirable to use the organoaluminium compound (C) in the present invention. The organoaluminium compound (C) may be any compound, and suitable examples may include the same compounds as those mentioned for the optional component (c) in the metallocene catalyst among which triisobutylaluminium and trioctylaluminium are preferred.

The amount of the organoaluminium compound (C) used may be arbitrarily selected according to the level of impurities. Generally, the organoaluminium compound (C) may be added so that the number of moles of the aluminium atom relative to the weight of the propylene polymer (A) produced is within the range from 0.001 to 1000 mmol-Al/kg, preferably 0.01 to 100 mmol-Al/kg and still more preferably 0.1 to 20 mmol/kg.

<1.4> Method for controlling indexes

The method for controlling indexes of the propylene polymer (A) is specifically described hereinafter.

With regard to the ethylene content, the propylene polymer (A) has, as described above, an ethylene content of 0 to 6.0 wt % and more preferably 0.5 to 5.0 wt %.

The ethylene content is conveniently controlled by controlling the amount of ethylene added to a polymerization vessel. Specifically, the propylene polymer (A) may have an increased ethylene content when the amount ratio (supplied amount of ethylene/supplied amount of propylene) of ethylene to propylene supplied to the polymerization vessel is increased and vice versa. Although the relation between the amount ratio between propylene and ethylene supplied to a polymerization vessel and the ethylene content of the propylene polymer (A) may vary according to the type of the metallocene catalyst used, a person skilled in the art can easily obtain a propylene polymer (A) having a desired ethylene content by appropriately adjusting the supplied amount ratio.

Next, mention is made on MFR. As described above, the propylene polymer (A) has a MFR of 0.1 to 100 g/10 min.

The MFR of the propylene polymer (A) can be adjusted by using hydrogen as a chain transfer agent. Specifically, when the concentration of hydrogen or a chain transfer agent is increased, the propylene polymer (A) has an increased MFR and vice versa. The concentration of hydrogen in a polymerization vessel can be increased by increasing a supplied amount of hydrogen to the polymerization vessel and a person skilled in the art can easily adjust the amount.

Finally, mention is made on Mw/Mn which is a ratio between the weight average molecular weight Mw and the number average molecular weight Mn as measured by GPC. As described above, Mw/Mn is 2 to 4.

Use of a metallocene catalyst may decrease Mw/Mn compared to that obtained by the use of a Ziegler-Natta catalyst. In order to control Mw/Mn, it is effective to select a metallocene catalyst suitable for the desired value as well as to devise polymerization conditions. For example, Mw/Mn can be increased compared to the value intrinsically provided by the metallocene catalyst by using two-stage continuous polymerization process in which propylene-ethylene copolymers having different molecular weights are produced in the first stage polymerization vessel and the second stage polymerization vessel. A person skilled in the art can easily obtain a desired Mw/Mn value by preliminarily understanding the relation between the polymerization conditions, particularly the concentration of hydrogen, and the molecular weight of the obtained propylene-ethylene copolymer and appropriately adjusting the concentration of hydrogen in the respective vessels.

<2> Propylene-Ethylene Copolymer (B)

The propylene-ethylene copolymer (B) used in the present invention is required to have the properties (B-i) to (B-ii).
(B-i) the copolymer has an ethylene content E(B) within the range from 0.4 to 13 wt %; and
(B-ii) the copolymer has a melt flow rate MFR (B) within the range from 0.5 to 20 g/10 min.

(B-i) The copolymer has an ethylene content E(B) within the range from 0.4 to 13 wt % and preferably 0.5 to 12 wt %. The copolymer having an ethylene content E(B) within the range has a sufficient improvement effect of surface roughness. When the ethylene content is less than 0.4 wt %, the heat sealability may be deteriorated and oriented crystals may be induced and when the ethylene content is more than 13 wt %, an improvement effect of surface roughness may not be obtained.

(B-ii) The melt flow rate MFR(B) is 0.5 to 20 g/10 min and preferably 1.0 to 15 g/10 min. When the MFR is less than 0.5 g/10 min, the copolymer has less dispersibility in the propylene polymer (A) or the propylene-ethylene copolymer (D), resulting in production of streaks in films and thus impractical appearance. The MFR of more than 20 g/10 min is not preferable because the film may have impaired accuracy of the thickness or the difference in MFR between the propylene polymer component (B1) and the propylene-ethylene copolymer component (B2) is increased, resulting in production of fisheye or gel due to impaired dispersion of the propylene-ethylene copolymer component (B2) and thus resulting in impractical films.

The propylene-ethylene copolymer (B) is further required to be a propylene-ethylene copolymer including: based on 100% by weight of the sum of (B1) and (B2), 65 to 95 wt % of a propylene polymer component (B1) having the following property (B1-i); and 5 to 35 wt % of a propylene-ethylene copolymer component (B2) having the following properties (B2-i) to (B2-ii),
(B1-i) the polymer component (B1) has an ethylene content E (B1) within the range from 0 to 6.0 wt %;
(B2-i) the copolymer component (B2) has an ethylene content E (B2) within the range from 8 to 25 wt %; and
(B2-ii) the copolymer component (B2) has a melt flow rate MFR(B2) within the range from 0.0001 to 0.5 g/10 min.

The value E(B2) as used herein is defined by the following equation using E(B), E(B1) and the weight ratios of the propylene polymer component (B1) and the propylene-ethylene copolymer component (B2) in the propylene-ethylene copolymer (B):

$$E(B2) = \{E(B) - E(B1) \times (W(B1)/100)\}/(W(B2)/100)$$

(wherein W(B1) and W(B2) are respectively the weight ratios of the propylene polymer component (B1) and the propylene-ethylene copolymer component (B2) in the propylene-ethylene copolymer (B) and satisfies the relation: W(B1)+W(B2)=100).

Similarly, the value MFR (B2) is defined by the following formula, which is well known as logarithmic additive rule, using MFR (B), MFR (B1) and the weight ratios of the propylene polymer component (B1) and the propylene-ethylene copolymer component (B2) in the propylene-ethylene copolymer (B):

$$MFR(B2) = \exp\{(\log_e[MFR(B)] - (W(B1)/100) \times \log_e[MFR(B1)])/(W(B2)/100)\}$$

(wherein the MFR (B1) is the MFR of the propylene polymer component (B1) and W(B1) and W(B2) are as defined above).

The component (B1) is a component having crystallinity and has an ethylene content E(B1) of 0 to 6.0 wt % and preferably 0.5 to 5.0 wt %. When the ethylene content E(B1) is more than 6.0 wt %, the polymer has extremely deteriorated properties and not only clogging of polymerization instruments may be induced but also the amount of a low crystallinity component which causes deterioration in stickiness of films may be increased.

The component (B2) is a component for suppressing a slip phenomenon on a die wall generated in the flow field of the die. This component also stabilizes laminate interfaces in multilayer moulding and is required to contain a component having an extremely high molecular weight. Therefore the component (B2) is required to have a MFR (B2) within the range from 0.0001 to 0.5 g/10 min, of which upper limit is preferably 0.2 g/10 min. When the molecular weight is extremely high, dispersibility is deteriorated and fisheye or gel is produced, and thus the MFR (B2) is 0.0001 g/10 min or more and preferably 0.001 g/10 min or more.

The component (B2) is required to have low or no crystallinity in order to prevent oriented crystallization of a molecular chain having long relaxation time during flow in a die upon extrusion moulding at a temperature as relatively low as about 180° C. Because the crystallinity is controlled by the ethylene content, the ethylene content E(B2) is required to be 8 wt % or more, preferably 10 wt % or more, more preferably 10.5 wt % or more and still more preferably 11 wt % or more.

On the other hand, when the ethylene content E(B2) is extremely high, the molecular chain of the component (B2) has significantly decreased compatibility with the propylene molecular chains of the component (A) or the component (D) and the component (B1), the stress propagation in the shear flow field is not produced and the prevention effect of surface roughness is not exhibited, and thus the ethylene content E(B2) is required to be 25 wt % or less and preferably 20 wt % or less.

Laminate stretched films are generally obtained by heating coextruded laminate films to at least 90° C. and stretching the heated films in directions parallel and perpendicular to the flow direction. When the component (B2) which has a high molecular weight has crystallinity, oriented crystallization is produced during the step of heating and stretching to result in films which are unevenly clouded. In order to avoid the cloudy pattern, the component is required to be amorphous. In order to obtain the component (B2) which is amorphous, it is required that the component has an ethylene content E(B2) of 8% by weight or more and preferably 10% by weight or more. On the other hand, when the ethylene content E(B2) is extremely high, the molecular chain of the component (B2) has significantly decreased compatibility with the propylene molecular chains of the component (A) or the component (D) and the component (B1), the stress propagation in the shear flow field is not produced and the prevention effect of surface roughness and interface roughness is not exhibited. In addition, the component (B2) is phase-separated from the component (A) or the component (D) and the component (B1) to significantly reduce transparency of the films. Thus, the ethylene content E(B2) is required to be 25% by weight or less and preferably 20% by weight or less.

When the proportion of the component (B2) which has a significantly high molecular weight in the propylene-ethylene copolymer (B) is extremely high, it is required to increase the difference in MFR between the component (B2) and the component (B1) which causes production of fisheye and gel. Thus the proportion of the component (B2) is required to be 35 wt % or less and preferably 30 wt % or less. On the other hand, when the proportion of the component (B2) is extremely low, it is required to excessively increase the amount of the propylene-ethylene copolymer (B) in the composition, and thus transparency of the films may be reduced. Thus the proportion is required to be 5 wt % or more and preferably 10 wt % or more.

The production method of the propylene-ethylene copolymer (B) of the present invention which has the above properties (B-i) to (B-ii) and is a propylene-ethylene copolymer including 65 to 95 wt % of the propylene polymer component (B1) having the property (B1-i) and 5 to 35 wt % of the propylene-ethylene copolymer component (B2) having the properties (B2-i) to (B2-ii) is not particularly limited as far as the copolymer (B) fulfils the above requirements.

Suitable embodiments for production of the propylene-ethylene copolymer (B) of the present invention are described hereinbelow by way of specific examples.

<2.1> Catalyst

Any catalyst may be used for producing the propylene-ethylene copolymer (B). However, because the propylene-ethylene copolymer component (B2) having the properties (B2-i) to (B2-ii) is produced as a constituent, it is preferable to use a Ziegler-Natta catalyst. The specific production method of the Ziegler-Natta catalyst is not particularly limited. However, an example may include the catalyst disclosed in Japanese Patent Application Laid-open No. 2007-254671.

Specifically, typical examples of the Ziegler-Natta catalyst suitable for production of the propylene-ethylene copolymer (B) of the present invention may include a catalyst including, as constituents, (a1) a solid component containing, as essential components, titanium, magnesium and a halogen, (a2) an organoaluminium compound and (a3) an electron donor.

Solid Component (a1)

The solid component (a1) which is a constituent of the Ziegler-Natta catalyst suitable for production of the propylene-ethylene copolymer (B) of the present invention contains, as essential components, titanium (a1a), magnesium (a1b) and a halogen (a1c) and optionally an electron donor (a1d). In this context, the phrase "contains as essential components" indicates that an arbitrary component in an arbitrary form may be included, in addition to the indicated three components, within the range that does not impair the effect of the invention. Detailed description is provided hereinbelow.

Titanium (a1a)

A titanium compound that provides titanium may be any compounds. Typical examples may include the compound disclosed in Japanese Patent Application Laid-open No. H3-234707. Titanium compounds having any valence such as 4-valent, 3-valent, 2-valent and 0-valent may be used and preferably 4- and 3-valent titanium compounds and still more preferably 4-valent titanium compounds are used.

Specific examples of 4-valent titanium compounds may include titanium halide compounds typically including titanium tetrachloride; alkoxy titanium compounds typically including tetrabutoxy titanium; condensation compounds of alkoxy titanium having a Ti—O—Ti bond typically including tetrabutoxy titanium dimer $(BuO)_3Ti-O-Ti(OBu)_3$; organometallic titanium compounds typically including dicyclopentadienyl titanium dichloride and the like. Among these, titanium tetrachloride and tetrabutoxy titanium are particularly preferred.

The above titanium compounds may be used alone or used in combination of more than one compound. A mixture of the titanium compounds, a compound having an average composition formula that is a mixed formula of more than one compounds (e.g., a compound with $Ti(OBu)_mCl_{4-m}$; 0<m<4, etc.) and a complex with another compound such as phthalate esters (e.g., a compound $Ph(COOBu)_2TiCl_4$, etc.) may alternatively used.

Magnesium (a1b)

A magnesium compound that provides magnesium may be any compounds. Typical examples may include the compound disclosed in Japanese Patent Application Laid-open No. H-234707. Generally, magnesium halide compounds typically including magnesium chloride; alkoxy magnesium compounds typically including diethoxy magnesium; metallic magnesium; oxy magnesium compounds typically including magnesium oxide; hydroxy magnesium compounds typically including magnesium hydroxide; Grignard compounds typically including butylmagnesium chloride; organometallic magnesium compounds typically including butylethylmagnesium; magnesium salt compounds with inorganic and organic acids typically including magnesium carbonate and magnesium stearate; a mixture thereof; a compound having an average composition formula that is a mixed formula thereof (e.g., a compound $Mg(OEt)_mCl_{2-m}$; 0<m<2, etc.) and the like may be used. Among these, magnesium chloride, diethoxy magnesium, metallic magnesium and butylmagnesium chloride are particularly preferred.

Halogen (a1c)

A halogen may be fluorine, chlorine, bromine, iodine and a mixture thereof. Among these, chlorine is particularly preferred.

The halogen is generally provided by the titanium compound and/or the magnesium compound, or may be derived from other compounds. Typically, silicon halide compounds typically including silicon tetrachloride; aluminium halide compounds typically including aluminium chloride; organohalide compounds typically including 1,2-dichloroethane and benzyl chloride; halogenated borane compounds typically including trichloroborane; phosphorus halide compounds typically including phosphorus pentachloride; tungsten halide compounds typically including tungsten hexachloride; molybdenum halide compounds typically including molybdenum pentachloride may be mentioned. These compounds may be used alone or used in combination. Among these, silicon tetrachloride is particularly preferred.

Electron Donor (a1d)

The solid component (a1) may optionally contain an electron donor. Typical examples of the electron donor (a1d) may include the compound disclosed in Japanese Patent Application Laid-open No. 2004-124090. Generally, organic and inorganic acid compounds and derivative compounds thereof (esters, acid anhydrides, acid halides, amides), ether compounds, ketone compounds, aldehyde compounds, alcohol compounds, amine compounds and the like are desirably used.

The organic acid compound which may be used as the electron donor may be exemplified by aromatic polycarboxylic acid compounds typically including phthalic acid; aromatic carboxylic acid compounds typically including benzoic acid; aliphatic polycarboxylic acid compounds typically including malonic acid having one or two substituents at the 2-position such as 2-n-butyl-malonic acid and succinic acid having one or two substituents at the 2-position or one substituent respectively at the 2- and 3-positions such as 2-n-butyl-succinic acid; aliphatic carboxylic acid compounds typically including propionic acid; aromatic and aliphatic sulphonic acid compounds such as benzenesulphonic acid and methanesulphonic acid and the like. The above carboxylic acid compounds and sulphonic acid compounds may contain, regardless of aromatic or aliphatic, arbitrary number of unsaturated bonds at arbitrary position as in maleic acid.

The derivative compound of the organic acid which may be used as the electron donor may be exemplified by esters, acid anhydrides, acid halides, amides and the like of the above organic acids.

An alcohol which constitutes the esters may be aliphatic and aromatic alcohols. Among these alcohols, alcohols having an aliphatic free radical with 1 to 20 carbon atoms such as an ethyl radical, a butyl radical, an isobutyl radical, a heptyl radical, an octyl radical and a dodecyl radical are preferred. Alcohols having an aliphatic free radical with 2 to 12 carbon atoms are further desirable. Alcohols having an alicyclic free radical such as a cyclopentyl radical, a cyclohexyl radical and a cycloheptyl radical may also be used.

A halogen which constitutes the acid halides may be fluorine, chlorine, bromine, iodine and the like. Among these, chlorine is the most preferred. When polyhalides of polyorganic acids are used, a plurality of halogens therein may be the same or different.

The inorganic acid compound which may be used as the electron donor may be exemplified by carbonic acid, phosphoric acid, silicic acid, sulphuric acid, nitric acid and the like. The derivative compounds of the inorganic acid are desirably esters which may specifically include tetraethoxysilane (ethyl silicate), tetrabutoxyxilane (butyl silicate) and the like.

The ether compound which may be used as the electron donor may be exemplified by aliphatic ether compounds typically including dibutyl ether; aromatic ether compounds typically including diphenyl ether; aliphatic ether compounds having two or more ether groups typically including 1,3-dimethoxypropane having one or two substituents at the 2-position such as 2-isopropyl-2-isobutyl-1,3-dimethoxypropane and 2-isopropyl-2-isopentyl-1,3-dimethoxypropane; ether compounds with two or more ether groups having an aromatic free radical in a molecule typically including 9,9-bis(methoxymethyl) fluorene and the like.

The alcohol compound which may be used as the electron donor may be exemplified by aliphatic alcohol compounds typically including butanol and 2-ethylhexanol; phenol derivative compounds typically including phenol and cresol; aliphatic or aromatic polyhydric alcohol compounds typically including glycerol and 1,1'-bi-2-naphthol and the like.

These electron donors may be used alone or used in combination of more than one compound. Among these, phthalate ester compounds typically including dibutyl phthalate, diisobutyl phthalate and diheptyl phthalate; phthaloyl halide compounds typically including phthaloyl dichloride; malonate ester compounds having one or two substituents at the 2-position such as diethyl 2-n-butyl-malonate; succinate ester compounds having one or more substituents at the 2-position or one or more substituents respectively at the 2- and 3-positions such as diethyl 2-n-butyl-succinate; aliphatic ether compounds having two or more ether groups typically including 1,3-dimethoxypropane having one or two substituents at the 2-position such as 2-isopropyl-2-isobutyl-1,3-dimethoxypropane and 2-isopropyl-2-isopentyl-1,3-dimethoxypropane; ether compounds having two or more ether groups and an aromatic free radical in a molecule typically including 9,9-bis(methoxymethyl) fluorene and the like are preferred.

Amount Ratio of the Components Forming the Solid Component

The amount ratio of the components forming the solid component (a1) may be arbitrary as far as the performance of the catalyst is not impaired and the ranges described hereinbelow are generally preferred.

The amount of the titanium compound is, in a molar ratio relative to the amount of the magnesium compound (the number of moles of titanium compound/the number of moles of magnesium compound), preferably within the range from 0.0001 to 1,000 and particularly preferably within the range from 0.01 to 10. When the compound providing a halogen is used in addition to the magnesium compound and the titanium compound, the amount thereof is, regardless of whether the magnesium compound and the titanium compound respectively contain a halogen or not, preferably within the range from 0.01 to 1,000 and particularly preferably 0.1 to 100 in a molar ratio relative to the amount of the magnesium compound (the number of moles of the compound providing a halogen/the number of moles of the magnesium compound).

The amount of the optional electron donor is, if used for preparation of the solid component (a1), preferably within the range from 0.001 to 10 and particularly preferably within the range from 0.01 to 5 in a molar ratio relative to the amount of the magnesium compound (the number of moles of electron donor/the number of moles of magnesium compound).

The solid component (a1) is obtained by bringing the above components into contact at the above amount ratio. The components may be contacted under arbitrary conditions as far as the effect of the present invention is not impaired, although absence of oxygen is required. Generally, the following conditions are preferred:

The temperature at which the components are brought into contact is about −50 to 200° C. and preferably 0 to 100° C. The components may be brought into contact by mechanical manner in, for example, a rotating ball mill or a vibrating mill or by stirring in the presence of an inert diluent.

Organoaluminium Compound (a2)

The organoaluminium compound (a2) which is a constituent of the Ziegler-Natta catalyst suitable for production of the propylene-ethylene copolymer (B) of the present invention may be the compound disclosed in Japanese Patent Application Laid-open No. 2004-124090. Generally, the compound represented by the following general formula is desirably used:

$$R^9_c AlX_d)(OR^{10})_e$$

(wherein $R^9$ represents a hydrocarbon group; X represents a halogen or a hydrogen; R" represents a hydrocarbon group or a crosslinking group via Al; and $c \geq 1$, $0 \leq d \leq 2$, $0 \leq e \leq 2$ and $c+d+e=3$).

In the general formula, $R^9$ is a hydrocarbon group and preferably the hydrocarbon group with 1 to 10 carbon atoms, still more preferably 1 to 8 carbon atoms and particularly preferably 1 to 6 carbon atoms.

Specific examples of $R^9$ may include methyl, ethyl, propyl, butyl, isobutyl, hexyl and octyl groups. Among these, methyl, ethyl and isobutyl groups are the most preferred.

In the above formula, X is a halogen or a hydrogen. A halogen which can be used as X may be exemplified by fluorine, chlorine, bromine and iodine. Among these, chlorine is particularly preferred.

In the above formula, $R^{10}$ is a hydrocarbon group or a crosslinking group via Al. When $R^{10}$ is a hydrocarbon group, $R^{10}$ can be selected from the group of hydrocarbon groups mentioned for $R^9$. The organoaluminium compound (a2) may be alumoxane compounds typically including methylalumoxane and in this case, $R^{10}$ is a crosslinking group via Al.

The compound which may be used as the organoaluminium compound (a2) may include trimethylaluminium, triethylaluminium, triisobutylaluminium, trioctylaluminium, diethylaluminium chloride, ethylaluminium chloride, diethylaluminium ethoxide, methylalumoxane and the like. Among these, triethylaluminium and triisobutylaluminium are preferred.

The organoaluminium compound (a2) may be a single compound or may be more than one compound in combination.

Electron Donor (a3)

The electron donor (a3) which is a constituent of the Ziegler-Natta catalyst suitable for production of the propylene-ethylene copolymer (B) of the present invention may be exemplified by organosilicon compounds having an alkoxy group and compounds having at least two ether bonds.

Organosilicon Compound Having Alkoxy Group

The organosilicon compound having an alkoxy group which is a constituent of the Ziegler-Natta catalyst suitable for production of the propylene-ethylene copolymer (B) of the present invention may be the compound disclosed in Japanese Patent Application Laid-open No. 2004-124090. Generally, the compound represented by the following general formula is desirably used:

$$R^3 R^4_a Si(OR^5)_b$$

(wherein $R^3$ represents a hydrocarbon group or a hydrocarbon group containing a hetero atom; $R^4$ represents a free radical selected from a hydrogen, a halogen, a hydrocarbon group and a hydrocarbon group containing a hetero atom; $R^5$ represents a hydrocarbon group; and $0 \leq a \leq 2$, $1 \leq b \leq 3$ and $a+b=3$).

In the above formula, $R^3$ represents a hydrocarbon group or a hydrocarbon group containing a hetero atom.

The hydrocarbon group which may be used as $R^3$ generally has 1 to 20 carbon atoms and preferably 3 to 10 carbon atoms. Specific examples of the hydrocarbon group which may be used as $R^3$ may include linear aliphatic hydrocarbon groups typically including a n-propyl group; branched aliphatic hydrocarbon groups typically including an i-propyl group and a t-butyl group; alicyclic hydrocarbon groups typically including a cyclopentyl group and a cyclohexyl group; aromatic hydrocarbon groups typically including a phenyl group and the like. More preferably, $R^3$ is a branched aliphatic hydrocarbon group or an alicyclic hydrocarbon group among which an i-propyl group, an i-butyl group, a t-butyl group, a thexyl group, a cyclopentyl group, a cyclohexyl group and the like are desirable.

When $R^3$ is a hydrocarbon group containing a hetero atom, the hetero atom is preferably selected from nitrogen, oxygen, sulphur, phosphorus and silicon among which nitrogen or oxygen is desirable. The back bone structure of the hydrocarbon group containing a hetero atom of $R^3$ may be desirably selected from the hydrocarbon groups mentioned for $R^3$. Particularly, a N,N-diethylamino group, a quinolino group, an isoquinolino group and the like are preferred.

In the above formula, R⁴ represents a hydrogen, a halogen, a hydrocarbon group or a hydrocarbon group containing a hetero atom.

A halogen which may be used as R⁴ may include fluorine, chlorine, bromine and iodine. When R⁴ is a hydrocarbon group, the hydrocarbon group generally has 1 to 20 carbon atoms and preferably 1 to 10 carbon atoms. Specific examples of the hydrocarbon group which may be used as R⁴ may include linear aliphatic hydrocarbon groups typically including a methyl group and an ethyl group; branched aliphatic hydrocarbon groups typically including an i-propyl group and a t-butyl group; alicyclic hydrocarbon groups typically including a cyclopentyl group and a cyclohexyl group; aromatic hydrocarbon groups typically including a phenyl group and the like. Among others, a methyl group, an ethyl group, a propyl group, an i-propyl group, an i-butyl group, a s-butyl group, a t-butyl group, a cyclopentyl group, a cyclohexyl and the like are desirable.

The hydrocarbon group containing a hetero atom as R⁴ is desirably selected from the hydrocarbon groups containing a hetero atom mentioned for R³. Among others, a N,N-diethylamino group, a quinolino group, an isoquinolino group and the like are preferred.

When a is 2, two R⁴ groups may be the same or different. Regardless of the value of a, R⁴ and R³ may be the same or different.

In the above formula, R⁵ represents a hydrocarbon group. The hydrocarbon group which can be used as R⁵ generally has 1 to 20 carbon atoms, preferably 1 to 10 carbon atoms and still more preferably 1 to 5 carbon atoms. Specific examples of the hydrocarbon group which can be used as R⁵ may include linear aliphatic hydrocarbon groups typically including a methyl group and an ethyl group; branched aliphatic hydrocarbon groups typically including an i-propyl group and a t-butyl group and the like. Among others, a methyl group and an ethyl group are the most preferred. When b is 2 or more, a plurality of R⁵ groups may be the same or different.

Preferred examples of the organosilicon compound having an alkoxy group may include t-Bu(Me)Si(OMe)₂, t-Bu(Me)Si(OEt)₂, t-Bu(Et)Si(OMe)₂, t-Bu(n-Pr)Si(OMe)₂, c-Hex(Me)Si(OMe)₂, c-Hex(Et)Si(OMe)₂, c-Pen₂Si(OMe)₂, i-Pr₂Si(OMe)₂, i-Bu₂Si(OMe)₂, i-Pr(i-Bu)Si(OMe)₂, n-Pr(Me)Si(OMe)₂, t-BuSi(OEt)₃, (Et₂N)₂Si(OMe)₂, Et₂N—Si(OEt)₃,

[C2]

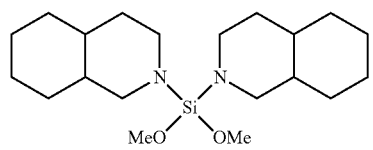

and the like.

These organosilicon compounds may be used alone or used in combination of two or more compounds.

Compound Having at Least Two Ether Bonds

The compound having at least two ether bonds which is a constituent of the Ziegler-Natta catalyst suitable for production of the propylene-ethylene copolymer (B) of the present invention may be the compounds disclosed in Japanese Patent Application Laid-open Nos. H3-294302 and H8-333413. Generally, the compound represented by the following general formula is desirably used:

(wherein R⁶ and R⁷ represent any free radical selected from a hydrogen, a hydrocarbon group and a hydrocarbon group containing a hetero atom; and R⁸ represents a hydrocarbon group or a hydrocarbon group containing a hetero atom).

In the above formula, R⁶ represents any free radical selected from a hydrogen, a hydrocarbon group and a hydrocarbon group containing a hetero atom.

The hydrocarbon group which can be used as R⁶ generally has 1 to 20 carbon atoms and preferably 1 to 10 carbon atoms. Specific examples of the hydrocarbon group which can be used as R⁶ may include linear aliphatic hydrocarbon groups typically including an n-propyl group; branched aliphatic hydrocarbon groups typically including an i-propyl group and a t-butyl group; alicyclic hydrocarbon groups typically including a cyclopentyl group and a cyclohexyl group; aromatic hydrocarbon groups typically including a phenyl group and the like. More preferably, R⁶ is a branched aliphatic hydrocarbon group or an alicyclic hydrocarbon group among which an i-propyl group, an i-butyl group, an i-pentyl group, a cyclopentyl group, a cyclohexyl group and the like are desirable.

Two R⁶ groups may bind each other to form one or more rings. The ring structure may include a cyclopolyene structure containing two or three unsaturated bonds. The ring structure may be condensed with another ring structure. Regardless of the ring structure being monocyclic, polycyclic or condensed, the ring structure may contain one or more hydrocarbon groups as substituents. The substituent(s) on the ring generally has 1 to 20 carbon atoms and preferably 1 to 10 carbon atoms. Specific examples may include linear aliphatic hydrocarbon groups typically including a n-propyl group; branched aliphatic hydrocarbon groups typically including an i-propyl group and a t-butyl group; alicyclic hydrocarbon groups typically including a cyclopentyl group and a cyclohexyl group; aromatic hydrocarbon groups typically including a phenyl group and the like.

In the above formula, R⁷ represents any free radical selected from a hydrogen, a hydrocarbon group and a hydrocarbon group containing a hetero atom. Specifically, R⁷ can be selected from the examples mentioned for R⁶. R⁷ is preferably a hydrogen.

In the above formula, R⁸ represents a hydrocarbon group or a hydrocarbon group containing a hetero atom. Specifically, R⁸ can be selected from the hydrocarbon groups mentioned for R⁶. R⁸ is preferably a hydrocarbon group with 1 to 6 carbon atoms, still more preferably an alkyl group and the most preferably a methyl group.

When R⁶ to R⁸ are respectively a hydrocarbon group containing a hetero atom, the hetero atom is desirably selected from nitrogen, oxygen, sulphur, phosphorus and silicon. Regardless of R⁶ to R⁸ respectively being a hydrocarbon group or a hydrocarbon group containing a hetero atom, R⁶ to R⁸ may contain a halogen. When R⁶ to R⁸ contain a hetero atom and/or a halogen, the back bone structures thereof are desirably selected from the hydrocarbon groups mentioned above. Eight substituents of R⁶ to R⁸ may be the same or different.

Preferable examples of the compound having at least two ether bonds may include 2,2-diisopropyl-1,3-dimethoxypropane, 2,2-diisobutyl-1,3-dimethoxypropane, 2,2-diisobutyl-1,3-diethoxypropane, 2-isobutyl-2-isopropyl-1,3-dimethoxypropane, 2-isopropyl-2-isopentyl-1,3-dimethoxypropane, 2,2-dicyclopentyl-1,3-dimethoxypropane, 2,2-dicyclohexyl-1,3-dimethoxypropane, 2-isopropyl-1,3-dimethoxypropane, 2-tert-butyl-1,3-dimethoxypropane, 2,2-dipropyl-1,3-dimethoxypropane, 2-methyl-2-phenyl-1,3-dimethoxypropane, 9,9-bis(methoxymethyl)fluorene, 9,9-bis(methoxymethyl)-1,8-dichlorofluorene, 9,9-bis(methoxymethyl)-2,7-dicyclopentylfluorene, 9,9-bis(methoxymethyl)-1,2,3,4-tetrahydrofluorene, 1,1-bis(1'-butoxyethyl)cyclopentadiene, 1,1-bis(α-methoxybenzyl)indene, 1,1-bis(phenoxymethyl)-3,6-dicyclohexylindene, 1,1-bis(methoxymethyl)benzonaphthene, 7,7-bis(methoxymethyl)-2,5-norbornadiene and the like. Among others, 2,2-diisopropyl-1,3-dimethoxypropane, 2,2-diisobutyl-1,3-dimethoxypropane, 2-isobutyl-2-isopropyl-1,3-dimethoxypropane, 2-isopropyl-2-isopentyl-1,3-dimethoxypropane, 2,2-dicyclopentyl-1,3-dimethoxypropane and 9,9-bis(methoxymethyl)fluorene are particularly preferred.

These compounds having at least two ether bonds may be used alone or used in combination of two or more compounds. The compound having at least two ether bonds may be the same or different from the compound having two or more ether groups used as the optional component (A1d) in the solid component (A1).

Amount of the Constituents of Catalyst

The amount of the constituents exemplified above in the catalyst is not particularly limited and generally the following ranges are preferred:

The amount of the organoaluminium compound (a2) is, in a molar ratio relative to the titanium component forming the solid component (a1) (the number of moles of organoaluminium compound (a2)/the number of moles of titanium atom), preferably within the range from 1 to 1,000 and particularly preferably in the range from 10 to 500.

The amount of the organosilicon compound (a3a) when it is used as the electron donor (a3) is, in a molar ratio relative to the titanium component forming the solid component (a1) (the number of moles of organosilicon compound (a3a)/the number of moles of titanium atom), preferably within the range from 0.01 to 10,000 and particularly preferably within the range from 0.5 to 500.

The amount of the compound having at least two ether bonds (a3b) when it is used as the electron donor (a3) is, in a molar ratio relative to the titanium component forming the solid component (a1) (the number of moles of compound having at least two ether bonds/the number of moles of titanium atom), preferably within the range from 0.01 to 10,000 and particularly preferably within the range from 0.5 to 500.

Preliminary Polymerization

The catalyst as exemplified above may be subjected to preliminary polymerization before the use thereof in main polymerization. By forming a small amount of polymer in the vicinity of the catalyst before the polymerization process, the catalyst may be further homogeneous and production of fine powder may be suppressed.

A monomer used in preliminary polymerization may be the compound disclosed in Japanese Patent Application Laid-open No. 2004-124090. Specific examples of the compound may include olefins typically including ethylene, propylene, 1-butene, 3-methylbutene-1 and 4-methylpentene-1; styrene-like compounds typically including styrene, α-methylstyrene, allylbenzene and chlorostyrene; diene compounds typically including 1,3-butadiene, isoprene, 1,3-pentadiene, 1,5-hexadiene, 2,6-octadiene, dicyclopentadiene, 1,3-cyclohexadiene, 1,9-decadiene, divinylbenzene and the like. Among these, ethylene, propylene, 3-methylbutene-1,4-methylpentene-1, styrene, divinylbenzene and the like are particularly preferred.

The reaction condition for the above exemplified catalyst and the monomer is not particularly limited and generally the following ranges are preferred:

The amount of preliminary polymerization is, on the basis of 1 gram of the solid component (a1), within the range from 0.001 to 100 g, preferably 0.1 to 50 g and still more preferably 0.5 to 10 g. The temperature during preliminary polymerization reaction is −150 to 150° C. and preferably 0 to 100° C. The temperature during preliminary polymerization reaction is desirably lower than the polymerization temperature of main polymerization. The reaction is preferably carried out while stirring and an inert solvent such as hexane and heptane may be present.

Preliminary polymerization may be repeated multiple times and the monomer used may be the same or different each time. After preliminary polymerization, washing with an inert solvent such as hexane and heptane may be carried out.

<2.2> Production Method of Propylene-Ethylene Copolymer (B)

The production method of the propylene-ethylene copolymer (B) of the present invention is specifically described hereinafter.

The propylene-ethylene copolymer (B) in the present invention is a propylene-ethylene copolymer including 65 to 95 wt % of the propylene polymer component (B1) having the property (B1-i) and 5 to 35 wt % of the propylene-ethylene copolymer component (B2) having the properties (B2-i) to (B2-ii). Thus, upon production of the propylene-ethylene copolymer (B), two polymer components, i.e., the propylene polymer component (B1) and the propylene-ethylene copolymer component (B2) are required to be produced. Two polymer components may be separately produced and then blended. However, it is more desirable to produce two components by multi-stage polymerization (hereinafter also referred to as "sequential polymerization") in order to appropriately disperse the propylene-ethylene copolymer component (B2) having a relatively high molecular weight and relatively low viscosity and MFR in the propylene polymer component (B1) to exhibit intrinsic performances of the propylene-ethylene copolymer (B).

Multi-Stage Polymerization

A desirable production method of the propylene-ethylene copolymer (B), i.e., multi-stage polymerization, includes the step of producing the component (B1) (hereinafter referred to as "B1 production step") and the step of producing the component (B2) (hereinafter referred to as "B2 production step") and the order of the B1 production step and the B2 production step is not limited.

It is desirable to polymerize the propylene polymer component (B1) in the B1 production step and then polymerize the propylene-ethylene copolymer component (B2) in the B2 production step. It is also possible to produce the components in the reverse order. However, because the propylene-ethylene copolymer component (B2) is a polymer having an ethylene content E(B2) within the range from 8 to 25 wt % as defined in (B2-i) and having no or low crystallinity, producing this component in the first step may cause troubles in production such as attachment thereof in a polymerization vessel or clogging of transfer pipes.

Multi-stage polymerization may be either batch method or continuous method, and generally, a continuous method is preferred in view of productivity.

In case of a batch method, varying the polymerization conditions over time allows separate polymerization of the propylene polymer component (B1) and the propylene-ethylene copolymer component (B2) in a single polymerization reactor. A plurality of polymerization reactors may be connected in parallel as far as the effect of the present invention is not inhibited.

In case of a continuous method, the propylene polymer component (B1) and the propylene-ethylene copolymer component (B2) are required to be separately polymerized and thus it is required to use a production instrument containing two or more polymerization reactors in series. It is required that the polymerization reactor corresponding to the step of producing the propylene polymer component (B1) and the polymerization reactor corresponding to the step of producing the propylene-ethylene copolymer component (B2) are connected in series; however within the B1 production step and the B2 production step respectively, a plurality of polymerization reactors may be connected in series and/or in parallel.

Polymerization Process

The polymerization process may be arbitrary.

The reaction phase may be in a liquid medium or in a gas medium. Specific examples may include a slurry method, a bulk method and a gas phase method. It is also possible to use a supercritical condition which is intermediate between the bulk method and the gas phase method and is included into the gas phase method because such condition is substantially the same as the gas phase method. A multi-vessel continuous polymerization process in which a polymerization reactor for a bulk method may be followed by a polymerization reactor for a gas phase method is referred to as a bulk method according customary practice in the art. A batch method in which the first step is carried out by a bulk method and the second step is carried out by a gas phase method is also referred to as a bulk method. As described above, the reaction phase is not particularly limited. However, a slurry method uses an organic solvent such as hexane and heptane and thus requires accessory instruments, generally resulting in an increased production cost. Thus, a bulk method or a gas phase method is further preferred.

Various processes have been proposed as a bulk method and gas phase method. Although there are differences in the manner of stirring (mixing) or the manner of eliminating heat, the type of the process is not particularly limited in the present invention in this regard.

General Polymerization Conditions

A polymerization temperature range which is generally used may be used without causing problems. Specifically, the temperature may be in the range from 0° C. to 200° C. and preferably 40° C. to 100° C.

The polymerization pressure may vary according to the process selected and a pressure range which is generally used may be used without causing problems. Specifically, the pressure may be in the range from higher than 0 up to 200 MPa, preferably of 0.1 to 50 MPa. Inert gas such as nitrogen may be present during polymerization without causing problems.

In the step of producing the propylene-ethylene copolymer component (B2), a polymerization retarder such as ethanol and oxygen may be added. By using the polymerization retarder, not only the polymerized amount in the B2 production step is easily controlled but also the properties of the polymer particles may be improved.

<2.3> Method for Controlling Indexes of Propylene-Ethylene Copolymer (B)

The method for controlling indexes of the propylene-ethylene copolymer (B) is specifically described hereinafter.

Method for Controlling Indexes of Propylene Polymer Component (B1)

With regard to the ethylene content, the propylene polymer component (B1) has an ethylene content of 0 to 6.0 wt % and more preferably 0.5 to 5.0 wt % as described above. The ethylene content is conveniently controlled by controlling the amount of ethylene added to a polymerization vessel. Specifically, the propylene polymer component (B1) may have an increased ethylene content when the amount ratio of ethylene to propylene supplied to the polymerization vessel (supplied amount of ethylene/supplied amount of propylene) is increased and vice versa. Although the relation between the amount ratio between propylene and ethylene supplied to a polymerization vessel and the ethylene content of the propylene polymer component (B1) may vary according to the type of the catalyst used, a person skilled in the art can easily obtain a propylene polymer component (B1) having a desired ethylene content by appropriately adjusting the supplied amount ratio.

Next, mention is made on MFR. Although the MFR(B1) of the propylene polymer component (B1) is not particularly limited, the MFR(B) of the propylene-ethylene copolymer (B) may be controlled by controlling the MFR(B1) of the propylene polymer component (B1) as described hereinafter. The MFR(B1) of the propylene polymer component (B1) may be adjusted by using hydrogen as a chain transfer agent. Specifically, when the concentration of hydrogen—a chain transfer agent—is increased, the propylene polymer component (B1) has an increased MFR(B1) and vice versa. The concentration of hydrogen in a polymerization vessel can be increased by increasing a supplied amount of hydrogen to the polymerization vessel and a person skilled in the art can easily adjust the amount.

Method for Controlling Indexes of Propylene-Ethylene Copolymer Component (B2)

A constituent of the propylene-ethylene copolymer (B), i.e., the propylene-ethylene copolymer component (B2), has an ethylene content E(B2) within the range from 8 to 25 wt % and a MFR (B2) within the range from 0.0001 to 0.5 g/10 min. Thus, the ethylene content and the MFR are required to be controlled and can be controlled in the same manner as the propylene polymer component (B1).

Method for Controlling Indexes of Propylene-Ethylene Copolymer (B)

The propylene-ethylene copolymer (B) has an ethylene content E(B) within the range from 0.4 to 13 wt % and a MFR(B) within the range from 0.5 to 20 g/10 min and includes 65 to 95 wt % of the propylene polymer component (B1) and 5 to 35 wt % of the propylene-ethylene copolymer component (B2). Thus upon controlling indexes of the propylene-ethylene copolymer (B), the ethylene content E(B), the MFR(B) and the weight ratios of the propylene polymer component (B1) and the propylene-ethylene copolymer component (B2) are required to be considered.

First, mention is made on the method for controlling the weight ratios of the propylene polymer component (B1) and the propylene-ethylene copolymer component (B2).

The weight ratios of the propylene polymer component (B1) and the propylene-ethylene copolymer component (B2) are controlled by controlling the production amount in the first step of producing the propylene polymer component (B1) and the production amount in the second step of producing the propylene-ethylene copolymer component (B2). For example, in order to increase the amount of the propylene polymer component (B1) and decrease that of the propylene-ethylene copolymer component (B2), the production amount in the first step is maintained while decreasing the production amount in the second step which can be realized by decreasing the retention time or decreasing the polymerization temperature in the second step. The amount may also be controlled by adding a polymerization retarder such as ethanol and oxygen or increasing the amount thereof when the polymerization retarder is already added and vice versa.

The weight proportion (wt %) of the propylene polymer component (B1) and the propylene-ethylene copolymer component (B2) is generally defined by the production amount in the first step of producing the propylene polymer component (B1) and the production amount in the second step of producing the propylene-ethylene copolymer component (B2). Equations are shown below.

Weight of component (B1):weight of component (B2)=W(B1):W(B2);

$W(B1)$=production amount in first step/(production amount in first step+production amount in second step)×100

$W(B2)$=production amount in second step/(production amount in first step+production amount in second step)×100

$W(B1)+W(B2)=100$ (wherein W(B1) and W(B2) are respectively the weight ratios of the propylene polymer component (B1) and the propylene-ethylene copolymer component (B2) in the propylene-ethylene copolymer (B)).

In industrial production facilities, the production amount is generally determined from heat balance and material balance in each polymerization vessel. When the propylene polymer component (B1) and the propylene-ethylene copolymer component (B2) have significantly different crystallinity, the components may be separated by analytical methods such as TREF (temperature rising elusion fractionation) and the amount ratio may be determined.

It is well known to a person skilled in the art to measure the crystallinity distribution of polypropylene by TREF and specific measurement methods may be found in G. Glokner, J. Appl. Polym. Sci: Appl. Poly. Symp.; 45, 1-24 (1990), L. Wild, Adv. Polym. Sci.; 98, 1-47 (1990), J. B. P. Soares, A. E. Hamielec, Polyer; 36, 8, 1639-1654 (1995) and the like.

Next, mention is made on the method for controlling the ethylene content E(B). Because the propylene-ethylene copolymer (B) is a mixture of the propylene polymer component (B1) and the propylene-ethylene copolymer component (B2), the respective ethylene contents satisfy the following relational expression:

$E(B)=E(B1)\times(W(B1)/100)+E(B2)\times(W(B2)/100)$.

This expression represents the material balance with regard to the ethylene content. As described above, the ethylene content E(B2) of the propylene-ethylene copolymer component (B2) is defined by the following equation and thus the expression above is merely a transformation of the equation used for definition:

$E(B2)=\{E(B)-E(B1)\times(W(B1)/100)\}/(W(B2)/100)$.

Therefore, when the weight ratios of the propylene polymer component (B1) and the propylene-ethylene copolymer component (B2), i.e., W(B1) and W(B2) are determined, E(B) is uniquely determined by using E(B1) and E(B2). Thus, by controlling three factors, i.e., the weight ratios of the propylene polymer component (B1) and the propylene-ethylene copolymer component (B2), E(B1) and E(B2), E(B) can be controlled. For example, in order to increase E(B), E(B1) may be increased or E(B2) may be increased. It may be also easily understood that W(B1) may be decreased and W(B2) may be increased as far as E(B2) is higher than E(B1). The same applies to the reverse direction of the control.

It should be noted that actual values can be determined for E(B) and E(B1) and E(B2) is calculated from these values. Thus, if E(B2) is increased, namely the amount of ethylene supplied to the second step is increased in order to increase E(B) for example, the value which can be actually confirmed by measurement is E(B) but not E(B2). However, it is apparent that an increase in E(B) is resulting from an increase in E(B2).

Finally, mention is made on the method for controlling the MFR(B). Similar to the ethylene content E(B), the MFR(B) satisfies the following relational expression:

$\log_e[MFR(B)]=(W(B1)/100)\times\log_e[MFR(B1)]+(W(B2)/100)\times\log_e[MFR(B2)]$ (wherein $\log_e$ is a logarithm to base e).

This expression is an empirical equation referred to as logarithmic additive rule of viscosity and is routinely used in the art. As described above, the MFR(B2) of the propylene-ethylene copolymer component (B2) is defined by the following equation and thus the expression above is merely a transformation of the equation used for definition:

$MFR(B2)=\exp\{(\log_e[MFR(B)]-(W(B1)/100)\times\log_e[MFR(B1)])/(W(B2)/100)\}$.

In any case, the weight ratios of the propylene polymer component (B1) and the propylene-ethylene copolymer component (B2), MFR(B), MFR(B1) and MFR(B2) are correlated. Thus, in order to control MFR(B), three factors, i.e., the weight ratio of the propylene-ethylene copolymer component (B2), MFR(B1) and MFR(B2) may be controlled. In order to increase MFR (B) for example, MFR (B1) may be increased or MFR (B2) may be increased. It is understood that, because MFR (B2) is at or lower than MFR (B), MFR (B2) is at or lower than MFR(B1). It is also easily understood that when MFR(B2) is lower than MFR(B1), MFR(B) may be increased by increasing W(B1) and decreasing W(B2). The same applies to the reverse direction of the control.

It should be noted that actual values can be determined for MFR(B) and MFR(B1) and MFR(B2) is calculated from these values. Thus, if MFR(B2) is increased, namely the amount of hydrogen supplied to the second step is increased in order to increase MFR(B) for example, the value which can be actually confirmed by measurement is MFR(B) but not MFR(B2). However, it is apparent that an increase in MFR(B) is resulting from an increase in MFR(B2).

<3> Propylene-Ethylene Copolymer (D)

The propylene-ethylene copolymer (D) used for the resin composition of the present invention is produced with a metallocene catalyst and includes 30 to 99% by weight of the propylene polymer component (D1) having the following properties (D1-i) and (D1-ii) and 1 to 70% by weight of the propylene-ethylene copolymer component (D2) having the following property (D2-i):

(D-i) the copolymer (D) has a melt flow rate MFR(D) of 0.1 to 100 g/10 min;

(D-ii) the copolymer (D) shows a single peak at 0° C. or less in a temperature-loss tangent (tan δ) curve in Dynamic Mechanical Analysis that represents glass transition observed in the range from −60 to 20° C.;

(D1-i) the polymer component (D1) has an ethylene content E(D1) within the range from 0 to 6.0 wt %;

(D1-ii) the polymer component (D1) has a molecular weight distribution Mw/Mn (D1) represented by the ratio between the weight average molecular weight (Mw) and the number average molecular weight (Mn) as measured by GPC within the range from 2 to 4; and (D2-i) the copolymer component (D2) has an ethylene content E(D2) of 8 to 15 wt %.

It is defined as W(D1)+W(D2)=100 wherein W(D1) and W(D2) are defined as the weight ratios (wt %) of the propylene polymer component (D1) (hereinafter also referred to as component (D1)) and the propylene-ethylene copolymer (D2) (hereinafter also referred to as component (D2)) in the propylene-ethylene copolymer (D) (hereinafter also referred to as polymer (D)).

The ethylene content E(D2) of the component (D2) is defined by the following equation with using the above-defined W(D1) and W(D2), wherein E(D) is the ethylene content (wt %) of the propylene-ethylene copolymer (D):

$$E(D2)=\{E(D)-E(D1)\times(W(D1)/100)\}/(W(D2)/100).$$

The properties which the polymer (D) should satisfy are sequentially described hereinbelow.

The polymer (D) of the present invention is obtained by polymerization using a metallocene catalyst. The propylene-ethylene copolymer obtained with a metallocene catalyst may have narrow molecular weight distribution and narrow crystallinity distribution, and contain a low amount of the low-crystallinity component. Using a Ziegler-Natta catalyst is not preferable because the obtained polymer may have broad molecular weight distribution and broad crystallinity distribution and contain an increased amount of the low-crystallinity component, resulting in deterioration of at least one of transparency, flexibility and blocking performance.

Property (D-i)

The polymer (D) has a melt flow rate MFR(D) of 0.1 to 100 g/10 min, preferably 60 g/10 min or less, more preferably 30 g/10 min or less and still more preferably 20 g/10 min or less and preferably 0.5 g/10 min or more, more preferably 1 g/10 min or more, still more preferably 2 g/10 min or more and particularly preferably 3 g/10 min or more. When the MFR(D) is less than 0.1 g/10 min, moulding processability and melt flowability may be impaired. The MFR of more than 100 g/10 min is practically not preferable because the neck-in upon taking up onto rolls from dies is increased, resulting in a decrease in the film width.

The melt flow rate MFR(D) is measured according to JIS K7210 at 230° C. with a load of 2.16 kg.

The polymer (D) includes the component (D1) and the component (D2), and thus the MFR(D) of the polymer (D) is correlated to the MFR (D1) of the component (D1) and the MFR (D2) of the component (D2). Actually, the MFR of the component (D2) cannot be directly measured, and thus the MFR (D2) as herein is defined by the following equation, which is well known as logarithmic additive rule of viscosity, using MFR(D), MFR(D1) and the weight ratios of the component (D1) and the component (D2) in the polymer (D):

$$MFR(D2)=\exp\{(\log_e[MFR(D)]-(W(D1)/100)\times\log_e[MFR(D1)])/(W(D2)/100)\}$$

(wherein MFR(D1) is the MFR of the component (D1); W(D1) and W(D2) are as defined above; and $\log_e$ is a logarithm to base e).

The manner of adjusting the MFR(D) during production of the polymer (D) is described hereinafter. Meanwhile as apparent from the above equation, the MFR(D) is determined based on MFR(D1), MFR(D2), W(D1) and W(D2).

In the present invention, when the MFR(D) is within the range from 0.1 to 100 g/10 min, the MFR(D1) can be arbitrarily selected within the range that does not impair the effect of the present invention. The MFR(D2) can also be arbitrarily selected. However, the MFR(D2) being within the range from 1 to 15 g/10 min is further preferable because appearance defects such as bleed out can be further suppressed.

Property (D-ii)

The present property represents compatibility of the component (D1) with the component (D2) in the polymer (D), and in order to exhibit transparency, it is required to show a single peak at 0° C. or less in a temperature-loss tangent (tan δ) curve, the peak being defined as a glass transition temperature observed in the range from −60 to 20° C.

When the polymer (D) shows phase separation, a glass transition temperature of an amorphous portion in the component (D1) and a glass transition temperature of an amorphous portion in the component (D2) are respectively observed and thus non-single peaks may result. In this case, the obtained moulded articles may have deteriorated transparency.

The Dynamic Mechanical Analysis (DMA) is specifically carried out by applying a sinusoidal strain having a certain frequency to a strip specimen and detecting the generated stress. The frequency is 1 Hz, the temperature is increased stepwise from −60° C. during measurement and the measurement is carried out until the sample is melted so that the measurement cannot be carried out. The strain is recommended to be about 0.1 to 0.5%. From the obtained stress, the storage modulus G' and the loss modulus G" are determined according to a well known manner. The plot between loss tangent (=loss modulus/storage modulus) which is defined as the ratio between the storage modulus and the loss modulus and temperature shows a sharp peak in a temperature range at or below 20° C. Generally, a peak at or below 20° C. in the tan δ curve allows observation of glass transition of an amorphous portion. In the present invention, this peak temperature is defined as a glass transition temperature Tg (° C.).

Specific method of Dynamic Mechanical Analysis (DMA) is described in Examples.

Property (D1-i)

The component (D1) is a component which confers appropriate crystallinity to the polymer (D) and improves blocking performance, and thus is required to have crystallinity. Accordingly, the component (D1) has an ethylene content E(D1) of 6.0 wt % or less and more preferably 1.0 wt % to 5.0 wt %. When the ethylene content E(D1) is more than 6.0 wt %, the crystallinity is decreased and thus blocking resistance is deteriorated.

Property (D1-ii)

The Mw/Mn (D1) is defined as the ratio between the weight average molecular weight (Mw) and the number average molecular weight (Mn) obtained by measuring the component (D1) on GPC and is required to be 2 to 4. The Mw/Mn(D1) of more than 4 is not preferable because a low molecular weight component is increased, resulting in adverse effects such as inhibition of gloss of the film surface and deterioration of blocking performance.

Specific method for GPC measurement is described in Examples.

Property (D2-i)

The component (D2) is an essential component for improving flexibility and transparency of the polymer (D). Generally, propylene-ethylene copolymers having an increased ethylene content result in decrease in crystallinity and increase in improvement of flexibility. Thus, the component (D2) is required to have an ethylene content E(D2) of 8 wt % or more. When the E(D2) is less than 8 wt %, sufficient flexibility cannot be obtained. The E(D2) is preferably 9 wt % or more.

On the other hand, when the component (D2) has an excessively high E(D2) in order to decrease crystallinity, the component (D1) has decreased compatibility with the component (D2), resulting in formation of domains due incompatibility between the component (D2) and the component (D1). In such a phase separation structure, the matrix and domains have different refractive index, resulting in drastic decrease in transparency. Therefore, the component (D2) in the polymer (D) used for the present invention is required to have E(D2) of 15 wt % or less, preferably 14 wt % or less.

Specific method for measuring ethylene content as used herein is described in Examples.

Amount Ratios of Component (D1) and Component (D2)

Next, mention is made on amount ratios of the component (D1) and the component (D2) in the copolymer (D).

The component (D1) is a component which confers appropriate crystallinity to the copolymer (D) and improve blocking performance, and the proportion W(D1) of the component (D1) in the copolymer (D) is 30 wt % to 99 wt %, preferably 40 wt % or more and preferably 80 wt % or less and more preferably 70 wt % or less. The W(D1) of less than 30 wt % is not preferable because the component (D2) may exhibit a sea structure, resulting in significant deterioration of blocking performance. The W(D1) of more than 99 wt % is not preferable because the copolymer (D) may have impaired flexibility.

As defined above, the sum of the W(D1) and the W(D2) is 100. Thus, when the range of the W(D1) is determined, the W(D2) is simultaneously determined. Therefore, the W(D2) is required to be 1 wt % to 70 wt %, preferably 20 wt % or more and more preferably 30 wt % or more and preferably 60 wt % or less.

<3.1> Production Method of Propylene-Ethylene Copolymer (D)

The copolymer (D) of the present invention is obtained by polymerization using a metallocene catalyst. The polymer obtained with a metallocene catalyst has, compared to those obtained with a Ziegler-Natta catalyst, narrower molecular weight distribution and narrower crystallinity distribution, contains a lower amount of the low-crystallinity component, and thus a propylene-ethylene random copolymer having excellent transparency, flexibility as well as blocking performance can be produced.

A suitable embodiment for producing the copolymer (D) is sequentially described hereinafter.

<3.2> Metallocene Catalyst

The type of the metallocene catalyst used for production of the propylene-ethylene copolymer (D) is not particularly limited. Typical examples may include the metallocene catalysts described in the above <1.2> which can also be used in this case.

<3.3> Polymerization Method of Copolymer (D)

The copolymer (D) is a mixture of two components, i.e., the propylene polymer component (D1) and the propylene-ethylene copolymer component (D2). Upon production of the copolymer (D), the component (D1) and the component (D2) may be separately produced and then blended. However, it is more desirable to produce by multi-stage polymerization in order to mix the component (D1) and the component (D2) as homogeneously as possible. Thus, it is desirable to produce the polymer (D) by multi-stage polymerization including the step of producing the component (D1) and the step of producing the component (D2). In this case, the step of producing the component (D1) may precede the step of producing the component (D2) or on the contrary the step of producing the component (D2) may precede the step of producing the component (D1). The component (D2) has higher ethylene content and lower crystallinity than the component (D1), and thus it is rather desirable to carry out the step for producing the component (D1) followed by the step of producing the component (D2) because the properties of the particles may be improved.

Specific production method is hereinafter described exemplified by multi-stage polymerization.

Polymerization Process

The polymerization process may be arbitrary.

First, mention is made on a temporal running manner. In this regard, a batch method or a continuous method may be used and a continuous method is generally desirable in view of productivity. In case of a batch method, varying the polymerization conditions over time allows separate polymerization of the component (D1) and the component (D2) in a single polymerization reactor. A plurality of polymerization reactors may be connected in parallel as far as the effect of the present invention is not inhibited.

In case of a continuous method, the component (D1) and the component (D2) are required to be separately polymerized and thus it is required to use a production instrument containing two or more polymerization reactors in series. It is required that the polymerization reactor corresponding to the step of producing the component (D1) and the polymerization reactor corresponding to the step of producing the component (D2) are connected in series; however within the respective steps, a plurality of polymerization reactors may be connected in series and/or in parallel.

Next, with regard to a reaction vessel, it is preferable to use a bulk method or a gas phase method. It is also possible to use a supercritical condition which is intermediate between the bulk method and the gas phase method and is included into the gas phase method because such condition is substantially the same as the gas phase method. A multi-vessel continuous polymerization process in which a polymerization reactor for a bulk method may be followed by a polymerization reactor for a gas phase method is referred to as a bulk method according to customary practice in the art. A batch method in which the first step may be carried out by a bulk method and the second step may be carried out by a gas phase method is also referred to as a bulk method.

Various processes have been proposed as a bulk method and gas phase method. Although there are differences in the manner of stirring (mixing) or the manner of eliminating heat, the type of the process is not particularly limited in the present invention in this regard.

The component (D2) is soluble in an organic solvent such as hydrocarbons and liquefied propylene and thus the step of producing the component (D2) is preferably carried out by a gas phase method.

The step of producing the component (D1) may be carried out by a bulk method or a gas phase method. However, when producing the component (D1) having relatively low crystallinity in order to produce a product having high flexibility, a gas phase method is desirable in order to avoid problems such as adhesion.

Thus, a continuous method is the most desirable in which the step of producing the component (D1) is carried out in a gas phase method followed by the step of producing the component (D2) in a gas phase method.

General Polymerization Conditions

A Polymerization Temperature Range which is Generally Used may be used without causing problems. Specifically, the temperature may be in the range from 0° C. to 200° C. and preferably 40° C. to 100° C.

The polymerization pressure may vary according to the process selected and a pressure range which is generally used may be used without causing problems. Specifically, the pressure may be in the range from higher than 0 up to 200 MPa, preferably of 0.1 to 50 MPa. Inert gas such as nitrogen may be present during polymerization without causing problems.

Organoaluminium Compound

Metallocene catalysts do not require, unlike Ziegler catalysts, use of an organoaluminium compound as a cocatalyst. Thus, it is not necessary to add an organoaluminium compound into a polymerization reactor in order to form an activated catalyst. However, olefin polymerization reaction is distinct because extremely numerous catalyst cycles progress within an extremely short time compared to other catalytic reactions and thus has a technical issue of being easily affected by impurities. In order to address this issue, it is well known to devise so as to use starting materials having extremely high purity compared to usual chemical products or to further purify starting materials. In this regard, it is a general practice to add a highly reactive organoaluminium compound into a polymerization reactor in order to allow reaction of an impurity with the organoaluminium compound before the impurity reacts with the metallocene catalyst and thus render the impurity harmless.

In this regard, it is also desirable to use the organoaluminium compound in the present invention. The organoaluminium compound may be any compound, and suitable examples may include the same compounds as those mentioned hereinabove for the optional component (c) (organoaluminium compound) in the metallocene catalyst among which triisobutylaluminium and trioctylaluminium are preferred.

The amount of the organoaluminium compound used may be arbitrarily selected according to the level of impurities. Generally, the organoaluminium compound may be added so that the number of moles of the aluminium atom of the organoaluminium compound relative to the weight of the propylene-ethylene copolymer (D) produced is within the range from 0.001 to 1000 mmol-Al/kg, preferably 0.01 to 100 mmol-Al/kg and still more preferably 0.1 to 20 mmol/kg.

<3.4> Method for Controlling Indexes of Propylene-Ethylene Copolymer (D)

The method for controlling indexes of the propylene-ethylene copolymer (D) is specifically described hereinafter.

The propylene-ethylene copolymer (D) is a mixture of two components, i.e., the propylene polymer component (D1) and the propylene-ethylene copolymer component (D2). The method for controlling indexes of each component is hereinafter described.

1) Propylene Polymer Component (D1)

The propylene polymer component (D1) has an ethylene content E(D1) of 0 to 6.0 wt % and more preferably 1.0 to 5.0 wt %.

The ethylene content is conveniently controlled by controlling the amount of ethylene added to a polymerization vessel. Specifically, the propylene polymer component (D1) may have an increased ethylene content when the amount ratio (supplied amount of ethylene/supplied amount of propylene) of ethylene to propylene supplied to the polymerization vessel is increased and vice versa. Although the relation between the amount ratio between propylene and ethylene supplied to a polymerization vessel and the ethylene content of the propylene polymer component (D1) may vary according to the type of the metallocene catalyst used, a person skilled in the art can easily obtain a propylene polymer component (D1) having a desired ethylene content by appropriately adjusting the supplied amount ratio.

Next, mention is made on MFR. Any desired MFR(D1) of the propylene polymer component (D1) can be selected without limitation as far as the propylene-ethylene copolymer (D) has the MFR(D) within a predetermined range, i.e., 0.1 to 100 g/10 min. The method for controlling the MFR(D) of the propylene-ethylene copolymer (D) is described later; however, one of such controlling methods may be controlling the MFR(D1) of the propylene polymer component (D1).

The MFR(D1) of the propylene polymer component (D1) may be adjusted by using hydrogen as a chain transfer agent. Specifically, when the concentration of hydrogen or a chain transfer agent is increased, the propylene polymer component (D1) has an increased MFR and vice versa. The concentration of hydrogen in a polymerization vessel can be increased by increasing a supplied amount of hydrogen to the polymerization vessel and a person skilled in the art can easily adjust the amount.

The propylene polymer component (D1) has Mw/Mn(D1) of 2 to 4.

Use of a metallocene catalyst may decrease Mw/Mn compared to that obtained by the use of a Ziegler-Natta catalyst. In order to control Mw/Mn, it is effective to select a metallocene catalyst suitable for the desired value as well as to devise polymerization conditions. For example, Mw/Mn can be increased compared to the value intrinsically provided by the metallocene catalyst by using two-stage continuous polymerization process in which propylene-ethylene copolymers having different molecular weight are produced in the first stage polymerization vessel and the second stage polymerization vessel. A person skilled in the art can easily obtain a desired Mw/Mn value by preliminarily understanding the relation between the polymerization conditions, particularly the concentration of hydrogen, and the molecular weight of the obtained propylene-ethylene copolymer and appropriately adjusting the concentration of hydrogen in the respective vessels.

2) Propylene-Ethylene Copolymer Component (D2)

The propylene-ethylene copolymer component (D2) has an ethylene content E(D2) of 8 to 15 wt % and more preferably 9 to 14 wt %. The ethylene content E(D2) can be controlled by the similar manner as the ethylene content E(D1).

Any desired MFR(D2) of the propylene polymer component (D2) can be selected without limitation as far as the propylene-ethylene copolymer (D) has the MFR(D) within a predetermined range, i.e., 0.1 to 100 g/10 min. However, the MFR(D2) being within the range from 1 to 15 g/10 min is further preferable because appearance defects such as bleed out can be further suppressed.

The method for controlling the MFR(D) of the propylene-ethylene copolymer (D) is described later; however, one of such controlling methods may be controlling the MFR(D2) of the propylene polymer component (D2). The MFR(D2) can be controlled by the similar manner as the MFR(D1).

3) Propylene-Ethylene Copolymer (D)

The copolymer (D) is a mixture of two components, i.e., the propylene polymer component (D1) and the propylene-ethylene copolymer component (D2). Thus, indexes of the copolymer (D) can be controlled by controlling the indexes of the component (D1) and the component (D2). The manner of control is hereinafter sequentially described.

First, mention is made on a method for controlling the weight ratios W(D1) and W(D2) of the component (D1) and the component (D2).

The weight ratios W(D1) and W(D2) of the component (D1) and the component (D2) are controlled by controlling the production amount in the first step of producing the component (D1) and the production amount in the second step of producing the component (D2). For example, in order to increase the amount of the component (D1) and decrease that of the component (D2), the production amount in the first step may be maintained while decreasing the production amount in the second step which can be realized by decreasing the retention time or decreasing the polymerization temperature in the second step. It is also possible to add an electron donor such as alcohols, esters and ethers or gas as a polymerization retarder such as oxygen. In this case, the amount of the component (D2) may be decreased by increasing the amount of the polymerization retarder added, and vice versa.

Generally, the weight ratio of the component (D1) and the component (D2) is defined by the ratio between the production amount in the first step of producing the component (D1) and the production amount in the second step of producing the component (D2). When the component (D1) and the component (D2) have significantly different crystallinity, the components may be separated by analytical methods such as TREF (temperature rising elusion fractionation) and the amount ratio may be determined.

It is well known to a person skilled in the art to measure the crystallinity distribution of propylene-ethylene copolymers by TREF measurement and specific measurement methods may be found in the references described hereinabove.

Mention is made on the MFR(D) of the copolymer (D). The MFR(D) is, as described above, 0.1 to 100 g/10 min, preferably 60 g/10 min or less, more preferably 30 g/10 min or less, still more preferably 20 g/10 min or less and preferably 0.5 g/10 min or more, more preferably 1 g/10 min or more, still more preferably 2 g/10 min or more and particularly preferably 3 g/10 min or more.

The MFR(D) of the copolymer (D) may be controlled by controlling the MFR(D1) of the component (D1), controlling the MFR(D2) of the component (D2) or controlling the weight ratios W(D1) and W(D2) of the component (D1) and the component (D2).

For example, the MFR(D) may be increased by increasing the MFR(D1) according to the method described above, even when the MFR(D2), W(D1) and W(D2) are fixed. This is because of the following equation, as described above:

$$\mathrm{MFR}(D2) = \exp\{(\log_e[\mathrm{MFR}(D)] - (W(D1)/100) \times \log_e[\mathrm{MFR}(D1)])/(W(D2)/100)\}.$$

It is also apparent from this equation that the MFR(D) can be controlled by controlling the MFR(D2), W(D1) and W(D2).

Next, the method for controlling the copolymer (D) so as to have a single peak in a temperature-loss tangent (tan δ) curve in the range from −60 to 20° C.

In the present invention, it is required that a single peak is observed in a temperature-loss tangent (tan δ) curve in the range from −60 to 20° C., the peak being defined as a glass transition temperature in Dynamic Mechanical Analysis.

The method for controlling so as to obtain a single peak is first described. Whether a single peak is obtained or not depends on whether the copolymer (D) has a phase separation structure or not. When the polymer (D) shows phase separation, a glass transition temperature of an amorphous portion in the component (D1) and a glass transition temperature of an amorphous portion in the component (D2) are respectively observed and thus non-single peaks may result. Inversely, when the copolymer (D) does not show phase separation, a single peak may result.

Whether the copolymer (D) shows phase separation or not depends on the compatibility between the component (D1) and the component (D2) which depends on, in the present invention, the magnitude of the difference Egap(D) between the ethylene content E(D1) of the component (D1) and the ethylene content E(D2) of the component (D2). When the Egap(D) is high, for example the E(D1) is low and the E(D2) is high, the compatibility between the component (D1) and the component (D2) is low, resulting in phase separation. In contrast, when the Egap(D) is low, for example the E(D1) is high and the E(D2) is low, the compatibility between the component (D1) and the component (D2) is low, resulting in phase separation.

Thus, in order to obtain a single peak, a copolymer (D) having a value of E(D1) and a value of E(D2) is produced and the solid viscoelasticity thereof is measured; when a single peak is not obtained, E(D1) is further increased for example to decrease the difference between E(D1) and E(D2): E(D2)−E(D1) (hereinafter referred to as Egap(D)) and adjust so as to obtain a single peak. The range of the Egap(D) may be easily determined by measuring, as appropriate, the solid viscoelasticity. Generally, it is preferable that the Egap(D) is within the range from 2 to 15 wt %, more preferably within the range from 5 to 13 wt %.

The method for controlling a glass transition temperature is now described. When the E(D1) and the E(D2) are within the above preferred ranges, the glass transition temperature is decreased with an increase in the E(D1) and the E(D2). Namely, in order to decrease the glass transition temperature, the E(D1) and the E(D2) may be increased. In this case, it is also required to adjust the Egap(D) so as to obtain a single peak. Thus, controlling the E(D1) and the E(D2) may allow adjustment so as to obtain a single peak at −60 to 20° C. in a temperature-loss tangent (tan δ) curve in Dynamic Mechanical Analysis of the copolymer (D). The method for controlling the E(D1) and the E(D2) is described hereinabove.

The polymer (D) may contain another arbitrary polymer other than the essential components of the copolymer (D), i.e., the component (D1) and the component (D2), as far as the effect of the present invention is not inhibited. The arbitrary polymer is preferably polymerized with the same metallocene catalyst and may be polymerized by, for example, including another polymerization step in the multistage polymerization in addition to the step of producing the component (D1) and the step of producing the component (D2). Such a polymer may include polyolefins (except for the polymers corresponding to the component (D1) and the component (D2)) obtained by polymerization of any α-olefin selected from the group consisting of ethylene and α-olefins with 3 to 8 carbon atoms.

<4> Propylene-Ethylene Copolymer Resin Composition

The propylene-ethylene copolymer resin composition according to the first invention of the present invention includes, based on 100 parts by weight of the sum of (A) and (B), 97 to 65 parts by weight of the propylene polymer (A) and 3 to 35 parts by weight of the propylene-ethylene copolymer (B). At the outside of these ranges, namely when the amount of the propylene polymer (A) is more than 97 parts by weight, the propylene-ethylene copolymer resin composition contains an insufficient amount of the high molecular weight component (B2), and thus extrusion property may be deteriorated and surface roughness may be produced, resulting in failure of obtainment of moulded articles having excellent appearance. On the other hand, when the amount of the propylene polymer (A) is less than 65 parts by weight, the propylene-ethylene copolymer resin composition contains an excessively high amount of the high molecular weight component (B2) and thus dispersion property with other components may be deteriorated which may cause streak patterns, resulting in moulded articles having inferior appearance.

With the foregoing in view, it is required that the propylene polymer (A) is at 97 to 65 parts by weight and the propylene-ethylene copolymer (B) is at 3 to 35 parts by weight, and it is more preferable that the propylene polymer (A) is at 95 to 70 parts by weight and the propylene-ethylene copolymer (B) is at 5 to 30 parts by weight.

The propylene-ethylene copolymer resin composition of the second invention of the present invention includes, based on 100 parts by weight of the sum of the copolymer (D) and the copolymer (B), 97 to 65 parts by weight of the copolymer (D) and 3 to 35 parts by weight of the copolymer (B). At the outside of these ranges, namely when the amount of the copolymer (D) is more than 97 parts by weight, the propylene-ethylene copolymer resin composition contains an insufficient amount of the component (B2) and thus the effect for improvement in flowability may be decreased and surface roughness may be produced, resulting in failure of obtainment of moulded articles having excellent appearance. On the other hand, when the amount of the copolymer (D) is less than 65 parts by weight, the propylene-ethylene copolymer resin composition contains an excessively high amount of the copolymer component (B2) and thus dispersion property with other components may be deteriorated which may cause streak patterns, resulting in moulded articles having inferior appearance.

With the foregoing in view, it is required that the copolymer (D) is at 97 to 65 parts by weight and the copolymer (B) is at 3 to 35 parts by weight, and it is more preferable that the copolymer (D) is at 95 to 70 parts by weight and the copolymer (B) is at 5 to 30 parts by weight.

<4.1> Other Components

The propylene-ethylene copolymer resin composition of the present invention may contain various components within the range that does not inhibit the effect of the present invention.

1) Other Additives

The propylene-ethylene copolymer resin composition of the present invention may appropriately contain other additives such as an antioxidant that can be added to propylene resins as far as they do not prevent the effect of the present invention.

Specifically, phenolic stabilizers typically including 2,6-di-t-butyl-p-cresol (BHT), tetrakis[methylene-3-(3,5-di-t-butyl-4-hydroxyphenyl) propionate]methane ("IRGANOX 1010", trade name of BASF Japan) and n-octadecyl-3-(4'-hydroxy-3,5'-di-t-butylphenyl) propionate ("IRGANOX 1076", trade name of BASF Japan); phosphite stabilizers typically including bis(2,4-di-t-butylphenyl)pentaerythritol diphosphite and tris(2,4-di-t-butylphenyl)phosphite; lubricants typically including higher fatty acid amides and higher fatty acid esters; antistatic agents such as glycerol esters, sorbitan esters and polyethylene glycol esters of fatty acids with 8 to 22 carbon atoms; anti-blocking agents typically including silica, calcium carbonate and talc and the like may be added.

2) Other Polymers

The propylene-ethylene copolymer resin composition of the present invention can appropriately contain an elastomer which can be added to propylene resins and a modifying agent such as alicyclic hydrocarbon resins as far as the effect of the present invention is not prevented.

Specifically, polyethylene resins typically including ethylene-α-olefin copolymers e.g., low density polyethylenes and high density polyethylenes; random bipolymer resins of propylene and an α-olefin with 4 to 12 carbon atoms; random terpolymer resins of propylene, ethylene and an α-olefin with 4 to 12 carbon atoms and the like may be mentioned. The α-olefin is preferably butene. The random bipolymer resin of propylene and butene may be the one, for example, commercially available under the trade name of "Tafmer XM" from Mitsui Chemicals, Inc. Alicyclic hydrocarbon resins typically including petroleum resins, terpene resins, rosin-based resins, coumarone indene resins and hydrogenated derivatives thereof may also be added.

Styrene elastomers may be further added which may be appropriately selected from those commercially available. For example, hydrogenated products of styrene-butadiene block copolymers are commercially available under the trade name of "Kraton G" from Kraton Polymer Japan K.K. and under the trade name of "Tuftec" from Asahi Kasei Chemicals Corporation, a hydrogenated product of a styrene-isoprene block copolymer is commercially available under the trade name of "Septon" from Kuraray Co., Ltd., a hydrogenated product of a styrene-vinyl polyisoprene block copolymer is commercially available under the trade name of "Hybrar" from Kuraray Co., Ltd. and a hydrogenated product of a styrene-butadiene random copolymer is commercially available under the trade name of "Dynaron" from JSR Corporation and the styrene elastomer may be appropriately selected from the group of these products.

<4.2> Production Method of Resin Composition

The propylene-ethylene copolymer resin composition of the present invention may be obtained by mixing the propylene polymer (A) or the propylene-ethylene copolymer (D), the propylene-ethylene copolymer (B) and an optional other additive and/or elastomer in a Henschel mixer, a V blender, a ribbon blender, a tumbler blender and the like followed by kneading in a kneading machine such as a single-screw extruder, a multi-screw extruder, a kneader and a Banbury mixer.

<5> Moulded Article

The propylene-ethylene copolymer resin composition of the present invention is moulded to obtain various moulded articles. The moulding method is not particularly limited and may include well known moulding methods such as extrusion moulding, injection moulding, blow moulding, extrusion blow moulding, injection blow moulding, inflation moulding and stamping moulding which respectively provide extrusion moulded articles, injection moulded articles, blow moulded articles, extrusion blow moulded articles, injection blow moulded articles, inflation moulded articles, stamping moulded articles and the like.

The shape and type of the moulded article is not particularly limited and may include, for example, sheets, films, pipes, hoses, wire coatings, filaments and the like among which sheets and films are preferred with sheets being further preferred.

<5.1> Films or Sheets

Particularly, the propylene-ethylene copolymer resin composition of the present invention has an improved extrusion property of propylene-ethylene copolymers obtained with a metallocene catalyst and can suppress production of surface roughness referred to as melt fracture and sharkskin even under moulding conditions which are superior in terms of productivity and performance such as an increased extrusion amount, a decreased width of the outlet of the die and a decreased extrusion temperature during extrusion moulding.

The film or sheet (hereinafter also collectively referred to as "film") obtained with such a composition retains excellent properties of propylene-ethylene copolymers obtained with a metallocene catalyst at high levels such as preferable appearance, excellent transparency, high rigidity and devoid of deterioration in blocking.

A film processing machine used for production of the film is not particularly limited and may include, for example, well known T-die film processing machines and well known extrusion laminate processing machines among which T-die film processing machines are preferred. The preferable conditions for T-die film formation may be a resin temperature of 160 to 260° C., and a cooling roll temperature of 20 to 80° C. The obtained T-die film may be a single layer film or a laminate film containing at least one layer formed with the propylene-ethylene copolymer resin composition.

<5.2> Laminate Film

The laminate film contains a surface layer (hereinafter also referred to as "sealant layer") formed with the propylene-ethylene copolymer composition and a substrate layer laminated thereto. It is also preferable that the laminate film has been stretched and preferably biaxially stretched. The sealant layer may be laminated on one surface or both surfaces of the substrate layer.

The substrate layer desirably contains a propylene resin and may contain a propylene resin composition including the propylene resin and an additive such as an antioxidant which can be added to propylene resins, an elastomer and a modifying agent such as an alicyclic hydrocarbon resin within the range that does not prevent the effect of the present invention.

The propylene resin contained in the substrate layer may specifically include a propylene homopolymer; random bipolymer resins of propylene and ethylene or an α-olefin other than propylene; and random terpolymer resins of propylene, ethylene and an α-olefin having 4 to 12 carbon atoms. The α-olefin is particularly preferably butene.

The propylene resin contained in the substrate layer is preferably a propylene resin having a melting point (Tm) of 155° C. or higher and a MFR of 1 to 5 g/10 min (230° C., 2.16 kg load) because of preferable affinity with the sealant layer.

The laminate film may have a thickness that may be selected according to the application thereof and generally has a thickness within the range from 5 to 100 μm, preferably 10 to 60 μm. The thickness of the sealant layer relative to the thickness of the laminate film is preferably 1 to 20% and more preferably 1.5 to 10%.

The laminate film is preferably obtained by coextrusion of the propylene-ethylene copolymer composition for formation of the sealant layer and the propylene resin composition for formation of the substrate layer. The method of coextrusion may be well known methods without limitation and may include a T-die method, an inflation method and the like.

The propylene laminate film is preferably biaxially stretched. The method of stretching may be a method in which a laminate film obtained after coextrusion is subjected to biaxial stretching which may be sequential biaxial stretching or simultaneous biaxial stretching. The draw ratio is suitably 3 to 7.5 times in the MD direction (flow direction of film) and 8 to 12 times in the TD direction (direction perpendicular to the flow direction of film). When the draw ratio is less than 3 times in the MD direction and less than 8 times in the TD direction, the obtained laminate stretched film may have a decreased tensile elastic modulus and when the draw ratio is more than 7.5 times in the MD direction and more than 12 times in the TD direction, the laminate stretched film may have high heat shrinkage.

It is important to carry out stretching in the MD and TD directions under a temperature condition that suppress orientation of the propylene resin which is preferably contained in the substrate layer. Generally, the stretching temperature is set to be a high temperature. The stretching temperature in the MD direction is, although it may vary according to the properties of the film formation machines, preferably 90° C. to 140° C. and still more preferably 100° C. to 130° C. When the stretching temperature is lower than 100° C., heat shrinkage may be increased, resulting in failure of obtainment of stretched films and when the stretching temperature is higher than 140° C., the MD sheet may be stuck to a roll.

On the other hand, the stretching temperature in the TD direction is preferably 140° C. to 180° C. and still more preferably 150° C. to 170° C. When the stretching temperature is lower than 140° C., heat shrinkage may be increased and when the stretching temperature is higher than 170° C., film may be whitened and transparency may be decreased.

After stretching in the TD direction, relaxation treatment may be carried out in order to decrease the tenter width. The TD relaxation ratio (the decreased width/tenter width×100) is preferably 0 to 8% and still more preferably 0 to 3%. When the ratio is more than 8%, orientation in the TD direction may be excessively decreased, resulting in an increase in heat shrinkage in the MD direction.

The biaxially stretched laminate stretched film may be subjected to, in order to further decrease heat shrinkage, a relaxation heat treatment during secondary processing after film formation preferably under the conditions that do not decrease transparency or rigidity represented by tensile elastic modulus. Thus, in the method of the present invention, it is the most preferred that the relaxation heat treatment is not carried out after film formation.

The laminate film contains, as described above, at least the structure of the sealant layer/the substrate layer and may further contain another layer according to the application purposes such as a gas barrier resin layer e.g., saponified ethylene-vinyl acetate copolymers and polyvinyl alcohol laminated on the surface of at least one of the sealant layer and the substrate layer. Another layer may be provided by coextrusion according to a T-die method or an inflation method using an extruder corresponding to the number of laminated layers, by lamination of the propylene laminate film of the present invention and another layer according to a dry lamination method, a wet lamination method and the like, by extrusion of another layer onto the laminate film of the present invention or by coextrusion coating of the laminate film of the present invention onto another layer.

The propylene laminate film of the present invention may be subjected to surface treatment in order to improve printing property, laminate property and the like. Surface treatment may include corona discharge, plasma treatment, flame treatment, acid treatment and the like without particular limitation. The surface treatment may be continuously carried out and corona discharge, plasma treatment and flame treatment are preferred because the treatments may be easily carried out before the taking up step during production of the laminate film.

The propylene laminate film of the present invention preferably has a heat seal temperature, which is a temperature at 300 g/15 mm in a heat seal curve obtained from measurement of a film containing the sealant layers of the propylene laminate film stacked together, of 80° C. or higher and 150° C. or lower in view of retention of preferable appearance at a heat seal portion after heat seal, more preferably 90° C. or higher, still more preferably 100° C. or higher, more preferably 148° C. or lower, still more preferably 145° C. or lower, particularly preferably 143° C. or lower and the most preferably 140° C. or lower. A heat seal temperature that is lower than the melting point of the propylene-ethylene copolymer (A) or (D) may be achieved by addition of "Tafmer XM" and the like described above. However, as the melting point of "Tafmer XM" is 75° C., the heat seal temperature equal to or lower than 75° C. is not feasible. The heat seal temperature of higher than 150° C. is not preferable because the film may have an increased heat shrinkage and wrinkles may be produced at the seal portion to impair the shape of the final products.

In order to improve heat sealing strength and high speed filling ability, it is preferable that in the hot tack strength which is measured on a film containing the sealant layers stacked together, the difference between the maximum strength and a strength measured at a temperature 5° C. higher than the temperature at which the maximum strength is exhibited is less than 40 gf/15 mm and more preferably less than 35 gf/15 mm. This value of higher than 40 gf/15 mm is not preferable because the heat sealing strength may be decreased and troubles during high speed filling and packaging may result.

Preferable application of the film or sheet exploiting the above properties may include the laminate film or laminate sheet including the film or sheet laminated as a surface layer.

Application of the film is not particularly limited and may be packaging of food such as bread and vegetables, packaging of clothing such as shirts, packaging of industrial components and the like. The film may be also used as a film laminated onto a substrate such as cellophane, paper, fabric, paper board, aluminium foil, Nylon 6, Nylon 66 and the like polyamide resin films, polyethylene terephthalate, polybutylene terephthalate and the like polyester resin films and stretched polypropylene films by a well known lamination technique such as dry lamination or sandwich lamination.

EXAMPLES

The present invention is hereinafter specifically described by way of Examples which do not limit the present invention. Evaluation methods and resins used in Examples and Comparative Examples are as follows:

1. Propylene Polymer (A)
(1) Measurement Methods of Properties of Polymer (A)
(1-1) Ethylene Content E(A).
The ethylene content E(A) is a value determined by analyzing $^{13}$C-NMR spectra by complete proton decoupling under the following conditions:
Instrument: "GSX-400" from JEOL Ltd. or an equivalent instrument (carbon nuclear resonance frequency: 100 MHz or more)
Solvent: o-dichlorobenzene+deuterated benzene (4:1 (volume ratio))
Concentration: 100 mg/mL
Temperature: 130° C.
Pulse angle: 90°
Pulse interval: 15 seconds
Integration times: 5,000 or more.

Designation of spectra may be carried out by referring to Macromolecules 17, 1950 (1984), for example. Designation of spectra measured under the above conditions is shown in the following Table 1. In Table 1, symbols such as $S_{\alpha\alpha}$, and the like are in conformity with the notation described in Carman et al. (Macromolecules 10, 536 (1977)), and P represents a methyl carbon, S represents a methylene carbon and T represents a methine carbon.

TABLE 1

| Chemical shift (ppm) | Designation |
| --- | --- |
| 45-48 | $S_{\alpha\alpha}$ |
| 37.8-37.9 | $S_{\alpha\gamma}$ |
| 37.4-37.5 | $S_{\alpha\delta}$ |
| 33.1 | $T_{\delta\delta}$ |
| 30.9 | $T_{\beta\delta}$ |
| 30.6 | $S_{\gamma\gamma}$ |
| 30.2 | $S_{\gamma\delta}$ |
| 29.8 | $S_{\delta\delta}$ |
| 28.7 | $T_{\beta\beta}$ |
| 27.4-27.6 | $S_{\beta\delta}$ |
| 24.4-24.7 | $S_{\beta\beta}$ |
| 19.1-22.0 | P |

There may be six different triads of PPP, PPE, EPE, PEP, PEE and EEE in a copolymer chain, wherein "P" represents a propylene unit and "E" represents an ethylene unit in the copolymer chain. As described in Macromolecules, 15, 1150 (1982) and other references, the concentration of these triads can be correlated to the peak intensity of spectra by the following relations (1) to (6).

$$[PPP]=k\times I(T_{\beta\beta}) \quad (1)$$

$$[PPE]=k\times I(T_{\beta\delta}) \quad (2)$$

$$[EPE]=k\times I(T_{\delta\delta}) \quad (3)$$

$$[PEP]=k\times I(S_{\beta\beta}) \quad (4)$$

$$[PEE]=k\times I(S_{\beta\delta}) \quad (5)$$

$$[EEE]=k\times \{I(S_{\delta\delta})/2+I(S_{\gamma\delta})/4\} \quad (6)$$

In the above formulae, the symbol [ ] represents the fraction of a triad and for example [PPP] means the fraction of the PPP triad relative to all triads.
Namely, $$[PPP]+[PPE]+[EPE]+[PEP]+[PEE]+[EEE]=1 \quad (7).$$

In the above formulae, k is a constant and I represents the intensity of a spectrum and for example $I(T_{\beta\beta})$ means the intensity of the peak at 28.7 ppm which is designated as $T_{\beta\beta}$. By using the relations (1) to (7), the fraction of triads is determined and then the ethylene content is determined according to the following formula.

$$\text{Ethylene content(mol \%)}=([PEP]+[PEE]+[EEE])\times 100$$

The propylene random copolymer in the propylene polymer (A) may contain a small amount of propylene hetero bonds (2,1-bond and/or 1,3-bond) which generate the minute peaks as shown in Table 2.

TABLE 2

| Chemical shift (ppm) | Designation |
|---|---|
| 42 | $S_{\alpha\alpha}$ |
| 38.2 | $T_{\alpha\gamma}$ |
| 37.1 | $S_{\alpha\delta}$ |
| 34.1-35.6 | $S_{\alpha\beta}$ |
| 33.7 | $T_{\gamma\gamma}$ |
| 33.3 | $T_{\gamma\delta}$ |
| 30.8-31.2 | $T_{\beta\gamma}$ |
| 30.5 | $T_{\beta\delta}$ |
| 30.3 | $S_{\alpha\beta}$ |
| 27.3 | $S_{\alpha\gamma}$ |

In order to determine a precise ethylene content, these peaks derived from the hetero bonds may need to be taken into account for calculation. However, because complete separation and identification of the peaks derived from hetero bonds are difficult and the amount of the hetero bonds is low, the ethylene content E(A) of the propylene polymer (A) is determined based on the relations (1) to (7), similar to the analysis of copolymers which do not substantially contain hetero bonds and are produced by using Ziegler-Natta catalysts.

The ethylene content is transformed from mol % to % by weight according to the following formula.

Ethylene content (% by weight)($28 \times X/100$)/{$28 \times X/100 + 42 \times (1-X/100)$}$\times 100$ In the formula, X is the ethylene content expressed in mol %.

(1-2) MFR(A)

MFR(A) was measured according to JIS K7210 A, condition M under the following conditions:

Test temperature: 230° C.
Nominal load: 2.16 kg
Shape of die: diameter: 2.095 mm, length: 8.00 mm.

(1-3) GPC Measurement and Number Average Molecular Weight Mn and Weight Average Molecular Weight Mw These values are obtained by measurement on gel permeation chromatography (GPC) specifically as follows:

The molecular weight is calculated from the retention volume according to a calibration curve preliminarily generated with standard polystyrenes.

Standard polystyrenes used are of trade names F380, F288, F128, F80, F40, F20, F10, F4, F1, A5000, A2500 and A1000 from Tosoh Corporation. A calibration curve is prepared by injecting 0.2 mL of solution containing each polystyrene at 0.5 mg/mL in ODCB (containing 0.5 mg/mL of BHT). A cubic equation obtained by approximation by the least square method is used for the calibration curve. The following values are applied to the viscosity equation $[\eta]=K \times M^{\alpha}$ used for conversion into molecular weight.

$PS: K=1.38 \times 10^{-4}, \alpha=0.7$ $PP: K=1.03 \times 10^{-4}, \alpha=0.78$ The measurement conditions of GPC are as follows:
Instrument: GPC (ALC/GPC 150 C) from Waters
Detector: MIRAN 1A IR Detector from FOXBORO
Measurement wavelength: 3.42 μm
Column: AD806M/S (3 columns) from Showa Denko K.K.
Mobile phase solvent: o-dichlorobenzene
Measurement temperature: 140° C.
Flow rate: 1.0 ml/min
Injection amount: 0.2 ml.

Sample preparation: A sample is prepared as a 1 mg/mL solution in ODCB (containing 0.5 mg/mL of BHT) after dissolution at 140° C. over about 1 hour.

(2) Production of propylene polymer (A)

Production Example A-1

Preparation of Catalyst for Preliminary Polymerization (Chemical Treatment of Silicate Salt)

To a 10-L glass separable flask equipped with a stirring blade were gradually added 3.75 liter of distilled water and then 2.5 kg of concentrated sulphuric acid (96%). At 50° C., 1 kg of montmorillonite ("Benclay SL" from Mizusawa Industrial Chemicals, Ltd., average particle diameter=25 μm, particle size distribution=10 to 60 μm) was further dispersed and the dispersion was heated to 90° C. which temperature was maintained for 6.5 hours. After cooling to 50° C., the slurry was filtered under reduced pressure to recover a cake. To the cake were added 7 liters of distilled water to again obtain slurry which was then filtered. This washing procedure was repeated until the washing fluid (filtrate) had pH of above 3.5. The recovered cake was dried overnight at 110° C. under a nitrogen atmosphere. The weight of the cake after drying was 707 g.

(Drying of Silicate Salt)

The chemically treated silicate salt as above was dried in a kiln dryer. The specifications and drying conditions are as follows:

Rotating tube: cylindrical tube, inner diameter: 50 mm, heating band: 550 mm (electric furnace)
Rotating speed of scraping blade: 2 rpm
Angle of inclination: 20/520
Feeding rate of silicate salt: 2.5 g/min
Gas flow rate: nitrogen, 96 liter/hour
Countercurrent drying temperature: 200° C. (powder temperature).

(Preparation of Catalyst)

To a 1-L glass reactor equipped with a stirring blade was introduced 20 g of dried silicate salt and then 116 ml of mixed heptane and 84 ml of triethylaluminium solution (0.60 M) in heptane were added and the mixture was stirred at room temperature. After 1 hour, the mixture was washed with mixed heptane and the silicate salt slurry was adjusted to 200 ml. To the prepared silicate salt slurry was then added 0.96 ml of triisobutylaluminium solution (0.71 M/L) in heptane to allow reaction at 25° C. for 1 hour. In parallel, a mixture was prepared by adding to 218 mg (0.3 mM) of [(r)-dichloro[1,1'-dimethylsilylenebis{2-methyl-4-(4-chlorophenyl)-4H-azulenyl}] zirconium] and 87 ml of mixed heptane 3.31 ml of triisobutylaluminium solution (0.71 M) in heptane, which mixture was added to the silicate salt slurry, stirred for 1 hour and added with mixed heptane to adjust to 500 ml.

(Preliminary Polymerization/Washing)

To a 1.0-L stirring autoclave which was thoroughly replaced with nitrogen was introduced the prepared silicate salt/metallocene complex slurry. After the temperature was stabilized at 40° C., propylene was fed at a rate of 10 g/hour and the temperature was maintained. After 4 hours, feeding of propylene was halted and the reaction was maintained for further 2 hours.

After completion of preliminary polymerization, residual monomers were purged, stirring was halted and the reaction was left to stand for about 10 minutes to remove 240 ml of supernatant by decantation. A triisobutylaluminium solution (0.95 ml, 0.71 M/L) in heptane and 560 ml of mixed heptane were added and the mixture was stirred at 40° C. for 30 minutes, left to stand for 10 minutes to remove 560 ml of supernatant. This procedure was repeated 3 more times. The component analysis of the final supernatant revealed the concentration of the organoaluminium component of 1.23 mmol/liter, Zr concentration of $8.6 \times 10^{-6}$ g/L and the amount in the supernatant relative to the loaded amount of 0.016%. A triisobutylaluminium solution (17.0 ml, 0.71 M/L) in heptane was added followed by drying under reduced pressure at 45° C. A preliminarily polymerized catalyst A was obtained which contained 2.0 g of polypropylene per 1.0 g of catalyst.

The preliminarily polymerized catalyst A was used in the following procedure to produce a propylene-ethylene random copolymer (A).

Propylene-Ethylene Random Copolymerization

A 200-L stirring autoclave was thoroughly replaced with propylene, introduced with 470 ml of triisobutylaluminium solution (50 g/L) in heptane (23.5 g of triisobutylaluminium), 45 kg of liquefied propylene, 4 NL of hydrogen and 1900 g of ethylene and adjusted to an inner temperature of 30° C. The prepared preliminarily polymerized catalyst A (0.6 g: the weight of the catalyst excluding preliminarily polymerized polymer was 0.2 g) was added. The temperature was then increased to 65° C. to initiate polymerization. After 2 hours, 100 ml of ethanol was added to terminate polymerization. Unreacted gas was purged and the polymer was dried.

The thus obtained PP (A-1) had the polymer yield of 20 kg, and the catalyst activity (the value obtained by dividing the polymer yield by the catalyst amount) was 100 kg-PP/g-catalyst.

The analysis result of the obtained PP(A-1) is shown in Table 3.

Production Examples A-2 to A-5 and A-7 to A-9

Propylene-ethylene random copolymerization was carried out in the same manner as Production Example A-1 except that the polymerization conditions indicated in Table 3 were used (Production Example A-2 is a propylene homopolymer).

The results are shown in Table 3.

Production Example A-6

Propylene-ethylene random copolymerization was carried out in the same manner as Production Example A-1 except that the preliminarily polymerized catalyst B was used which was prepared with [(r)-dichloro[1,1'-dimethylsilylenebis{2-methyl-4-(4-chlorophenyl)-4H-azulenyl}]hafnium] instead of [(r)-dichloro[1,1'-dimethylsilylenebis{2-methyl-4-(4-chlorophenyl)-4H-azulenyl}]zirconium] and that the polymerization conditions indicated in Table 3 were used.

The analysis results of the obtained PP(A-1) to PP(A-9) are shown in Table 3.

TABLE 3

| | | | Production Example | | | | | | | | |
|---|---|---|---|---|---|---|---|---|---|---|---|
| | | | A-1 | A-2 | A-3 | A-4 | A-5 | A-6 | A-7 | A-8 | A-9 |
| Preliminarily polymerized catalyst | Type | — | A | A | A | A | A | B | A | A | A |
| | Amount (excluding polymer) | g | 0.2 | 2 | 1 | 0.3 | 0.1 | 0.2 | 0.2 | 0.1 | 0.1 |
| Polymerization conditions | Hydrogen amount | NL | 4 | 1.5 | 2 | 2.7 | 6 | 1.8 | 1.5 | 5.8 | 7.2 |
| | Ethylene amount | g | 1900 | 0 | 400 | 1000 | 2700 | 2500 | 1900 | 1900 | 1900 |
| | Polymerization temperature | ° C. | 60 | 70 | 70 | 65 | 60 | 60 | 60 | 60 | 60 |
| Polymerization results | Polymer yield | kg | 20 | 16 | 14 | 16.8 | 12.8 | 14 | 16 | 11.8 | 13 |
| | Catalyst activity | kg-PP/g-catalyst | 100 | 8 | 14 | 56 | 128 | 70 | 80 | 118 | 130 |
| Polymer analysis results | Ethylene content E (A) | wt % | 3.2 | 0 | 0.58 | 1.75 | 4 | 3.2 | 3.2 | 3.2 | 3.2 |
| | MFR(A) | g/10 min | 7 | 7 | 7 | 7 | 7 | 0.5 | 2 | 15 | 30 |
| | Mw/Mn | — | 2.6 | 2.6 | 2.6 | 2.6 | 2.6 | 2.8 | 2.6 | 2.6 | 2.6 |

2. Propylene-Ethylene Copolymer (B)

(1) Measurement Methods of Properties of Copolymer (B)

(1-1) Ethylene Contents E(B1) and E(B)

The ethylene content E(B1) of the polymer component (B1) extracted from a polymerization vessel after the first step of sequential polymerization and the ethylene content E(B) of the propylene-ethylene copolymer (B) obtained after the second step were measured by $^{13}$C-NMR as described above.

(1-2) MFR(B1) and MFR(B)

The MFR(B1) of the propylene-ethylene copolymer component (B1) obtained after the first step and the MFR(B) of the propylene-ethylene copolymer (B) obtained after the second step were measured by the same manner as the MFR of the propylene polymer (A) described above.

(1-3) Identification of Weight Ratios W(B1) and W(B2) of Respective Components

As described above, the weight proportions (wt %) of the propylene polymer component (B1) and the propylene-ethylene copolymer component (B2) are defined by the following equations:

$W(B1)$=production amount in first step/(production amount in first step+production amount in second step)×100

W(B2)=production amount in second step/(production amount in first step+production amount in second step)×100.

As described hereinbelow under [Production Example B-1], upon production of the propylene-ethylene copolymer (B), the whole amount of the polymer obtained after completion of the first step of producing the propylene polymer component (B1) was recovered in a flask to measure the yield in the first step. Among the obtained propylene polymer component (B1), 10 g was kept as a sample and the rest was charged in a polymerization vessel to carry out the second step of producing the propylene-ethylene copolymer component (B2). After completion of the second step, the yield of the obtained propylene-ethylene copolymer (B) was measured. From these results, the production amounts in the first step and the second step were calculated according to the following equations from which results W(B1) and W(B2) were calculated according to the above equations:

Production amount in first step=(yield in first step)−10 g (sampling amount)

Production amount in second step=(yield of propylene-ethylene copolymer(B))−production amount in first step.

(1-4) Ethylene Content E(B2) of Propylene-Ethylene Copolymer Component (B2)

The ethylene content E(B2) of the propylene-ethylene copolymer component (B2) was calculated according to the following equation using the above ethylene contents E(B1) and E(B) and the amounts of the components, W(B1) and W(B2):

$E(B2)=\{E(B)-E(B1)\times(W(B1)/100)\}/(W(B2)/100)$.

(1-5) Melt Flow Rate MFR(B2) of Copolymer Component (B2)

The MFR(B2) of the copolymer component (B2) was calculated according to the following equation using the above MFR(B1), MFR(B), W(B1) and W(B2):

$MFR(B2)=\exp\{(\log_e[MFR(B)]-(W(B1)/100)\times\log_e[MFR(B1)])/(W(B2)/100)\}$ (wherein $\log_e$ is a logarithm to base e).

(2) Production of Propylene-Ethylene Copolymer (B)

Production Example B-1

Analysis of Catalyst Composition

Ti Content:

A sample was precisely weighed, hydrolyzed and then measured based on a colorimetric method. The content for a sample after preliminary polymerization was calculated from the weight excluding the preliminarily polymerized polymer.

Silicon Compound Content:

A sample was precisely weighed and degraded with methanol. The silicon compound concentration in the methanol solution was determined by gas chromatography with comparing to the values of standard samples. The content of the silicon compound in the sample was calculated from the silicon compound concentration and the weight of the sample in methanol. The content for a sample after preliminary polymerization was calculated from the weight excluding the preliminarily polymerized polymer.

Preparation of Preliminarily Polymerized Catalyst (1) Preparation of Solid Component A 10-L autoclave equipped with a stirring device was thoroughly replaced with nitrogen and introduced with 2 L of purified toluene. To the autoclave was charged 200 g of Mg(OEt)$_2$ at room temperature and then gradually added 1 L of TiCl$_4$. The temperature was increased to 90° C. and 50 ml of di-n-butyl phthalate was introduced. The temperature was then increased to 110° C. to allow reaction for 3 hr. The reaction product was thoroughly washed with purified toluene. Purified toluene was then introduced to the autoclave to adjust the whole liquid volume to 2 L. At room temperature, 1 L of TiCl$_4$ was added and the temperature was increased to 110° C. to allow reaction for 2 hr. The reaction product was thoroughly washed with purified toluene. Purified toluene was then introduced to the autoclave to adjust the whole liquid volume to 2 L. At room temperature, 1 L of TiCl$_4$ was added and the temperature was increased to 110° C. to allow reaction for 2 hr. The reaction product was thoroughly washed with purified toluene. Toluene was replaced with purified n-heptane to obtain slurry of the solid component. A sample was taken from the slurry and dried. The analysis thereof revealed the Ti content in the solid component of 2.7 wt %.

Next, a 20-L autoclave equipped with a stirring device was thoroughly replaced with nitrogen and introduced with the slurry of the solid component at the amount corresponding to 100 g of the solid component. Purified n-heptane was introduced to the autoclave to adjust the concentration of the solid component to 25 g/L. SiCl$_4$ (50 ml) was added to allow reaction at 90° C. for 1 hr. The reaction product was thoroughly washed with purified n-heptane.

Purified n-heptane was then introduced to adjust the liquid level to 4 L. To the liquid were added 30 ml of dimethyldivinylsilane, 30 ml of t-BuMeSi(OMe)$_2$ and a diluted solution of Et$_3$Al in n-heptane at the amount corresponding to 80 g of Et$_3$Al to allow reaction at 40° C. for 2 hr. The reaction product was thoroughly washed with purified n-heptane to obtain a solid catalyst. A sample was taken from a part of slurry of the obtained solid catalyst, dried and subjected to an analysis which revealed that the solid catalyst contained 1.2 wt % of Ti and 8.9 wt % of t-BuMeSi(OMe)$_2$.

(2) Preliminary Polymerization

Using the thus obtained solid catalyst, preliminary polymerization was carried out according to the procedure described above. Purified n-heptane was introduced to the above slurry to adjust the concentration of the solid catalyst to 20 g/L. The slurry was cooled to 10° C. followed by addition of a diluted solution of Et$_3$Al in n-heptane at the amount corresponding to 10 g of Et$_3$Al and feeding of 280 g of propylene over 4 hours. After feeding of propylene was completed, the reaction was allowed to proceed for further 30 minutes. The gas phase was thoroughly replaced with nitrogen and the reaction product was thoroughly washed with purified n-heptane. The obtained slurry was recovered from the autoclave and vacuum dried to obtain a preliminarily polymerized catalyst C. The preliminarily polymerized catalyst C contained 2.5 g of polypropylene per 1 g of the solid catalyst. An analysis revealed that the preliminarily polymerized catalyst C excluding polypropylene contained 1.0 wt % of Ti and 8.3 wt % of t-BuMeSi(OMe)$_2$.

Using the obtained preliminarily polymerized catalyst C, the propylene-ethylene copolymer (B) was produced according to the following procedures.

Production of Propylene-Ethylene Copolymer (B)

First Step: Production of Propylene Polymer Component (B1)

A 3-L autoclave equipped with stirring and temperature control devices was thoroughly replaced with propylene, added with a diluted solution of $Et_3Al$ in n-heptane at the amount corresponding to 550 mg of $Et_3Al$, 15 NL of hydrogen, 10.5 g of ethylene and 750 g of liquefied propylene and heated to 60° C. which temperature was maintained. Slurry of the preliminarily polymerized catalyst C (9 mg as the solid catalyst; excluding the weight of the preliminarily polymerized polymer) in n-heptane was pressed in to initiate polymerization. The temperature in the vessel was maintained at 60° C. and polymerization was continued for 30 minutes. Residual monomers were purged to normal pressure and the vessel was thoroughly replaced with purified nitrogen. The whole amount of the propylene polymer component (B1) polymer obtained in the first step was recovered through a Teflon tube under nitrogen flow into a 2-L glass flask which was preliminarily and thoroughly replaced with nitrogen. It was revealed by weighing that 252 g of the propylene polymer component (B1) was obtained in the first step. Analysis was carried out with 10 g of the component.

Second Step: Production of Propylene-Ethylene Copolymer Component (B2)

After completion of the first step, the autoclave used for the polymerization was opened and confirmed that no polymer was left inside. After cleaning, the autoclave was re-assembled and dried while heating under flow of nitrogen. After drying, the autoclave was cooled to room temperature. Thereafter 242 g of the propylene polymer component (B1) which was the remaining from 252 g obtained in the first step after keeping 10 g for analysis was charged into the autoclave though a Teflon tube under nitrogen flow.

Separately in a 20-L autoclave equipped with stirring and temperature control devices, mixed gas used for the second step was prepared. The temperature during preparation was 75° C. and the composition of mixed gas was 19 vol % of ethylene, 81 vol % of propylene and 320 ppm of hydrogen. The mixed gas was fed to the 3-L autoclave in which pressure was increased to 2.0 MPaG to initiate polymerization in the second step. Polymerization was continued at 70° C. for 14 minutes. Thereafter 10 ml of ethanol was introduced to terminate polymerization. The recovered polymer was thoroughly dried in an oven. It was revealed by weighing that 302 g of the propylene-ethylene copolymer (B) was obtained. Among this the propylene polymer component (B1) accounted for 242 g, and thus 60 g of the propylene-ethylene copolymer component (B2) was obtained. Based on these yields, the weight ratios of the propylene polymer component (B1) and the propylene-ethylene copolymer component (B2) were calculated and it was found that W(B1) was 80 wt % and W(B2) was 20 wt-%.

The propylene polymer component (B1) kept after the first step and the propylene-ethylene copolymer (B) obtained after the second step were analyzed to obtain the values for ethylene contents E(B1) and E(B) and MFR(B1) and MFR(B).

The results are shown in Table 4. Based on the values of W(B1), W(B2), E(B1), E(B), MFR(B1) and MFR(B), E(B2) and MFR(B2) were calculated. These values are also indicated in Table 4.

Production Examples B-2 to B-6

Propylene-ethylene copolymers (B) were produced in the same manner as Production Example B-1 except that the polymerization conditions indicated in Table 4 were used. The results are shown in Table 4.

TABLE 4

| | | | Production Example | | | | | |
|---|---|---|---|---|---|---|---|---|
| | | | B-1 | B-2 | B-3 | B-4 | B-5 | B-6 |
| 1st step Polymerization conditions | Catalyst amount | mg | 9 | 12.5 | 11.5 | 11 | 10 | 8.5 |
| | Hydrogen amount | NL | 15 | 7 | 8 | 9 | 11 | 20 |
| | Ethylene amount | g | 10.5 | 0 | 1.5 | 4.1 | 7 | 14 |
| | Polymerization temperature | ° C. | 60 | 60 | 60 | 60 | 60 | 60 |
| | Polymerization time | min | 30 | 30 | 30 | 30 | 30 | 30 |
| 2nd step Polymerization conditions | Propylene concentration | vol % | 81.0 | 81.0 | 81.0 | 81.0 | 81.0 | 81.0 |
| | Ethylene concentration | vol % | 19.0 | 19.0 | 19.0 | 19.0 | 19.0 | 19.0 |
| | Hydrogen concentration | ppm | 320 | 320 | 320 | 320 | 320 | 320 |
| | Polymerization temperature | ° C. | 70 | 70 | 70 | 70 | 70 | 70 |
| | Polymerization time | min | 14 | 10 | 11 | 12 | 13 | 15 |
| Polymerization results | 1st step polymer yield | g | 252 | 253 | 246 | 253 | 254 | 247 |
| | Sampling amount | g | 10 | 10 | 10 | 10 | 10 | 10 |
| | Final polymer yield | g | 302 | 303 | 296 | 303 | 304 | 297 |
| | 2nd step polymer yield | g | 60 | 60 | 60 | 60 | 60 | 60 |

TABLE 4-continued

|  |  |  | Production Example | | | | | |
|---|---|---|---|---|---|---|---|---|
|  |  |  | B-1 | B-2 | B-3 | B-4 | B-5 | B-6 |
| Polymer analysis results | W (B1) | wt % | 80 | 80 | 80 | 80 | 80 | 80 |
|  | W (B2) | wt % | 20 | 20 | 20 | 20 | 20 | 20 |
|  | E (B1) | wt % | 3.7 | 0 | 0.5 | 1.5 | 2.5 | 5 |
|  | E (B2) | wt % | 14 | 14 | 14 | 14 | 14 | 14 |
|  | E (B) | wt % | 5.8 | 2.8 | 3.2 | 4.0 | 4.8 | 6.8 |
|  | MFR (B1) | g/10 min | 20 | 20 | 20 | 20 | 20 | 20 |
|  | MFR (B2) | g/10 min | 0.05 | 0.05 | 0.05 | 0.05 | 0.05 | 0.05 |
|  | MFR (B) | g/10 min | 6.0 | 6.0 | 6.0 | 6.0 | 6.0 | 6.0 |

Production Example B-7

Production of a propylene-ethylene copolymer (B) was initiated in the same manner as Production Example B-1 except that the amount of hydrogen was 25 NL, the amount of ethylene was 20 g and the preliminarily polymerized catalyst C was at the amount corresponding to 8 mg of the solid catalyst (excluding the weight of the preliminarily polymerized polymer). However, the propylene-ethylene copolymer (B) could not be produced because after the first step the propylene polymer component (B1) could not be recovered through a Teflon tube. When the autoclave was opened, most of the propylene polymer component (B1) was agglomerated therein. A sample was taken from the agglomerated matter and the analysis thereof revealed that the ethylene content was 7 wt % and MFR was 20 g/10 min.

Production Examples B-8 to B-13

Propylene-ethylene copolymers (B) were produced in the same manner as Production Example B-1 except that the polymerization conditions indicated in Table 5 were used. The results are shown in Table 5.

TABLE 5

|  |  |  | Production Example | | | | | |
|---|---|---|---|---|---|---|---|---|
|  |  |  | B-8 | B-9 | B-10 | B-11 | B-12 | B-13 |
| 1st step Polymerization conditions | Catalyst amount | mg | 9 | 9 | 9 | 9 | 9 | 7 |
|  | Hydrogen amount | NL | 15 | 15 | 15 | 15 | 15 | 15 |
|  | Ethylene amount | g | 10.5 | 10.5 | 10.5 | 10.5 | 10.5 | 10.5 |
|  | Polymerization temperature | ° C. | 60 | 60 | 60 | 60 | 60 | 60 |
|  | Polymerization time | min | 30 | 30 | 30 | 30 | 30 | 60 |
| 2nd step Polymerization conditions | Propylene concentration | vol % | 92.0 | 89.5 | 86.5 | 72.0 | 63.0 | 55.0 |
|  | Ethylene concentration | vol % | 8.0 | 10.5 | 13.5 | 28.0 | 37.0 | 45.0 |
|  | Hydrogen concentration | ppm | 280 | 290 | 300 | 350 | 370 | 390 |
|  | Polymerization temperature | ° C. | 70 | 70 | 70 | 70 | 70 | 70 |
|  | Polymerization time | min | 19 | 18 | 17 | 11 | 10 | 10 |
| Polymerization results | 1st step polymer yield | g | 252 | 252 | 252 | 252 | 252 | 255 |
|  | Sampling amount | g | 10 | 10 | 10 | 10 | 10 | 10 |
|  | Final polymer yield | g | 302 | 302 | 302 | 302 | 302 | 305 |
|  | 2nd step polymer yield | g | 60 | 60 | 60 | 60 | 60 | 60 |
| Polymer analysis results | W (B1) | wt % | 80 | 80 | 80 | 80 | 80 | 80 |
|  | W (B2) | wt % | 20 | 20 | 20 | 20 | 20 | 20 |
|  | E (B1) | wt % | 3.7 | 3.7 | 3.7 | 3.7 | 3.7 | 3.7 |
|  | E (B2) | wt % | 7 | 9 | 11 | 19 | 23 | 26 |
|  | E (B) | wt % | 4.4 | 4.8 | 5.2 | 6.8 | 7.6 | 8.2 |
|  | MFR (B1) | g/10 min | 20 | 20 | 20 | 20 | 20 | 20 |
|  | MFR (B2) | g/10 min | 0.05 | 0.05 | 0.05 | 0.05 | 0.05 | 0.05 |
|  | MFR (B) | g/10 min | 6.0 | 6.0 | 6.0 | 6.0 | 6.0 | 6.0 |

Production Examples B-14 to B-20

Propylene-ethylene copolymers (B) were produced in the same manner as Production Example B-1 except that the polymerization conditions indicated in Table 6 were used. The results are shown in Table 6.

TABLE 6

| | | | Production Example | | | | | | |
|---|---|---|---|---|---|---|---|---|---|
| | | | B-14 | B-15 | B-16 | B-17 | B-18 | B-19 | B-20 |
| 1st step polymerization conditions | Catalyst amount | mg | 9 | 9 | 9 | 9 | 9 | 7 | 7 |
| | Hydrogen amount | NL | 15 | 15 | 15 | 15 | 15 | 15 | 15 |
| | Ethylene amount | g | 10.5 | 10.5 | 10.5 | 10.5 | 10.5 | 10.5 | 10.5 |
| | Polymerization temperature | °C. | 60 | 60 | 60 | 60 | 60 | 60 | 60 |
| | Polymerization time | min | 30 | 30 | 30 | 30 | 30 | 60 | 60 |
| 2nd step polymerization conditions | Propylene concentration | vol % | 81.0 | 81.0 | 81.0 | 81.0 | 81.0 | 80.9 | 80.8 |
| | Ethylene concentration | vol % | 19.0 | 19.0 | 19.0 | 19.0 | 19.0 | 19.0 | 19.0 |
| | Hydrogen concentration | ppm | 0 | 35 | 100 | 150 | 600 | 1000 | 2000 |
| | Polymerization temperature | °C. | 60 | 70 | 70 | 70 | 70 | 70 | 70 |
| | Polymerization time | min | 67 | 40 | 33 | 21 | 12 | 11 | 11 |
| Polymerization results | 1st step polymer yield | g | 252 | 252 | 252 | 252 | 252 | 255 | 255 |
| | Sampling amount | g | 10 | 10 | 10 | 10 | 10 | 10 | 10 |
| | Final polymer yield | g | 302 | 302 | 302 | 302 | 302 | 305 | 305 |
| | 2nd step polymer yield | g | 60 | 60 | 60 | 60 | 60 | 60 | 60 |
| | W (B1) | wt % | 80 | 80 | 80 | 80 | 80 | 80 | 80 |
| | W (B2) | wt % | 20 | 20 | 20 | 20 | 20 | 20 | 20 |
| Polymer analysis results | E (B1) | wt % | 3.7 | 3.7 | 3.7 | 3.7 | 3.7 | 3.7 | 3.7 |
| | E (B2) | wt % | 14 | 14 | 14 | 14 | 14 | 14 | 14 |
| | E (B) | wt % | 5.8 | 5.8 | 5.8 | 5.8 | 5.8 | 5.8 | 5.8 |
| | MFR (B1) | g/10 min | 20 | 20 | 20 | 20 | 20 | 20 | 20 |
| | MFR (B2) | g/10 min | 0.00027 | 0.0012 | 0.007 | 0.014 | 0.12 | 0.31 | 1.0 |
| | MFR (B) | g/10 min | 2.1 | 2.9 | 4.1 | 4.7 | 7.2 | 8.7 | 11.0 |

Production Examples B-21 to B-24

Propylene-ethylene copolymers (B) were produced in the same manner as Production Example B-1 except that the polymerization conditions indicated in Table 7 were used. In Production Example B-21, only the first step was carried out and the second step was not implemented.

The results are shown in Table 7.

TABLE 7

| | | | Production Example | | | |
|---|---|---|---|---|---|---|
| | | | B-21 | B-22 | B-23 | B-24 |
| 1st step polymerization conditions | Catalyst amount | mg | 9 | 8 | 8 | 7 |
| | Hydrogen amount | NL | 15 | 15 | 15 | 15 |
| | Ethylene amount | g | 10.5 | 10.5 | 10.5 | 10.5 |
| | Polymerization temperature | °C. | 60 | 60 | 60 | 60 |
| | Polymerization time | min | 30 | 120 | 30 | 30 |
| 2nd step polymerization conditions | Propylene concentration | vol % | — | 81.0 | 81.0 | 81.0 |
| | Ethylene concentration | vol % | — | 19.0 | 19.0 | 19.0 |
| | Hydrogen concentration | ppm | — | 320 | 320 | 320 |
| | Polymerization temperature | °C. | — | 70 | 70 | 70 |
| | Polymerization time | min | — | 10 | 24 | 38 |
| Polymerization results | 1st step polymer yield | g | 252 | 317 | 224 | 196 |
| | Sampling amount | g | — | 10 | 10 | 10 |
| | Final polymer yield | g | — | 343 | 304 | 309 |
| | 2nd step polymer yield | g | — | 36 | 90 | 123 |
| | W (B1) | wt % | — | 90 | 70 | 60 |
| | W (B2) | wt % | — | 10 | 30 | 40 |
| Polymer analysis results | E (B1) | wt % | 3.7 | 3.7 | 3.7 | 3.7 |
| | E (B2) | wt % | — | 14 | 14 | 14 |
| | E (B) | wt % | — | 4.7 | 6.8 | 7.8 |
| | MFR (B1) | g/10 min | 20 | 20 | 20 | 20 |
| | MFR (B2) | g/10 min | — | 0.05 | 0.05 | 0.05 |
| | MFR (B) | g/10 min | — | 11.0 | 3.3 | 1.8 |

Production Examples B-25 to B-31

Propylene-ethylene copolymers (B) were produced in the same manner as Production Example B-1 except that the polymerization conditions indicated in Table 8 were used. The results are shown in Table 8.

TABLE 8

| | | | Production Example | | | | | | |
|---|---|---|---|---|---|---|---|---|---|
| | | | B-25 | B-26 | B-27 | B-28 | B-29 | B-30 | B-31 |
| 1st step Polymerization conditions | Catalyst amount | mg | 11 | 11 | 9 | 8 | 8 | 8 | 8 |
| | Hydrogen amount | NL | 1.1 | 2.5 | 4.5 | 29 | 31 | 36 | 46 |
| | Ethylene amount | g | 8 | 8.5 | 9 | 11 | 12 | 12 | 12 |
| | Polymerization temperature | °C. | 60 | 60 | 60 | 60 | 60 | 60 | 60 |
| | Polymerization temperature | min | 120 | 60 | 60 | 30 | 30 | 30 | 30 |
| 2nd step polymerization conditions | Propylene concentration | vol % | 81.0 | 81.0 | 81.0 | 81.0 | 81.0 | 81.0 | 81.0 |
| | Ethylene concentration | vol % | 19.0 | 19.0 | 19.0 | 19.0 | 19.0 | 19.0 | 19.0 |
| | Hydrogen concentration | ppm | 320 | 320 | 320 | 320 | 320 | 320 | 320 |
| | Polymerization temperature | °C. | 70 | 70 | 70 | 70 | 70 | 70 | 70 |
| | Polymerization time | min | 12 | 12 | 14 | 16 | 16 | 17 | 17 |
| Polymerization results | 1st step polymer yield | g | 244 | 261 | 257 | 251 | 257 | 263 | 269 |
| | Sampling amount | g | 10 | 10 | 10 | 10 | 10 | 10 | 10 |
| | Final polymer yield | g | 294 | 312 | 307 | 301 | 307 | 317 | 323 |
| | 2nd step polymer yield | g | 60 | 61 | 60 | 60 | 60 | 64 | 64 |
| | W (B1) | wt % | 80 | 80 | 80 | 80 | 80 | 80 | 80 |
| | W (B2) | wt % | 20 | 20 | 20 | 20 | 20 | 20 | 20 |
| Polymer analysis results | E (B1) | wt % | 3.7 | 3.7 | 3.7 | 3.7 | 3.7 | 3.7 | 3.7 |
| | E (B2) | wt % | 14 | 14 | 14 | 14 | 14 | 14 | 14 |
| | E (B) | wt % | 5.8 | 5.8 | 5.8 | 5.8 | 5.8 | 5.8 | 5.8 |
| | MFR (B1) | g/10 min | 0.47 | 1.4 | 3.5 | 38 | 57 | 73 | 101 |
| | MFR (B2) | g/10 min | 0.05 | 0.05 | 0.05 | 0.05 | 0.05 | 0.05 | 0.05 |
| | MFR (B) | g/10 min | 0.3 | 0.7 | 1.5 | 10.1 | 13.9 | 17.0 | 22.0 |

Example 1-1

1. Compounding

PP(A-1) obtained in Production Example A-1 as the propylene polymer (A) and PP(B-1) obtained in Production Example B-1 as the propylene-ethylene copolymer (B) were weighed so as to be 95 wt % and 5 wt % respectively and charged in a Henschel mixer. To 100 parts by weight of the mixture of the component (A) and the component (B) were added the following antioxidant and neutralizing agent at the amounts indicated below and thoroughly mixed.

Antioxidant:
Tetrakis{methylene-3-(3',5'-di-t-butyl-4'-hydroxyphenyl) propionate}methane (BASF Japan, trade name "IRGANOX 1010") 500 wt ppm
Tris(2,4-di-t-butylphenyl)phosphite (BASF Japan, trade name "Irgafos 168") 500 wt ppm
Neutralizing Agent: Calcium Stearate 500 wt Ppm 2. Granulation A resin was melted and mixed in a "KZW" twin-screw extruder from Technovel Corporation having a screw diameter of 15 mm under the conditions of extruder temperature=200° C., screw rotation speed=300 rpm and discharge rate=3.0 kg/h and extruded from a strand die. The extruded molten resin was drawn while cooling and solidifying in a cooling water bath and the strand was cut with a strand cutter to obtain propylene-ethylene copolymer resin composition starting material pellets each having a diameter of 3 mm and a length of 2 mm.

3. Film Moulding

The obtained propylene-ethylene copolymer resin composition starting material pellets were extruded on an extruder having a nozzle diameter of 30 mm ϕ under the conditions of resin temperature of 180° C. and discharge rate of 8 kg/h and introduced into a monolayer T-die heated to 180° C. and adjusted to a die width of 150 mm and a lip opening of 0.8 mm to carry out melt extrusion. A shear velocity at the die wall surface calculated from the formula (1) shown below was 186 sec$^{-1}$.

The melt-extruded film was cooled and solidified on a cooling roll regulated to 30° C. and rotating at 30 m/min to obtain a monolayer unstretched film with a thickness of 40 μm.

[Math. 1]

$$\dot{\gamma} = \frac{6Q}{748 \times wh^2} \quad \text{Formula (1)}$$

In the formula (1), symbols have the following meanings:
[Math. 2]
$\dot{\gamma}_{Shear\ velocity}$ (sec$^{-1}$)
$Q_{Discharge\ rate}$ (kg/s)
$w_{Die\ width}$ (m)
$h_{Lip\ opening}$ (m)
Melt density: 748 (kg/m$^3$).

4. Film Appearance Evaluation (1) Surface roughness

Surface roughness refers to an appearance defect produced on the surface of films as shown in FIG. 1. In FIG. 1, the arrow indicates the MD direction.

The obtained unstretched film was visually observed by 10 people. The film which was judged to have no wave pattern by 8 or more people was rated as ○, the film which was judged to have no wave pattern by 5 or more and 7 or less people was rated as Δ and the film which was judged to have a wave pattern by 6 or more people was rated as x. The films rated as ○ and Δ do not pose practical problems. The films rated as x had inferior transparency.

(2) Oriented Crystal

Oriented crystal refers to a phenomenon where the whole film is clouded and visible crystal masses (white lumps) are occasionally observed at the outlet of the die. When oriented crystallization is extremely developed, solid-liquid separation is exhibited at the outlet of the die. When the draft ratio (ratio between the cooling roll take-up speed and the resin discharge speed) is increased to 1.5 or more on this occasion, the liquid phase is cracked and thus the film is perforated or torn.

The obtained unstretched film was visually observed by 10 people. The film which was judged to have no white lumps or cloudiness by 8 or more people was rated as ○, the film which was judged to have no white lumps or cloudiness by 5 or more and 7 or less people was rated as Δ and the film which was judged to have white lumps or cloudiness by 6 or more people was rated as x. The films rated as ○ and Δ do not pose practical problems. Some of the films rated as x were perforated or torn.

(3) Fisheye (FE)

The obtained unstretched film was visually observed and the presence or absence of fisheye was evaluated. The film with almost no fisheye and having excellent appearance was rated as ○, the film having a few fisheyes was rated as Δ and the film with many fisheyes and thus having significantly impaired appearance was rated as x.

(4) Dispersion

When a resin has impaired dispersion, a few streaks may be produced in the flow direction of a film.

The obtained unstretched film was visually observed by 10 people. The film which was judged to have no streak by 8 or more people was rated as ○, the film which was judged to have no streak by 5 or more and 7 or less people was rated as Δ and the film which was judged to have streaks overall by 6 or more people was rated as x. The films rated as ○ and Δ do not pose practical problems.

5. Film Physical Property Evaluation (1) HAZE(Transparency) Measurement

A single film was measured according to JIS K7136-2000 on a haze mater. The lower the measured value is, the higher the transparency is.

(2) Tensile Elastic Modulus (Young's Modulus)

The tensile elastic modulus (Young's modulus) of a film in the flow direction of the film (MD) was determined according to JIS K7127-1989 under the following conditions:

Sample shape: strip

Sample length: 150 mm

Sample width: 15 mm

Distance between chucks: 100 mm

Crosshead velocity: 1 mm/min.

(3) Heat Seal Temperature (HS Temperature)

Obtained unstretched films were sealed in the direction perpendicular to the melt-extrusion direction (MD) with heat sealing bars respectively having 10 mm×200 mm in the range from 80° C. to 170° C. under the heat seal conditions of pressure of 1 kg/cm$^2$ and duration of 1 second. A specimen having a width of 15 mm was cut from the thus sealed sample, detached on a tensile tester at a tension rate of 500 mm/min and the temperature at which the strength of 300 g was achieved was determined.

The evaluation results of the film are shown in Table 9.

The obtained film was prepared from the propylene resin composition starting material fulfilling all the properties defined in the present invention, and thus had significantly excellent film appearance and transparency, rigidity and heat sealability.

Examples 1-2 to 1-5

Compounding, granulation, moulding, appearance evaluation and physical property evaluation were carried out in the same manner as Example 1-1 except that the ratios of the propylene polymer (A) and the propylene-ethylene copolymer (B) were varied as indicated in Table 9. The results are shown in Table 9.

In Example 1-5, some defects in dispersion were observed although the level thereof did not pose practical problems. Other than this, all evaluation results were satisfactory.

Comparative Examples 1-1 to 1-3

Compounding, granulation, moulding, appearance evaluation and physical property evaluation were carried out in the same manner as Example 1 except that the ratios of the propylene polymer (A) and the propylene-ethylene copolymer (B) were varied as indicated in Table 9. The results are shown in Table 9.

Comparative Examples 1-1 and 1-2 which respectively contained an insufficient amount of propylene-ethylene copolymer (B) had significant surface roughness and the films were not feasible to evaluation. Comparative Example 1-3 which contained an excessive amount of propylene-ethylene copolymer (B) occasionally showed streaks resulting from deterioration in dispersion and the film was not feasible to evaluation.

TABLE 9

|  |  | Ex. 1-1 | Ex. 1-2 | Ex. 1-3 | Ex. 1-4 | Ex. 1-5 | Comp. Ex. 1-1 | Comp. Ex. 1-2 | Comp. Ex. 1-3 |
|---|---|---|---|---|---|---|---|---|---|
| Polymer (A) | Type | PP (A-1) | PP (A-1) | PP (A-1) | PP (A-1) | PP (A-1) | PP (A-1) | PP (A-1) | PP (A-1) |
|  | wt % | 95 | 90 | 80 | 70 | 65 | 100 | 98 | 60 |
|  | E (A) | 3.2 | 3.2 | 3.2 | 3.2 | 3.2 | 3.2 | 3.2 | 3.2 |
|  | MFR (A) | 7 | 7 | 7 | 7 | 7 | 7 | 7 | 7 |
|  | Mw/Mn | 2.6 | 2.6 | 2.6 | 2.6 | 2.6 | 2.6 | 2.6 | 2.6 |
| Copolymer (B) | Type | PP (B-1) | PP (B-1) | PP (B-1) | PP (B-1) | PP (B-1) | PP (B-1) | PP (B-1) | PP (B-1) |
|  | wt % | 5 | 10 | 20 | 30 | 35 | 0 | 2 | 40 |
|  | E (B) | 5.8 | 5.8 | 5.8 | 5.8 | 5.8 | 5.8 | 5.8 | 5.8 |
|  | MFR (B) | 6.0 | 6.0 | 6.0 | 6.0 | 6.0 | 6.0 | 6.0 | 6.0 |
| 1st stage | E (B1) | 3.7 | 3.7 | 3.7 | 3.7 | 3.7 | 3.7 | 3.7 | 3.7 |
|  | MFR (B1) | 20 | 20 | 20 | 20 | 20 | 20 | 20 | 20 |
| 2nd stage | E (B2) | 14 | 14 | 14 | 14 | 14 | 14 | 14 | 14 |
|  | MFR (B2) | 0.05 | 0.05 | 0.05 | 0.05 | 0.05 | 0.05 | 0.05 | 0.05 |
|  | W (B2) | 20 | 20 | 20 | 20 | 20 | 20 | 20 | 20 |
| Surface roughness |  | ○ | ○ | ○ | ○ | ○ | x | x | — |
| Oriented crystal |  | ○ | ○ | ○ | ○ | ○ | — | — | — |
| FE |  | ○ | ○ | ○ | ○ | ○ | — | — | — |
| Dispersion |  | ○ | ○ | ○ | ○ | Δ | — | — | x |
| HAZE |  | 1.4 | 1.4 | 1.2 | 1.3 | 1.5 | — | — | — |
| Young's modulus |  | 434 | 428 | 417 | 410 | 400 | — | — | — |
| HS temperature |  | 114 | 116 | 120 | 124 | 126 | — | — | — |

Examples 1-6 to 1-13

Compounding, granulation, moulding, appearance evaluation and physical property evaluation were carried out in the same manner as Example 1-1 except that PP (A-2) to PP (A-9) obtained in Production Examples A-2 to A-9 were used instead of the propylene polymer (A) in Example 1-1 and the ratio between the propylene polymer (A) and the propylene-ethylene copolymer (B) was 90:10. The results are shown in Table 10.

All evaluation results were satisfactory.

TABLE 10

|  |  | Ex. 1-6 | Ex. 1-7 | Ex. 1-8 | Ex. 1-9 | Ex. 1-10 | Ex. 1-11 | Ex. 1-12 | Ex. 1-13 |
|---|---|---|---|---|---|---|---|---|---|
| Polymer (A) | Type | PP (A-2) | PP (A-3) | PP (A-4) | PP (A-5) | PP (A-6) | PP (A-7) | PP (A-8) | PP (A-9) |
|  | wt % | 90 | 90 | 90 | 90 | 90 | 90 | 90 | 90 |
|  | E (A) | 0 | 0.58 | 1.75 | 4 | 3.2 | 3.2 | 3.2 | 3.2 |
|  | MFR (A) | 7 | 7 | 7 | 7 | 0.5 | 2 | 15 | 30 |
|  | Mw/Mn | 2.6 | 2.6 | 2.6 | 2.6 | 2.8 | 2.6 | 2.6 | 2.6 |
| Copolymer (B) | Type | PP (B-1) | PP (B-1) | PP (B-1) | PP (B-1) | PP (B-1) | PP (B-1) | PP (B-1) | PP (B-1) |
|  | wt % | 10 | 10 | 10 | 10 | 10 | 10 | 10 | 10 |
|  | E (B) | 5.8 | 5.8 | 5.8 | 5.8 | 5.8 | 5.8 | 5.8 | 5.8 |
|  | MFR (B) | 6.0 | 6.0 | 6.0 | 6.0 | 6.0 | 6.0 | 6.0 | 6.0 |
| 1st stage | E (B1) | 3.7 | 3.7 | 3.7 | 3.7 | 3.7 | 3.7 | 3.7 | 3.7 |
|  | MFR (B1) | 20 | 20 | 20 | 20 | 20 | 20 | 20 | 20 |
| 2nd stage | E (B2) | 14 | 14 | 14 | 14 | 14 | 14 | 14 | 14 |
|  | MFR (B2) | 0.05 | 0.05 | 0.05 | 0.05 | 0.05 | 0.05 | 0.05 | 0.05 |
|  | W (B2) | 20 | 20 | 20 | 20 | 20 | 20 | 20 | 20 |
| Surface roughness |  | ○ | ○ | ○ | ○ | ○ | ○ | ○ | ○ |
| Oriented crystal |  | ○ | ○ | ○ | ○ | ○ | ○ | ○ | ○ |
| FE |  | ○ | ○ | ○ | ○ | ○ | ○ | ○ | ○ |
| Dispersion |  | ○ | ○ | ○ | ○ | ○ | ○ | ○ | ○ |
| HAZE |  | 1.7 | 1.7 | 1.5 | 1.2 | 1.2 | 1.2 | 1.1 | 1.2 |
| Young's modulus |  | 580 | 560 | 486 | 350 | 480 | 430 | 435 | 442 |
| HS temperature |  | 137 | 133 | 125 | 110 | 122 | 116 | 116 | 116 |

Examples 1-14 to 1-18

Compounding, granulation, moulding, appearance evaluation and physical property evaluation were carried out in the same manner as Example 1-1 except that PP(B-2) to PP(B-6) obtained in Production Examples B-2 to B-6 were used instead of the propylene-ethylene copolymer (B) in Example 1-1 and the ratio between the propylene polymer (A) and the propylene-ethylene copolymer (B) was 90:10. The results are shown in Table 11.

All evaluation results were satisfactory.

TABLE 11

|  |  | Ex. 1-14 | Ex. 1-15 | Ex. 1-16 | Ex. 1-17 | Ex. 1-18 |
|---|---|---|---|---|---|---|
| Polymer (A) | Type | PP (A-1) | PP (A-1) | PP (A-1) | PP (A-1) | PP (A-1) |
|  | wt % | 90 | 90 | 90 | 90 | 90 |
|  | E (A) | 3.2 | 3.2 | 3.2 | 3.2 | 3.2 |
|  | MFR (A) | 7 | 7 | 7 | 7 | 7 |
|  | Mw/Mn | 2.6 | 2.6 | 2.6 | 2.6 | 2.6 |
| Copolymer (B) | Type | PP (B-2) | PP (B-3) | PP (B-4) | PP (B-5) | PP (B-6) |
|  | wt % | 10 | 10 | 10 | 10 | 10 |
|  | E (B) | 2.8 | 3.2 | 4.0 | 4.8 | 6.8 |
|  | MFR (B) | 6.0 | 6.0 | 6.0 | 6.0 | 6.0 |
| 1st stage | E (B1) | 0 | 0.5 | 1.5 | 2.5 | 5 |
|  | MFR (B1) | 20 | 20 | 20 | 20 | 20 |
| 2nd stage | E (B2) | 14 | 14 | 14 | 14 | 14 |
|  | MFR (B2) | 0.05 | 0.05 | 0.05 | 0.05 | 0.05 |
|  | W(B2) | 20 | 20 | 20 | 20 | 20 |
| Surface roughness |  | ○ | ○ | ○ | ○ | ○ |
| Oriented crystal |  | ○ | ○ | ○ | ○ | ○ |
| FE |  | ○ | ○ | ○ | ○ | ○ |
| Dispersion |  | ○ | ○ | ○ | ○ | ○ |
| HAZE |  | 1.9 | 1.8 | 1.6 | 1.5 | 1.1 |
| Young's modulus |  | 446 | 443 | 440 | 433 | 430 |
| HS temperature |  | 119 | 119 | 117 | 116 | 116 |

Examples 1-19 to 1-22

Compounding, granulation, moulding, appearance evaluation and physical property evaluation were carried out in the same manner as Example 1-1 except that PP(B-9) to PP(B-12) obtained in Production Examples B-9 to B-12 were used instead of the propylene-ethylene copolymer (B) in Example 1-1 and the ratio between the propylene polymer (A) and the propylene-ethylene copolymer (B) was 90:10. The results are shown in Table 12.

Although some white lumps resulting from oriented crystals were observed in Example 1-19, the level thereof did not cause problems upon use. Although some surface roughness was observed in Example 1-22, the level thereof did not cause problems upon use. Other than these, all evaluation results were satisfactory.

Comparative Examples 1-4 to 1-5

Compounding, granulation, moulding, appearance evaluation and physical property evaluation were carried out in the same manner as Example 1-1 except that PP(B-8) and PP(B-13) obtained in Production Examples B-8 and B-13 were used instead of the propylene-ethylene copolymer (B) in Example 1-1 and the ratio between the propylene polymer (A) and the propylene-ethylene copolymer (B) was 90:10.

In Comparative Example 1-4, significant oriented crystals were exhibited and the film was torn at the outlet of the die, resulting in failure of obtainment of the film. In Comparative Example 1-5, significant surface roughness was produced and the film was not feasible to evaluation. The results are shown in Table 12.

TABLE 12

|  |  | Ex. 1-19 | Ex. 1-20 | Ex. 1-21 | Ex. 1-22 | Comp. Ex. 1-4 | Comp. Ex. 1-5 |
|---|---|---|---|---|---|---|---|
| Polymer (A) | Type | PP (A-1) | PP (A-1) | PP (A-1) | PP (A-1) | PP (A-1) | PP (A-1) |
|  | wt % | 90 | 90 | 90 | 90 | 90 | 90 |
|  | E (A) | 3.2 | 3.2 | 3.2 | 3.2 | 3.2 | 3.2 |
|  | MFR (A) | 7 | 7 | 7 | 7 | 7 | 7 |
|  | Mw/Mn | 2.6 | 2.6 | 2.6 | 2.6 | 2.6 | 2.6 |
| Copolymer (B) | Type | PP (B-9) | PP (B-10) | PP (B-11) | PP (B-12) | PP (B-8) | PP (B-13) |
|  | wt % | 10 | 10 | 10 | 10 | 10 | 10 |
|  | E (B) | 4.8 | 5.2 | 6.8 | 7.6 | 4.4 | 8.2 |
|  | MFR (B) | 6.0 | 6.0 | 6.0 | 6.0 | 6.0 | 6.0 |
| 1st stage | E (B1) | 3.7 | 3.7 | 3.7 | 3.7 | 3.7 | 3.7 |
|  | MFR (B1) | 20 | 20 | 20 | 20 | 20 | 20 |
| 2nd stage | E (B2) | 9 | 11 | 19 | 23 | 7 | 26 |
|  | MFR (B2) | 0.05 | 0.05 | 0.05 | 0.05 | 0.05 | 0.05 |
|  | W(B2) | 20 | 20 | 20 | 20 | 20 | 20 |
| Surface roughness |  | ○ | ○ | ○ | Δ | — | x |
| Oriented crystal |  | Δ | ○ | ○ | ○ | x | — |
| FE |  | ○ | ○ | ○ | ○ | — | — |
| Dispersion |  | ○ | ○ | ○ | ○ | — | — |
| HAZE |  | 2.3 | 1.2 | 1.1 | 2.5 | — | — |
| Young's modulus |  | 438 | 425 | 420 | 440 | — | — |
| HS temperature |  | 116 | 116 | 116 | 116 | — | — |

Examples 1-23 to 1-28

Compounding, granulation, moulding, appearance evaluation and physical property evaluation were carried out in the same manner as Example 1-1 except that PP(B-14) to PP(B-19) obtained in Production Examples B-14 to B-19 were used instead of the propylene-ethylene copolymer (B) in Example 1-1 and the ratio between the propylene polymer (A) and the propylene-ethylene copolymer (B) was 90:10. The results are shown in Table 13.

Although some white lumps resulting from oriented crystals were observed in Example 1-23, the level thereof did not cause problems upon use. Although some surface roughness was observed in Example 1-28, the level thereof did not cause problems upon use. Other than these, all evaluation results were satisfactory.

Comparative Example 1-6

Compounding, granulation, moulding, appearance evaluation and physical property evaluation were carried out in the same manner as Example 1-1 except that PP(B-20) obtained in Production Example B-20 was used instead of the propylene-ethylene copolymer (B) in Example 1-1 and the ratio between the propylene polymer (A) and the propylene-ethylene copolymer (B) was 90:10.

Significant surface roughness was produced and the film was not feasible to evaluation.

The results are shown in Table 13.

Examples 1-29 to 1-30

Compounding, granulation, moulding, appearance evaluation and physical property evaluation were carried out in the same manner as Example 1-1 except that PP(B-22) to PP(B-23) obtained in Production Examples B-22 to B-23 were used instead of the propylene-ethylene copolymer (B) in Example 1-1 and the ratio between the propylene polymer (A) and the propylene-ethylene copolymer (B) was 90:10. The results are shown in Table 14.

All evaluation results were satisfactory.

Comparative Examples 1-7 to 1-8

Compounding, granulation, moulding, appearance evaluation and physical property evaluation were carried out in the same manner as Example 1-1 except that PP(B-21) and PP(B-24) obtained in Production Examples B-21 and B-24 were used instead of the propylene-ethylene copolymer (B) in Example 1-1 and the ratio between the propylene polymer (A) and the propylene-ethylene copolymer (B) was 90:10. The results are shown in Table 14.

In Comparative Example 1-7, significant surface roughness was produced and the film was not feasible to evaluation. Comparative Example 1-8 which contained an excessive amount of copolymer component (B2) in the propylene-ethylene copolymer (B) occasionally showed streaks resulting from deterioration in dispersion and the film was not feasible to evaluation.

TABLE 13

| | | Ex. 1-23 | Ex. 1-24 | Ex. 1-25 | Ex. 1-26 | Ex. 1-27 | Ex. 1-28 | Comp. Ex. 1-6 |
|---|---|---|---|---|---|---|---|---|
| Polymer (A) | Type | PP (A-1) | PP (A-1) | PP (A-1) | PP (A-1) | PP (A-1) | PP (A-1) | PP (A-1) |
| | wt % | 90 | 90 | 90 | 90 | 90 | 90 | 90 |
| | E (A) | 3.2 | 3.2 | 3.2 | 3.2 | 3.2 | 3.2 | 3.2 |
| | MFR (A) | 7 | 7 | 7 | 7 | 7 | 7 | 7 |
| | Mw/Mn | 2.6 | 2.6 | 2.6 | 2.6 | 2.6 | 2.6 | 2.6 |
| Copolymer (B) | Type | PP (B-14) | PP (B-15) | PP (B-16) | PP (B-17) | PP (B-18) | PP (B-19) | PP (B-20) |
| | wt % | 10 | 10 | 10 | 10 | 10 | 10 | 10 |
| | E (B) | 5.8 | 5.8 | 5.8 | 5.8 | 5.8 | 5.8 | 5.8 |
| | MFR (B) | 2.1 | 2.9 | 4.1 | 4.7 | 7.2 | 8.7 | 11.1 |
| 1st stage | E (B1) | 3.7 | 3.7 | 3.7 | 3.7 | 3.7 | 3.7 | 3.7 |
| | MFR (B1) | 20 | 20 | 20 | 20 | 20 | 20 | 20 |
| 2nd stage | E (B2) | 14 | 14 | 14 | 14 | 14 | 14 | 14 |
| | MFR (B2) | 0.00027 | 0.0012 | 0.007 | 0.014 | 0.12 | 0.31 | 1.0 |
| | W (B2) | 20 | 20 | 20 | 20 | 20 | 20 | 20 |
| Surface roughness | | ○ | ○ | ○ | ○ | ○ | Δ | x |
| Oriented crystal | | Δ | ○ | ○ | ○ | ○ | ○ | — |
| FE | | ○ | ○ | ○ | ○ | ○ | ○ | — |
| Dispersion | | ○ | ○ | ○ | ○ | ○ | ○ | — |
| HAZE | | 1.2 | 1.4 | 1.3 | 1.2 | 1.8 | 2.4 | — |
| Young's modulus | | 420 | 435 | 430 | 413 | 430 | — | — |
| HS temperature | | 116 | 116 | 116 | 116 | 116 | 116 | — |

TABLE 14

|  |  | Ex. 1-29 | Ex. 1-30 | Comp. Ex. 1-7 | Comp. Ex. 1-8 |
|---|---|---|---|---|---|
| Polymer (A) | Type | PP (A-1) | PP (A-1) | PP (A-1) | PP (A-1) |
|  | wt % | 90 | 90 | 90 | 90 |
|  | E (A) | 3.2 | 3.2 | 3.2 | 3.2 |
|  | MFR (A) | 7 | 7 | 7 | 7 |
|  | Mw/Mn | 2.6 | 2.6 | 2.6 | 2.6 |
| Copolymer (B) | Type | PP (B-22) | PP (B-23) | PP (B-21) | PP (B-24) |
|  | wt % | 10 | 10 | 10 | 10 |
|  | E (B) | 4.7 | 6.8 | 3.7 | 7.8 |
|  | MFR (B) | 11.0 | 3.3 | 20 | 1.8 |
| 1st stage | E (B1) | 3.7 | 3.7 | 3.7 | 3.7 |
|  | MFR (B1) | 20 | 20 | 20 | 20 |
| 2nd stage | E (B2) | 14 | 14 | — | 14 |
|  | MFR (B2) | 0.05 | 0.05 | — | 0.05 |
|  | W (B2) | 10 | 30 | 0 | 40 |
| Surface roughness |  | ○ | ○ | x | — |
| Oriented crystal |  | ○ | ○ | — | — |
| FE |  | ○ | ○ | — | — |
| Dispersion |  | ○ | ○ | — | x |
| HAZE |  | 1.1 | 1.0 | — | — |
| Young's modulus |  | 440 | 413 | — | — |
| HS temperature |  | 117 | 117 | — | — |

Examples 1-31 to 1-35

Compounding, granulation, moulding, appearance evaluation and physical property evaluation were carried out in the same manner as Example 1-1 except that PP(B-26) to PP(B-30) obtained in Production Examples B-26 to B-30 were used instead of the propylene-ethylene copolymer (B) in Example 1-1 and the ratio between the propylene polymer (A) and the propylene-ethylene copolymer (B) was 90:10. The results are shown in Table 15.

Although Example 1-35 showed fine fisheyes resulting from defects in dispersion of the high molecular weight component, the level thereof did not cause problems upon use. Other than this, all evaluation results were satisfactory.

Comparative Examples 1-9 to 1-10

Compounding, granulation, moulding, appearance evaluation and physical property evaluation were carried out in the same manner as Example 1-1 except that PP(B-25) and PP(B-31) obtained in Production Examples B-25 and B-31 were used instead of the propylene-ethylene copolymer (B) in Example 1-1 and the ratio between the propylene polymer (A) and the propylene-ethylene copolymer (B) was 90:10. The results are shown in Table 15.

Comparative Example 1-9 which contained the propylene-ethylene copolymer (B) having low MFR(B) and thereby having deteriorated dispersion with the propylene polymer (A) occasionally showed streaks resulting from deterioration in dispersion and the film was not feasible to evaluation. Comparative Example 1-10 contained the propylene-ethylene copolymer (B) having an increased difference between MFR(B1) and MFR(B2) and thus high molecular weight gels were produced, resulting in significant amount of fisheyes and the film was not feasible to evaluation.

TABLE 15

|  |  | Ex. 1-31 | Ex. 1-32 | Ex. 1-33 | Ex. 1-34 | Ex. 1-35 | Comp. Ex. 1-9 | Comp. Ex. 1-10 |
|---|---|---|---|---|---|---|---|---|
| Polymer (A) | Type | PP (A-1) | PP (A-1) | PP (A-1) | PP (A-1) | PP (A-1) | PP (A-1) | PP (A-1) |
|  | wt % | 90 | 90 | 90 | 90 | 90 | 90 | 90 |
|  | E (A) | 3.2 | 3.2 | 3.2 | 3.2 | 3.2 | 3.2 | 3.2 |
|  | Tm (A) | 125 | 125 | 125 | 125 | 125 | 125 | 125 |
|  | MFR (A) | 7 | 7 | 7 | 7 | 7 | 7 | 7 |
|  | Mw/Mn | 2.6 | 2.6 | 2.6 | 2.6 | 2.6 | 2.6 | 2.6 |
| Copolymer (B) | Type | PP (B-26) | PP (B-27) | PP (B-28) | PP (B-29) | PP (B-30) | PP (B-25) | PP (B-31) |
|  | wt % | 10 | 10 | 10 | 10 | 10 | 10 | 10 |
|  | E (B) | 5.8 | 5.8 | 5.8 | 5.8 | 5.8 | 5.8 | 5.8 |
|  | MFR (B) | 0.7 | 1.5 | 10.1 | 13.9 | 17.0 | 0.3 | 22.0 |
| 1st stage | E (B1) | 3.7 | 3.7 | 3.7 | 3.7 | 3.7 | 3.7 | 3.7 |
|  | MFR (B1) | 1.4 | 3.5 | 38 | 57 | 73 | 0.47 | 101 |
| 2nd stage | E (B2) | 14 | 14 | 14 | 14 | 14 | 14 | 14 |
|  | MFR (B2) | 0.05 | 0.05 | 0.05 | 0.05 | 0.05 | 0.05 | 0.05 |
|  | W (B2) | 20 | 20 | 20 | 20 | 20 | 20 | 20 |
| Surface roughness |  | ○ | ○ | ○ | ○ | ○ | — | — |
| Oriented crystal |  | ○ | ○ | ○ | ○ | ○ | — | — |
| FE |  | ○ | ○ | ○ | ○ | Δ | — | x |
| Dispersion |  | ○ | ○ | ○ | ○ | ○ | x | — |
| HAZE |  | 1.4 | 1.3 | 1.3 | 1.2 | 1.4 | — | — |
| Young's modulus |  | 430 | 425 | 432 | 426 | 430 | — | — |
| HS temperature |  | 116 | 116 | 116 | 116 | 116 | — | — |

From comparisons between Examples 1-1 to 1-35 and Comparative Examples 1-1 to 1-10, it is found that novel propylene-ethylene copolymer resin compositions of the present invention fulfilling the requirements allow production of films which have excellent extrusion property without appearance defects such as surface roughness or white lumps resulting from oriented crystals even with extrusion moulding at a temperature as low as about 180° C. and exhibit excellent properties such as excellent transparency, high rigidity and excellent heat sealability.

<Laminate Stretched Film>

Examples and Comparative Examples for laminate stretched films including surface layers formed with propylene-ethylene copolymer resin compositions including the above propylene polymer (A) and the propylene-ethylene copolymer (B) are described hereinbelow.

Propylene Resin for Substrate Layer

The following propylene resin PP(C-1) which was commercially available was used for the substrate layer.

PP(C-1):

Commercial product, "Novatec PP FL203D" from Japan Polypropylene Corporation

Propylene homopolymer, MFR=3.0 g/10 min, melting point: 162° C.

Example 2-1

1. Compounding

PP(A-1) obtained in Production Example A-1 as the propylene polymer (A) and PP(B-i) obtained in Production Example B-1 as the propylene-ethylene copolymer (B) were weighed so as to be 95% by weight and 5% by weight respectively and charged in a Henschel mixer. To 100 parts by weight of the mixture of the propylene polymer (A) and the propylene-ethylene copolymer (B) were added the following antioxidant and neutralizing agent at the amounts indicated below and thoroughly mixed.

Antioxidant:
Tetrakis{methylene-3-(3',5'-di-t-butyl-4'-hydroxyphenyl) propionate}methane ("IRGANOX 1010" described above) 500 wt ppm
Tris(2,4-di-t-butylphenyl)phosphite ("Irgafos 168" described above) 500 wt ppm
Neutralizing Agent: Calcium Stearate 500 wt Ppm 2. Granulation A resin was melted and mixed in a "KZW" twin-screw extruder from Technovel Corporation having a screw diameter of 15 mm under the conditions of extruder temperature=200° C., screw rotation speed=300 rpm and discharge rate=3.0 kg/h and extruded from a strand die. The extruded molten resin was drawn while cooling and solidifying in a cooling water bath and the strand was cut with a strand cutter to obtain propylene-ethylene copolymer resin composition starting material pellets each having a diameter of 3 mm and a length of 2 mm.

3. Production of Propylene Laminate Stretched Film (i) Moulding of Unstretched Sheet For moulding, a three-different-layer T-die adjusted to a die width of 265 mm and a lip opening of 1.5 mm was used which was connected to a surface layer extruder-1 having a nozzle diameter of 30 mm, a surface layer extruder-2 having a nozzle diameter of 30 mm and an intermediate layer extruder-3 having a nozzle diameter of 75 mm. The obtained propylene-ethylene copolymer resin composition starting material pellets were charged in the extruder-1 while PP(C-1) as a resin for a substrate layer was charged in the extruder-2 and the extruder-3 and melt extrusion was carried out at 240° C.

The extruder-2 and the extruder-3 were adjusted so as to have a discharge rate of 3 kg/h and 24 kg/h, respectively. The extruder-1 was adjusted to the discharge rate so as to provide a sample for film appearance evaluation having the thickness ratio of layers contained in the unstretched sheet of sealant layer: substrate layer=1:19 or to provide a sample for physical property evaluation having the thickness ratio of sealant layer:substrate layer=1:9.

The shear velocity at the die wall surface calculated from the above formula (1) was 118 sec$^{-1}$ upon preparation of a sample for film appearance evaluation and 123 sec$^{-1}$ upon preparation of a sample for physical property evaluation.

The melt-extruded film was regulated to 30° C. and cooled and solidified on a cooling roll rotating at 3 m/min to obtain an unstretched sheet having a thickness of about 1 mm.

(ii) Moulding of Stretched Film

The obtained unstretched sheet was then stretched at a draw ratio of 5 times in the MD direction at 105° C. on a tenter-type sequential biaxial stretching device, preheated to 160° C. and stretched at a draw ratio of 9 times in the TD direction at 158° C. in a tenter furnace and subjected to thermosetting at 158° C. while relaxation at 5% to obtain a biaxially stretched propylene laminate film having 3 layers of 2 different polymers.

The total thickness of the sample for film appearance evaluation was 19 μm and the total thickness of the sample for physical property evaluation was 20 μm.

4. Film Appearance Evaluation (1) Surface Roughness, Interface Roughness

Figure 2:
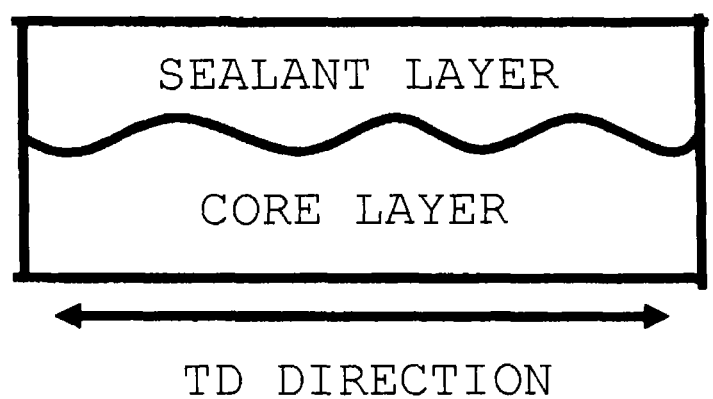
FIG. 2 is a section view showing an example of interface roughness at the laminate interface of a laminate film.
Figure 3:
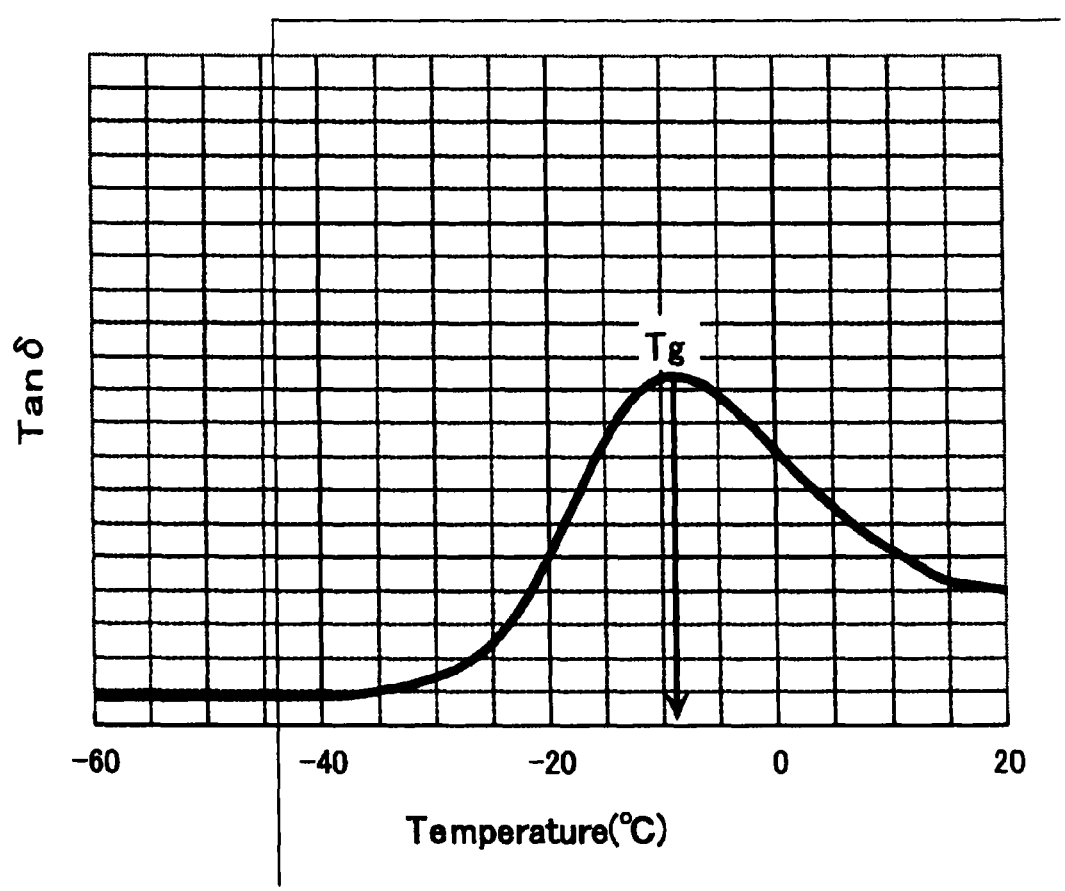
FIG. 3 is a graph showing a temperature-loss tangent (tan δ) curve obtained in Dynamic Mechanical Analysis (DMA) of a pressed sheet of a propylene-ethylene copolymer (D-1) obtained in Production Example (D-1), which shows an example of a single peak.
Figure 4:
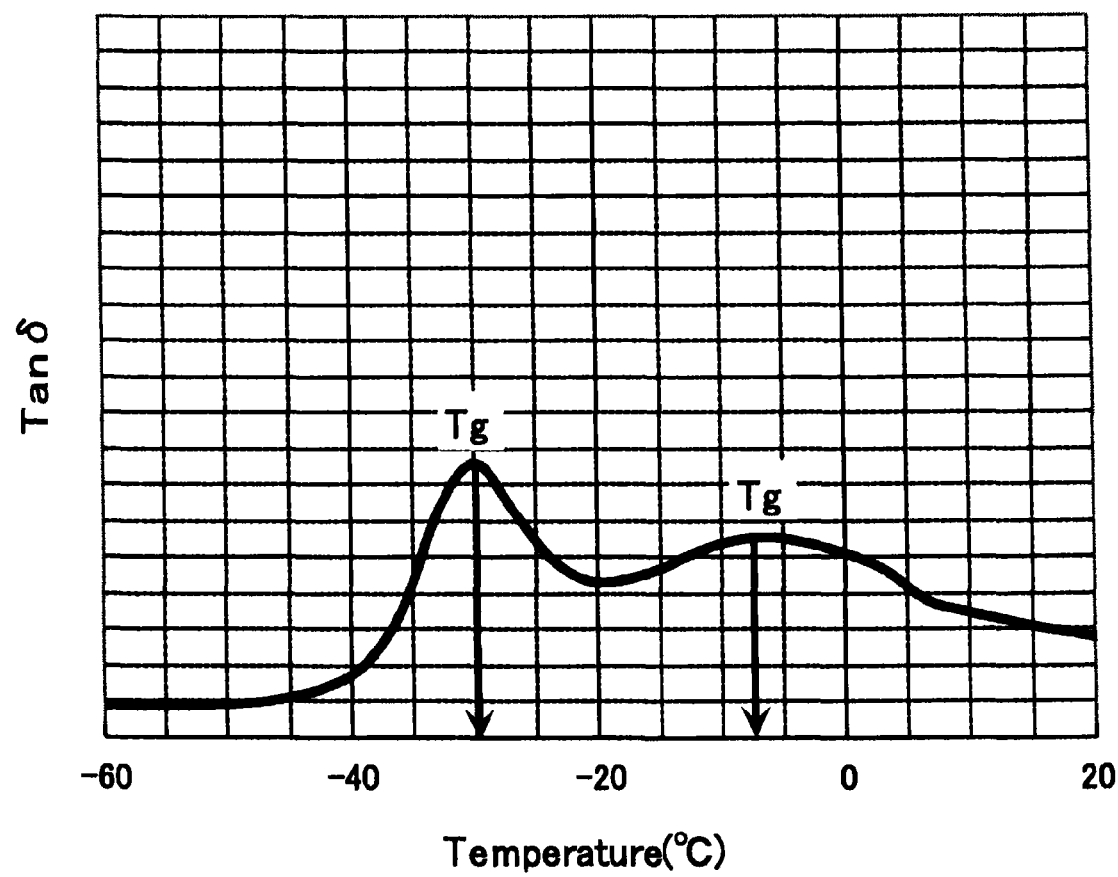
FIG. 4 is a graph showing a temperature-loss tangent (tan δ) curve obtained in Dynamic Mechanical Analysis (DMA)

Surface roughness refers to an appearance defect produced on the surface of films as shown in FIG. 1 and interface roughness refers to an appearance defect produced at an interface between a sealant layer (surface layer) and a core layer (substrate layer) of laminate films as shown in FIG. 2. In FIG. 1, the arrow indicates the MD direction.

The surface layer (sealant layer) and the substrate layer of the sample for film appearance evaluation obtained according to the above method were respectively wet with immersion oil (refractive index: 1.515, 25° C.) and a wave pattern which was not eliminated upon visual inspection was identified as a wave pattern due to interface roughness.

A wave pattern which was eliminated upon the same inspection was identified as a wave pattern due to surface roughness. With regard to interface roughness and surface roughness, the film which was judged to have no wave pattern by 8 or more people among 10 people carrying out the visual observation was rated as ○, the film which was judged to have no wave pattern by 5 or more and 7 or less people was rated as Δ and the film which was judged to have a wave pattern by 6 or more people was rated as x. The films rated as ○ and Δ do not pose practical problems. The films rated as x had inferior transparency.

(2) Whitening

The sample for film appearance evaluation obtained according to the above method was visually observed by 10 people. The film which was judged to have no cloudiness by 8 or more people was rated as ○, the film which was judged to have no cloudiness and to have no practical problem by 5 or more and 7 or less people was rated as Δ and the film which was judged to have cloudiness by 6 or more people was rated as x. The films rated as ○ and Δ do not pose practical problems.

(3) Fisheye (FE)

The sample for film appearance evaluation obtained according to the above method was visually observed and the presence or absence of fisheye was evaluated. The film with almost no fisheye and having excellent appearance was rated as ○, the film having a few fisheyes was rated as Δ and the film with many fisheyes and thus having significantly impaired appearance was rated as x.

(4) Dispersion

The unstretched sheet obtained by moulding of the unstretched sheet as described above was visually observed by 10 people. The film which was judged to have no streak by 8 or more people was rated as ○, the film which was judged to have no streak by 5 or more and 7 or less people was rated as Δ and the film which was judged to have streaks overall by 6 or more people was rated as x. The films rated as ○ and Δ do not pose practical problems.

5. Film Physical Property Evaluation (1) Heat Seal Temperature (300 g/15 mm)

The sealant layers in the obtained sample for physical property evaluation were heated with 5° C. intervals in the range from 60° C. to 170° C. and sealed in the direction perpendicular to the melt-extrusion direction (MD) with heat sealing bars respectively having 10 mm×200 mm under the heat seal conditions of pressure of 1 kg/cm² and duration of 1 second. A specimen having a width of 15 mm was cut from the thus sealed sample, detached on a tensile tester at a tension rate of 500 mm/min and the temperature at which the strength of 300 g was achieved was determined.

(2) Shrinkage (%) at heat seal temperature

A strip specimen having a width of 15 mm and a length of 200 mm (L0) was excised from the sample for physical property evaluation so as to be parallel to the melt-extrusion direction (MD) and placed in a Geer type oven adjusted to the heat seal temperature and the length (L) in the MD direction after 24 hours was determined. From L0 and L measured, the shrinkage (%) was determined according to the following equation:

Shrinkage=[(L0−L)/L0]×100.

(3) Appearance of Heat Seal Portion

On a heat seal device adjusted to the heat seal temperature (300 g/15 mm), heat sealing was carried out in the same manner as described for the measurement of the heat seal temperature (300 g/15 mm). The obtained heat seal product was visually evaluated for appearance of the heat seal portion.

The film which was judged to have no deformation at the seal portion by 8 or more people was rated as ○, the film which was judged to have slight deformation at the seal portion and have no practical problems by 5 or more and 7 or less people was rated as Δ and the film which was judged to have deformation wrinkles overall and pose practical problems by 6 or more people was rated as x.

(4) Hot Tack Strength (Gf/15 mm)

The hot tack strength was measured on the sample for physical property evaluation according to ASTM F1921-98 B under the conditions indicated below. The measurement was carried out so that the longitudinal direction of the sealing bars was perpendicular to the melt extrusion direction (MD). The maximum hot tack strength (HT1) and the hot tack strength (HT2) measured at a temperature 5° C. higher than the seal temperature at which the maximum hot tack strength was exhibited were determined and the difference between HT1 and HT2 was used for evaluation of hot tack strength.

Measurement instrument: SL-10 from Lako Tool & Mfg
Sample shape: strip
Sample width: 15 mm
Sample length: 13 inches
Measurement temperature: 60° C. to 160° C. with 5° C. intervals
Shape of sealing bars: flat
Width of sealing bars: 0.5 mm
Sealing pressure: 0.3 N/mm²
Heating: identical temperature for the upper and lower bars
Detachment rate: 200 mm/s
Cooling time: 100 ms
Reading of strength: maximum strength measured between 20 mm and 30 mm The evaluation results of the obtained laminate stretched film are shown in Table 16.

The obtained film was prepared from the propylene resin composition starting material fulfilling all the properties defined in the present invention, and thus had satisfactory results such as excellent film appearance, a HS temperature as sufficiently low as 127° C., no shrinkage wrinkles at the HS portion and a hot tack strength difference of as low as 28 gf/15 mm.

Examples 2-2 to 2-5

Compounding, granulation, moulding, appearance evaluation and physical property evaluation were carried out in the same manner as Example 2-1 except that the ratios of the propylene polymer (A) and the propylene-ethylene copolymer (B) were varied as indicated in Table 16. The results are shown in Table 16.

Although some defects in dispersion were observed for Example 2-5, the level thereof did not cause practical problems. Other than this, all evaluation results were satisfactory.

Comparative Examples 2-1 to 2-3

Compounding, granulation, moulding, appearance evaluation and physical property evaluation were carried out in the same manner as Example 2-1 except that the ratios of the propylene polymer (A) and the propylene-ethylene copolymer (B) were varied as indicated in Table 16. The results are shown in Table 16.

Comparative Example 2-1 which did not contain the propylene-ethylene copolymer (B) had significant surface roughness as well as significant interface roughness and the film obtained had impaired appearance. The film also had the hot tack strength difference as high as 48 gf/15 mm which result caused practical problems as a film for packaging. Comparative Example 2-2 which contained an insufficient amount of propylene-ethylene copolymer (B) did not exhibit improvement in interface roughness and the film obtained had impaired appearance. Comparative Example 2-3 which contained an excessive amount of propylene-ethylene copolymer (B) occasionally showed streaks resulting from deterioration in dispersion and the film was not feasible to evaluation.

TABLE 16

|  |  | Ex. 2-1 | Ex. 2-2 | Ex. 2-3 | Ex. 2-4 | Ex. 2-5 | Comp. Ex. 2-1 | Comp. Ex. 2-2 | Comp. Ex. 2-3 |
|---|---|---|---|---|---|---|---|---|---|
| Polymer (A) | Type | PP (A-1) | PP (A-1) | PP (A-1) | PP (A-1) | PP (A-1) | PP (A-1) | PP (A-1) | PP (A-1) |
|  | wt % | 95 | 90 | 80 | 70 | 65 | 100 | 98 | 60 |
|  | E (A) | 3.2 | 3.2 | 3.2 | 3.2 | 3.2 | 3.2 | 3.2 | 3.2 |
|  | MFR (A) | 7 | 7 | 7 | 7 | 7 | 7 | 7 | 7 |
|  | Mw/Mn | 2.6 | 2.6 | 2.6 | 2.6 | 2.6 | 2.6 | 2.6 | 2.6 |
| Copolymer (B) | Type | PP (B-1) | PP (B-1) | PP (B-1) | PP (B-1) | PP (B-1) | PP (B-1) | PP (B-1) | PP (B-1) |
|  | wt % | 5 | 10 | 20 | 30 | 35 | 0 | 2 | 40 |
|  | E (B) | 5.8 | 5.8 | 5.8 | 5.8 | 5.8 | 5.8 | 5.8 | 5.8 |
|  | MFR (B) | 6.0 | 6.0 | 6.0 | 6.0 | 6.0 | 6.0 | 6.0 | 6.0 |
| 1st stage | E (B1) | 3.7 | 3.7 | 3.7 | 3.7 | 3.7 | 3.7 | 3.7 | 3.7 |
|  | MFR (B1) | 20 | 20 | 20 | 20 | 20 | 20 | 20 | 20 |
| 2nd stage | E (B2) | 14 | 14 | 14 | 14 | 14 | 14 | 14 | 14 |
|  | MFR (B2) | 0.05 | 0.05 | 0.05 | 0.05 | 0.05 | 0.05 | 0.05 | 0.05 |
|  | W (B2) | 20 | 20 | 20 | 20 | 20 | 20 | 20 | 20 |
| Surface roughness |  | ○ | ○ | ○ | ○ | ○ | x | Δ | — |
| Interface roughness |  | ○ | ○ | ○ | ○ | ○ | x | x | — |
| Whitening |  | ○ | ○ | ○ | ○ | ○ | — | — | — |
| FE |  | ○ | ○ | ○ | ○ | ○ | — | — | — |
| Dispersion |  | ○ | ○ | ○ | ○ | Δ | — | — | x |
| HS temperature |  | 127 | 130 | 135 | 137 | 142 | 125 | 125 | — |
| Shrinkage at HS temperature |  | 3.1 | 4.0 | 4.6 | 4.6 | 7.1 | 3.0 | 3.0 | — |
| Appearance of HS portion |  | ○ | ○ | ○ | ○ | ○ | ○ | ○ | — |
| Hot tack strength | HT1 | 187 | 195 | 186 | 192 | 188 | 196 | 187 | — |
|  | HT2 | 159 | 172 | 168 | 170 | 160 | 148 | 145 | — |
|  | HT1 − HT2 | 28 | 23 | 18 | 22 | 28 | 48 | 42 | — |

Examples 2-6 to 2-11

Compounding, granulation, moulding, appearance evaluation and physical property evaluation were carried out in the same manner as Example 2-1 except that PP(A-3) to PP(A-8) obtained in Production Examples A-3 to A-5 and A-7 to A-9 were used instead of the propylene polymer (A) in Example 2-1 and the ratio between the propylene polymer (A) and the propylene-ethylene copolymer (B) was 90:10. The results are shown in Table 17.

Although the HS temperature was slightly high as 147° C. and some shrinkage wrinkles were produced at the HS portion for Example 2-6, the level thereof did not cause practical problems. In Examples 2-7 to 2-11, all evaluation results were satisfactory.

Example 2-37

Compounding, granulation, moulding, appearance evaluation and physical property evaluation were carried out in the same manner as Example 2-1 except that PP(A-2) obtained in Production Example A-2 was used instead of the propylene polymer (A) in Example 2-1 and the ratio between the propylene polymer (A) and the propylene-ethylene copolymer (B) was 90:10. The results are shown in Table 17. The obtained film had no problem in appearance. However, the HS temperature exceeded 150° C. and significant shrinkage wrinkles were observed at the HS portion which caused some practical problems.

Example 2-38

Compounding, granulation, moulding, appearance evaluation and physical property evaluation were carried out in the same manner as Example 2-1 except that PP(A-3) obtained in Production Example A-3 was used instead of the propylene polymer (A) in Example 2-1 and the ratio between the propylene polymer (A) and the propylene-ethylene copolymer (B) was 80:20. The results are shown in Table 17. The obtained film had no problem in appearance. However, the HS temperature exceeded 150° C. and significant shrinkage wrinkles were observed at the HS portion which caused some practical problems.

TABLE 17

|  |  | Ex. 2-6 | Ex. 2-7 | Ex. 2-8 | Ex. 2-9 | Ex. 2-10 | Ex. 2-11 | Ex. 2-37 | Ex. 2-38 |
|---|---|---|---|---|---|---|---|---|---|
| Polymer (A) | Type | PP (A-3) | PP (A-4) | PP (A-5) | PP (A-7) | PP (A-8) | PP (A-9) | PP (A-2) | PP (A-3) |
|  | wt % | 90 | 90 | 90 | 90 | 90 | 90 | 90 | 80 |
|  | E (A) | 0.58 | 1.75 | 4 | 3.2 | 3.2 | 3.2 | 0 | 0.58 |
|  | MFR (A) | 7 | 7 | 7 | 2 | 15 | 30 | 7 | 7 |
|  | Mw/Mn | 2.6 | 2.6 | 2.6 | 2.6 | 2.6 | 2.6 | 2.6 | 2.6 |
| Copolymer (B) | Type | PP (B-1) | PP (B-1) | PP (B-1) | PP (B-1) | PP (B-1) | PP (B-1) | PP (B-1) | PP (B-1) |
|  | wt % | 10 | 10 | 10 | 10 | 10 | 10 | 10 | 20 |

TABLE 17-continued

|  |  | Ex. 2-6 | Ex. 2-7 | Ex. 2-8 | Ex. 2-9 | Ex. 2-10 | Ex. 2-11 | Ex. 2-37 | Ex. 2-38 |
|---|---|---|---|---|---|---|---|---|---|
|  | E (B) | 5.8 | 5.8 | 5.8 | 5.8 | 5.8 | 5.8 | 5.8 | 5.8 |
|  | MFR (B) | 6.0 | 6.0 | 6.0 | 6.0 | 6.0 | 6.0 | 6.0 | 6.0 |
| 1st stage | E (B1) | 3.7 | 3.7 | 3.7 | 3.7 | 3.7 | 3.7 | 3.7 | 3.7 |
|  | MFR (B1) | 20 | 20 | 20 | 20 | 20 | 20 | 20 | 20 |
| 2nd stage | E (B2) | 14 | 14 | 14 | 14 | 14 | 14 | 14 | 14 |
|  | MFR (B2) | 0.05 | 0.05 | 0.05 | 0.05 | 0.05 | 0.05 | 0.05 | 0.05 |
|  | W (B2) | 20 | 20 | 20 | 20 | 20 | 20 | 20 | 20 |
| Surface roughness |  | ○ | ○ | ○ | ○ | ○ | ○ | ○ | ○ |
| Interface roughness |  | ○ | ○ | ○ | ○ | ○ | ○ | ○ | ○ |
| Whitening |  | ○ | ○ | ○ | ○ | ○ | ○ | ○ | ○ |
| FE |  | ○ | ○ | ○ | ○ | ○ | ○ | ○ | ○ |
| Dispersion |  | ○ | ○ | ○ | ○ | ○ | ○ | ○ | ○ |
| HS temperature |  | 147 | 139 | 124 | 130 | 130 | 130 | 151 | 152 |
| Shrinkage at HS temperature |  | 11.2 | 5.4 | 1.8 | 4.0 | 4.0 | 4.0 | 13.6 | 13.8 |
| Appearance of HS portion |  | Δ | ○ | ○ | ○ | ○ | ○ | x | x |
| Hot tack strength | HT1 | 180 | 186 | 195 | 196 | 184 | 181 | 182 | 182 |
|  | HT2 | 140 | 160 | 168 | 173 | 151 | 148 | 145 | 143 |
|  | HT1 − HT2 | 40 | 26 | 27 | 23 | 33 | 33 | 37 | 39 |

Examples 2-12 to 2-16

Compounding, granulation, moulding, appearance evaluation and physical property evaluation were carried out in the same manner as Example 2-1 except that PP(B-2) to PP(B-6) obtained in Production Examples B-2 to B-6 were used instead of the component (B) in Example 2-1 and the ratio between the propylene polymer (A) and the propylene-ethylene copolymer (B) was 90:10. The results are shown in Table 18.

The obtained films were prepared from the propylene resin composition starting materials fulfilling all the properties defined in the present invention, and thus had excellent appearance and satisfactory physical properties.

TABLE 18

|  |  | Ex. 2-12 | Ex. 2-13 | Ex. 2-14 | Ex. 2-15 | Ex. 2-16 |
|---|---|---|---|---|---|---|
| Polymer (A) | Type | PP (A-1) | PP (A-1) | PP (A-1) | PP (A-1) | PP (A-1) |
|  | wt % | 90 | 90 | 90 | 90 | 90 |
|  | E (A) | 3.2 | 3.2 | 3.2 | 3.2 | 3.2 |
|  | MFR (A) | 7 | 7 | 7 | 7 | 7 |
|  | Mw/Mn | 2.6 | 2.6 | 2.6 | 2.6 | 2.6 |
| Copolymer (B) | Type | PP (B-2) | PP (B-3) | PP (B-4) | PP (B-5) | PP (B-6) |
|  | wt % | 10 | 10 | 10 | 10 | 10 |
|  | E (B) | 2.8 | 3.2 | 4.0 | 4.8 | 6.8 |
|  | MFR (B) | 6.0 | 6.0 | 6.0 | 6.0 | 6.0 |
| 1st stage | E (B1) | 0 | 0.5 | 1.5 | 2.5 | 5 |
|  | MFR (B1) | 20 | 20 | 20 | 20 | 20 |
| 2nd stage | E (B2) | 14 | 14 | 14 | 14 | 14 |
|  | MFR (B2) | 0.05 | 0.05 | 0.05 | 0.05 | 0.05 |
|  | W (32) | 20 | 20 | 20 | 20 | 20 |
| Surface roughness |  | ○ | ○ | ○ | ○ | ○ |
| Interface roughness |  | ○ | ○ | ○ | ○ | ○ |
| Whitening |  | ○ | ○ | ○ | ○ | ○ |
| FE |  | ○ | ○ | ○ | ○ | ○ |
| Dispersion |  | ○ | ○ | ○ | ○ | ○ |
| HS temperature |  | 137 | 137 | 133 | 131 | 130 |
| Shrinkage at HS temperature |  | 4.6 | 4.6 | 4.3 | 4.1 | 4.0 |
| Appearance of HS portion |  | ○ | ○ | ○ | ○ | ○ |
| Hot tack strength | HT1 | 183 | 181 | 188 | 187 | 185 |
|  | HT2 | 159 | 160 | 165 | 163 | 162 |
|  | HT1 − HT2 | 24 | 21 | 23 | 24 | 23 |

Examples 2-17 to 2-20

Compounding, granulation, moulding, appearance evaluation and physical property evaluation were carried out in the same manner as Example 2-1 except that PP(B-9) to PP(B-12) obtained in Production Examples B-9 to B-12 were used instead of the propylene-ethylene copolymer (B) in Example 2-1 and the ratio between the propylene polymer (A) and the propylene-ethylene copolymer (B) was 90:10. The results are shown in Table 19.

Although Example 2-17 showed some cloudy patterns resulting from oriented crystals in the tenter furnace, the level thereof did not cause problems upon use. Although Example 2-20 showed some interface roughness, the level thereof did not cause problems upon use. Other than these, all evaluation results were satisfactory.

Comparative Example 2-4 to 2-5

Compounding, granulation, moulding, appearance evaluation and physical property evaluation were carried out in the same manner as Example 2-1 except that PP(B-8) and PP(B-13) obtained in Production Examples B-8 and B-13 were used instead of the propylene-ethylene copolymer (B) in Example 2-1 and the ratio between the propylene polymer (A) and the propylene-ethylene copolymer (B) was 90:10.

Comparative Example 2-4 showed a significant amount of oriented crystals in the tenter furnace and produced patchy cloudy patterns all over the film which appearance was not practical. The film could not be obtained. Comparative Example 2-5 had significant surface roughness and interface roughness and had decreased transparency overall which appearance was not practical. The results are shown in Table 19.

TABLE 19

|  |  | Ex. 2-17 | Ex. 2-18 | Ex. 2-19 | Ex. 2-20 | Comp. Ex. 2-4 | Comp. Ex. 2-5 |
|---|---|---|---|---|---|---|---|
| Polymer (A) | Type | PP (A-1) | PP (A-1) | PP (A-1) | PP (A-1) | PP (A-1) | PP (A-1) |
|  | wt % | 90 | 90 | 90 | 90 | 90 | 90 |
|  | E (A) | 3.2 | 3.2 | 3.2 | 3.2 | 3.2 | 3.2 |
|  | MFR (A) | 7 | 7 | 7 | 7 | 7 | 7 |
|  | Mw/Mn | 2.6 | 2.6 | 2.6 | 2.6 | 2.6 | 2.6 |
| Copolymer (B) | Type | PP (B-9) | PP (B-10) | PP (B-11) | PP (B-12) | PP (B-8) | PP (B-13) |
|  | wt % | 10 | 10 | 10 | 10 | 10 | 10 |
|  | E (B) | 4.8 | 5.2 | 6.8 | 7.6 | 4.4 | 8.2 |
|  | MFR (B) | 6.0 | 6.0 | 6.0 | 6.0 | 6.0 | 6.0 |
| 1st stage | E (B1) | 3.7 | 3.7 | 3.7 | 3.7 | 3.7 | 3.7 |
|  | MFR (B1) | 20 | 20 | 20 | 20 | 20 | 20 |
| 2nd stage | E (B2) | 9 | 11 | 19 | 23 | 7 | 26 |
|  | MFR (B2) | 0.05 | 0.05 | 0.05 | 0.05 | 0.05 | 0.05 |
|  | W (B2) | 20 | 20 | 20 | 20 | 20 | 20 |
| Surface roughness |  | ○ | ○ | ○ | ○ | ○ | x |
| Interface roughness |  | ○ | ○ | ○ | Δ | ○ | x |
| Whitening |  | Δ | ○ | ○ | ○ | x | — |
| FE |  | ○ | ○ | ○ | ○ | ○ | — |
| Dispersion |  | ○ | ○ | ○ | ○ | ○ | — |
| HS temperature |  | 130 | 130 | 130 | 130 | 130 | 130 |
| Shrinkage at HS temperature |  | 4.0 | 4.0 | 4.0 | 4.0 | 4.0 | 4.0 |
| Appearance of HS portion |  | ○ | ○ | ○ | ○ | ○ | ○ |
| Hot tack strength | HT1 | 183 | 188 | 186 | 179 | 180 | 183 |
|  | HT2 | 150 | 165 | 166 | 148 | 138 | 158 |
|  | HT1 − HT2 | 33 | 23 | 20 | 31 | 42 | 25 |

Examples 2-21 to 2-26

Compounding, granulation, moulding, appearance evaluation and physical property evaluation were carried out in the same manner as Example 2-1 except that PP(B-14) to PP(B-19) obtained in Production Examples B-14 to B-19 were used instead of the component (B) in Example 2-1 and the ratio between the propylene polymer (A) and the propylene-ethylene copolymer (B) was 90:10. The results are shown in Table 20.

Although Example 2-21 showed uneven cloudiness resulting from oriented crystals, the level thereof did not cause problems upon use. Although Example 2-26 showed some surface roughness and interface roughness, the level thereof did not cause problems upon use. Other than these, all evaluation results were satisfactory.

Comparative Example 2-6

Compounding, granulation, moulding, appearance evaluation and physical property evaluation were carried out in the same manner as Example 2-1 except that PP(B-20) obtained in Production Example B-20 was used instead of the propylene-ethylene copolymer (B) in Example 2-1 and the ratio between the propylene polymer (A) and the propylene-ethylene copolymer (B) was 90:10.

The obtained film showed significant surface roughness and interface roughness which appearance was not practical. The results are shown in Table 20.

TABLE 20

|  |  |  | Ex. 2-21 | Ex. 2-22 | Ex. 2-23 | Ex. 2-24 | Ex. 2-25 | Ex. 2-26 | Comp. Ex. 2-6 |
|---|---|---|---|---|---|---|---|---|---|
| Polymer (A) | Type |  | PP (A-1) | PP (A-1) | PP (A-1) | PP (A-1) | PP (A-1) | PP (A-1) | PP (A-1) |
|  | wt % |  | 90 | 90 | 90 | 90 | 90 | 90 | 90 |
|  | E (A) |  | 3.2 | 3.2 | 3.2 | 3.2 | 3.2 | 3.2 | 3.2 |
|  | MFR (A) |  | 7 | 7 | 7 | 7 | 7 | 7 | 7 |
|  | Mw/Mn |  | 2.6 | 2.6 | 2.6 | 2.6 | 2.6 | 2.6 | 2.6 |
| Copolymer (B) | Type |  | PP (B-14) | PP (B-15) | PP (B-16) | PP (B-17) | PP (B-18) | PP (B-19) | PP (B-20) |
|  | wt % |  | 10 | 10 | 10 | 10 | 10 | 10 | 10 |
|  | E (B) |  | 5.8 | 5.8 | 5.8 | 5.8 | 5.8 | 5.8 | 5.8 |
|  | MFR (B) |  | 2.1 | 2.9 | 4.1 | 4.7 | 7.2 | 8.7 | 11.1 |
|  | 1st stage | E (B1) | 3.7 | 3.7 | 3.7 | 3.7 | 3.7 | 3.7 | 3.7 |
|  |  | MFR (B1) | 20 | 20 | 20 | 20 | 20 | 20 | 20 |
|  | 2nd stage | E (B2) | 14 | 14 | 14 | 14 | 14 | 14 | 14 |
|  |  | MFR (B2) | 0.00027 | 0.0012 | 0.007 | 0.014 | 0.12 | 0.31 | 1.0 |
|  |  | W (B2) | 20 | 20 | 20 | 20 | 20 | 20 | 20 |
| Surface roughness |  |  | ○ | ○ | ○ | ○ | ○ | Δ | x |
| Interface roughness |  |  | ○ | ○ | ○ | ○ | ○ | Δ | x |

TABLE 20-continued

|  |  | Ex. 2-21 | Ex. 2-22 | Ex. 2-23 | Ex. 2-24 | Ex. 2-25 | Ex. 2-26 | Comp. Ex. 2-6 |
|---|---|---|---|---|---|---|---|---|
| Whitening | | Δ | ○ | ○ | ○ | ○ | ○ | — |
| FE | | ○ | ○ | ○ | ○ | ○ | ○ | — |
| Dispersion | | ○ | ○ | ○ | ○ | ○ | ○ | — |
| HS temperature | | 130 | 130 | 130 | 130 | 130 | 130 | 130 |
| Shrinkage at HS temperature | | 4.0 | 4.0 | 4.0 | 4.0 | 4.0 | 4.0 | 4.0 |
| Appearance of HS portion | | ○ | ○ | ○ | ○ | ○ | ○ | ○ |
| Hot tack | HT1 | 193 | 191 | 185 | 183 | 186 | 189 | 183 |
| strength | HT2 | 171 | 170 | 160 | 159 | 161 | 163 | 158 |
|  | HT1 − HT2 | 22 | 21 | 25 | 24 | 25 | 26 | 25 |

Examples 2-27 to 2-28

Compounding, granulation, moulding, appearance evaluation and physical property evaluation were carried out in the same manner as Example 2-1 except that PP(B-22) to PP(B-23) obtained in Production Examples B-22 to B-23 were used instead of the propylene-ethylene copolymer (B) in Example 2-1 and the ratio between the propylene polymer (A) and the propylene-ethylene copolymer (B) was 90:10. The results are shown in Table 21.

All evaluation results were satisfactory.

Comparative Examples 2-7 to 2-8

Compounding, granulation, moulding, appearance evaluation and physical property evaluation were carried out in the same manner as Example 2-1 except that PP(B-21) and PP(B-24) obtained in Production Examples B-21 and B-24 were used instead of the propylene-ethylene copolymer (B) in Example 2-1 and the ratio between the propylene polymer (A) and the propylene-ethylene copolymer (B) was 90:10. The results are shown in Table 21.

Comparative Example 2-7 showed significant surface roughness and interface roughness and thus the practical film was not obtained. Comparative Example 2-8 which contained the propylene-ethylene copolymer (B) containing an excessive amount of propylene-ethylene copolymer component (B2) occasionally showed streaks resulting from deterioration in dispersion and produced frequent torn films in the tenter furnace, resulting in failure of obtainment of film feasible to evaluation.

TABLE 21

|  |  |  | Ex. 2-27 | Ex. 2-28 | Comp. Ex. 2-7 | Comp. Ex. 2-8 |
|---|---|---|---|---|---|---|
| Polymer (A) | Type |  | PP (A-1) | PP (A-1) | PP (A-1) | PP (A-1) |
|  | wt % |  | 90 | 90 | 90 | 90 |
|  | E (A) |  | 3.2 | 3.2 | 3.2 | 3.2 |
|  | MFR (A) |  | 7 | 7 | 7 | 7 |
|  | Mw/Mn |  | 2.6 | 2.6 | 2.6 | 2.6 |
| Copolymer (B) | Type |  | PP (B-22) | PP (B-23) | PP (B-21) | PP (B-24) |
|  | wt % |  | 10 | 10 | 10 | 10 |
|  | E (B) |  | 4.7 | 6.8 | 3.7 | 7.8 |
|  | MFR (B) |  | 11.0 | 3.3 | 20 | 1.8 |
|  | 1st stage | E (B1) | 3.7 | 3.7 | 3.7 | 3.7 |
|  |  | MFR (B1) | 20 | 20 | 20 | 20 |
|  | 2nd stage | E (B2) | 14 | 14 | — | 14 |
|  |  | MFR (B2) | 0.05 | 0.05 | — | 0.05 |
|  |  | W (B2) | 10 | 30 | 0 | 40 |
| Surface roughness |  |  | ○ | ○ | x | — |
| Interface roughness |  |  | ○ | ○ | x | — |

TABLE 21-continued

|  |  | Ex. 2-27 | Ex. 2-28 | Comp. Ex. 2-7 | Comp. Ex. 2-8 |
|---|---|---|---|---|---|
| Whitening | | ○ | ○ | — | — |
| FE | | ○ | ○ | — | — |
| Dispersion | | ○ | ○ | — | x |
| HS temperature | | 130 | 130 | 130 | — |
| Shrinkage at HS temperature | | 4.0 | 4.0 | 4.0 | — |
| Appearance of HS portion | | ○ | ○ | ○ | — |
| Hot tack | HT1 | 193 | 191 | 185 | — |
| strength | HT2 | 167 | 165 | 158 | — |
|  | HT1 − HT2 | 26 | 26 | 27 | — |

Examples 2-29 to 2-33

Compounding, granulation, moulding, appearance evaluation and physical property evaluation were carried out in the same manner as Example 2-1 except that PP(B-26) to PP(B-30) obtained in Production Examples B-26 to B-30 were used instead of the propylene-ethylene copolymer (B) in Example 2-1 and the ratio between the propylene polymer (A) and the propylene-ethylene copolymer (B) was 90:10. The results are shown in Table 22.

Although Example 2-33 showed some traces of voids having fine fisheyes as cores resulting from defects in dispersion of the high molecular weight component, the level thereof did not cause problems upon use. Other than this, all evaluation results were satisfactory.

Comparative Examples 2-9 to 2-10

Compounding, granulation, moulding, appearance evaluation and physical property evaluation were carried out in the same manner as Example 2-1 except that PP(B-25) and PP(B-31) obtained in Production Examples B-25 and B-31 were used instead of the propylene-ethylene copolymer (B) in Example 2-1 and the ratio between the propylene polymer (A) and the propylene-ethylene copolymer (B) was 90:10. The results are shown in Table 22.

Comparative Example 2-9 which contained the propylene-ethylene copolymer (B) having low MFR(B) and thereby having deteriorated dispersion with the propylene polymer (A) occasionally showed streaks resulting from deterioration in dispersion and the film was not feasible to evaluation. Comparative Example 2-10 contained the propylene-ethylene copolymer (B) having an increased difference between MFR(B1) and MFR(B2) and thus high molecular weight gels were produced, resulting in a significant amount of traces of voids having fine fisheyes as cores and the film was not feasible to evaluation.

TABLE 22

|  |  | Ex. 2-29 | Ex. 2-30 | Ex. 2-31 | Ex. 2-32 | Ex. 2-33 | Comp. Ex. 2-9 | Comp. Ex. 2-10 |
|---|---|---|---|---|---|---|---|---|
| Polymer (A) | Type | PP (A-1) | PP (A-1) | PP (A-1) | PP (A-1) | PP (A-1) | PP (A-1) | PP (A-1) |
|  | wt % | 90 | 90 | 90 | 90 | 90 | 90 | 90 |
|  | E (A) | 3.2 | 3.2 | 3.2 | 3.2 | 3.2 | 3.2 | 3.2 |
|  | MFR (A) | 7 | 7 | 7 | 7 | 7 | 7 | 7 |
|  | Mw/Mn | 2.6 | 2.6 | 2.6 | 2.6 | 2.6 | 2.6 | 2.6 |
| Copolymer (B) | Type | PP (B-26) | PP (B-27) | PP (B-28) | PP (B-29) | PP (B-30) | PP (B-25) | PP (B-31) |
|  | wt % | 10 | 10 | 10 | 10 | 10 | 10 | 10 |
|  | E (B) | 5.8 | 5.8 | 5.8 | 5.8 | 5.8 | 5.8 | 5.8 |
|  | MFR (B) | 0.7 | 1.5 | 10.1 | 13.9 | 17.0 | 0.3 | 22.0 |
| 1st stage | E (B1) | 3.7 | 3.7 | 3.7 | 3.7 | 3.7 | 3.7 | 3.7 |
|  | MFR (B1) | 1.4 | 3.5 | 38 | 57 | 73 | 0.47 | 101 |
| 2nd stage | E (B2) | 14 | 14 | 14 | 14 | 14 | 14 | 14 |
|  | MFR (B2) | 0.05 | 0.05 | 0.05 | 0.05 | 0.05 | 0.05 | 0.05 |
|  | W (B2) | 20 | 20 | 20 | 20 | 20 | 20 | 20 |
| Surface roughness |  | ○ | ○ | ○ | ○ | ○ | — | — |
| Interface roughness |  | ○ | ○ | ○ | ○ | ○ | — | — |
| Whitening |  | ○ | ○ | ○ | ○ | ○ | — | — |
| FE |  | ○ | ○ | ○ | ○ | Δ | — | x |
| Dispersion |  | ○ | ○ | ○ | ○ | ○ | x | — |
| HS temperature |  | 130 | 130 | 130 | 130 | 130 | — | — |
| Shrinkage at HS temperature |  | 4.0 | 4.0 | 4.0 | 4.0 | 4.0 | — | — |
| Appearance of HS portion |  | ○ | ○ | ○ | ○ | ○ | — | — |
| Hot tack strength | HT1 | 194 | 186 | 187 | 191 | 185 | — | — |
|  | HT2 | 168 | 162 | 166 | 167 | 162 | — | — |
|  | HT1 − HT2 | 26 | 24 | 21 | 24 | 23 | — | — |

Examples 2-34 to 2-36

Compounding, granulation, moulding, appearance evaluation and physical property evaluation were carried out in the same manner as Example 2-1 except that 5, 10 and 20 parts by weight of "Tafmer XM7070" (propylene-butene random copolymer, MFR=7.0 g/10 min, Tm=75° C.) from Mitsui Chemicals, Inc. were respectively added to 100 parts by weight of the propylene-ethylene copolymer resin composition of Example 2-1. The results are shown in Table 23.

Because the propylene-butene random copolymer has an effect for retarding the solidification speed, the hot tack strength was decreased. However, the hot tack strength difference was small, the film appearance was excellent and the HS temperature was sufficiently low which were satisfactory.

TABLE 23

|  |  | Ex. 2-34 | Ex. 2-35 | Ex. 2-36 |
|---|---|---|---|---|
| Polymer (A) | Type | PP (A-1) | PP (A-1) | PP (A-1) |
|  | wt % | 95 | 95 | 95 |
|  | E (A) | 3.2 | 3.2 | 3.2 |
|  | MFR (A) | 7 | 7 | 7 |
|  | Mw/Mn | 2.6 | 2.6 | 2.6 |
| Copolymer (B) | Type | PP (B-1) | PP (B-1) | PP (B-1) |
|  | wt % | 5 | 5 | 5 |
|  | E (B) | 3.7 | 3.7 | 3.7 |
|  | MFR (B) | 6.0 | 6.0 | 6.0 |
| 1st stage | E (B1) | 3.7 | 3.7 | 3.7 |
|  | MFR (B1) | 20 | 20 | 20 |
| 2nd stage | E (B2) | 14 | 14 | 14 |
|  | MFR (B2) | 0.05 | 0.05 | 0.05 |
|  | W (B2) | 20 | 20 | 20 |
| Additive resin | parts | 5 | 10 | 20 |
| Surface roughness |  | ○ | ○ | ○ |
| Interface roughness |  | ○ | ○ | ○ |

TABLE 23-continued

|  |  | Ex. 2-34 | Ex. 2-35 | Ex. 2-36 |
|---|---|---|---|---|
| Whitening |  | ○ | ○ | ○ |
| FE |  | ○ | ○ | ○ |
| Dispersion |  | ○ | ○ | ○ |
| HS temperature |  | 105 | 91 | 83 |
| Shrinkage at HS temperature |  | 0.0 | 0.0 | 0.0 |
| Appearance of HS portion |  | ○ | ○ | ○ |
| Hot tack strength | HT1 | 150 | 95 | 85 |
|  | HT2 | 127 | 70 | 63 |
|  | HT1 − HT2 | 23 | 25 | 22 |

From comparisons between Example 2-1 and thereafter and Comparative Example 2-1 and thereafter, it is apparent that the laminate stretched films containing the propylene-ethylene copolymer resin compositions of the present invention laminated as surface layers have excellent properties such as devoid of appearance defects including surface roughness, interface roughness and uneven cloudiness resulting from oriented crystals, excellent transparency, excellent heat sealability and improved hot tack property.

Examples for Second Invention

Examples and Comparative Examples for the second invention using the propylene-ethylene copolymer (D) are further described hereinbelow.

Evaluation methods and resins used in Examples and Comparative Examples are as follows.

1. Propylene-ethylene copolymer (D)

(1) Measurement Methods of Properties of Propylene-Ethylene Copolymer (D)

(1-1) Ethylene Contents E(D1) and E(D)

The ethylene content E(D1) of the component (D1) extracted from a polymerization vessel after the first step of sequential polymerization and the ethylene content E(D) of the propylene-ethylene copolymer (D) obtained after the second step were measured by $^{13}$C-NMR according to the conditions described above.

(1-2) MFR(D1) and MFR(D)

The MFR(D1) of the component (D1) obtained after the first step and the MFR(D) of the propylene-ethylene copolymer (D) obtained after the second step were measured according to JIS K7210 A, condition M under the following conditions:

Test temperature: 230° C.
Nominal load: 2.16 kg
Shape of die: diameter 2.095 mm, length 8.00 mm.

(1-3) Mw/Mn (D1)

The Mw/Mn (D1) of the component (D1) obtained after the first step is defined as a ratio between the number average molecular weight Mn and the weight average molecular weight Mw determined by gel permeation chromatography (GPC) according to the conditions described above.

(1-4) Dynamic Mechanical Analysis (DMA)

A strip specimen used was excised from a sheet having a thickness of 2 mm obtained by press moulding under the following conditions and had 10 mm width×18 mm length. The instrument used was ARES from Rheometric Scientific, Inc. The frequency is 1 Hz. The temperature was increased stepwise from −60° C. during measurement and the measurement was carried out until the sample was melted so that the measurement could not be carried out. The strain was in the range from 0.1 to 0.5%.

Press Moulding:

A pressed sheet having a thickness of 2 mm was obtained by preheating at 230° C. for 5 minutes, pressing at the same temperature with pressure of 50 kgf/cm² for 3 minutes and then immediate cooling and solidifying on a press adjusted to 30° C. with pressure of 100 kgf/cm².

(1-5) Determination of Weight Ratios W(D1) and W(D2) of Respective Components

As described above, the weight ratios of the component (D1) and the component (D2) are defined by the following equations:

$W(D1)$=production amount in first step/(production amount in first step+production amount in second step)×100

$W(D2)$=production amount in second step/(production amount in first step+production amount in second step)×100.

As described hereinbelow under [Production Example D-1], upon production of the propylene-ethylene copolymer (D), the whole amount of the polymer obtained after completion of the first step of producing the component (D1) was recovered in a flask to measure the yield in the first step. Among the obtained component (D1), 10 g was kept as a sample and the rest was charged in a polymerization vessel to carry out the second step of producing the component (D2). After completion of the second step, the yield of the obtained propylene-ethylene copolymer (D) was measured. From these results, the production amounts in the first step and the second step were calculated according to the following equations, from which result W(D1) and W(D2) were calculated according to the above equations:

Production amount in first step=yield in first step-10 g (sampling amount)

Production amount in second step=yield of propylene-ethylene copolymer (D)—production amount in first step.

(1-6) Ethylene Content E(D2) of Component (D2)

The ethylene content E(D2) of the component (D2) was calculated according to the following equation using the above ethylene contents E(D1) and E(D) and the amounts of the components, W(D1) and W(D2):

$E(D2)=\{E(D)-E(D1)\times(W(D1)/100)\}/(W(D2)/100)$ (1-7) Melt Flow Rate MFR(D2) of Component (D2)

The MFR(D2) of the component (D2) was calculated according to the following equation using the above MFR (D1), MFR(D), W(D1) and W(D2):

$MFR(D2)=\exp\{(\log_e[MFR(D)]-(W(D1)/100)\times\log_e[MFR(D1)])/(W(D2)/100)\}$ (wherein $\log_e$ is a logarithm to base e).

(2) Production of Propylene-Ethylene Copolymer (D)

Production Example D-1

Preparation of Preliminarily Polymerized Catalyst (Chemical Treatment of Silicate Salt)

To a 10-L glass separable flask equipped with a stirring blade were gradually added 3.75 liter of distilled water and then 2.5 kg of concentrated sulphuric acid (96%). At 50° C., 1 kg of montmorillonite ("Benclay SL" from Mizusawa Industrial Chemicals, Ltd., average particle diameter=50 μm) was dispersed and the dispersion was heated to 90° C. which temperature was maintained for 6.5 hours. After cooling to 50° C., the slurry was filtered under reduced pressure to recover a cake. To the cake were added 7 liters of distilled water to again obtain slurry which was then filtered. This washing procedure was repeated until the washing fluid (filtrate) had pH of above 3.5. The recovered cake was dried overnight at 110° C. under a nitrogen atmosphere. The weight of the cake after drying was 707 g.

(Drying of Silicate Salt)

The silicate salt was then dried in a kiln dryer.

The specifications and drying conditions are as follows:

Rotating tube: cylindrical tube, inner diameter: 50 mm, heating band: 550 mm (electric furnace)
Rotating speed of scraping blade: 2 rpm
Angle of inclination: 20/520
Feeding rate of silicate salt: 2.5 g/min
Gas flow rate: nitrogen, 96 liter/hour
Countercurrent drying temperature: 200° C. (powder temperature).

(Preparation of Catalyst)

To a 1-L glass reactor equipped with a stirring blade was introduced 20 g of dried silicate salt obtained as above and then 116 ml of mixed heptane and 84 ml of triethylaluminium solution (0.60 M) in heptane were added and the mixture was stirred at room temperature. After 1 hour, the mixture was washed with mixed heptane and the silicate salt slurry was adjusted to 200 ml. To the prepared silicate salt slurry was then added 0.96 ml of triisobutylaluminium solution (0.71 M/L) in heptane to allow reaction at 25° C. for 1 hour. In parallel, a mixture was prepared by reaction at room temperature for 1 hour of 218 mg (0.3 mM) of [(r)-dichloro[1,1'-dimethylsilylenebis{2-methyl-4-(4-chlorophenyl)-4H-azulenyl}]zirconium] and 87 ml of mixed heptane 3.31 ml of triisobutylaluminium solution (0.71 M) in heptane, which mixture was added to the silicate salt slurry, stirred for 1 hour, and added with mixed heptane to adjust to 500 ml.

(Preliminary Polymerization/Washing)

To a 1.0-liter stirring autoclave which was thoroughly replaced with nitrogen was introduced the prepared silicate salt/metallocene complex slurry. After the temperature was stabilized at 40° C., propylene was fed at a rate of 10 g/hour and the temperature was maintained. After 4 hours, feeding of propylene was halted and the reaction was maintained for further 2 hours.

After completion of preliminary polymerization, residual monomers were purged, stirring was halted and the reaction was left to stand for about 10 minutes to remove 240 ml of supernatant by decantation. A triisobutylaluminium solution (0.95 ml, 0.71 M/L) in heptane and 560 ml of mixed heptane were added and the mixture was stirred at 40° C. for 30 minutes, left to stand for 10 minutes to remove 560 ml of supernatant. This procedure was repeated further 3 times. The component analysis of the final supernatant revealed the concentration of the organoaluminium component of 1.23 mmol/liter, Zr concentration of $8.6 \times 10^{-6}$ g/L and the amount in the supernatant relative to the loaded amount of 0.016%. A triisobutylaluminium solution (17.0 ml, 0.71 M/L) in heptane was added followed by drying under reduced pressure at 45° C. A preliminarily polymerized catalyst D was obtained which contained 2.0 g of polypropylene per 1.0 g of the catalyst.

The preliminarily polymerized catalyst D was used in the following procedure to produce a propylene-ethylene copolymer (D).

First Step

A 3-L autoclave equipped with stirring and temperature control devices was thoroughly replaced with propylene, added with 2.76 ml (2.0 mmol) of triisobutylaluminium solution in n-heptane, 16 g of ethylene, 70 ml of hydrogen and then 750 g of liquefied propylene and heated to 70° C. which temperature was maintained. Slurry of the preliminarily polymerized catalyst D in n-heptane was pressed in as 25 mg of the amount of the catalyst (excluding the weight of the preliminarily polymerized polymer) to initiated polymerization. The temperature in the vessel was maintained at 70° C. and polymerization was continued for 40 minutes. Residual monomers were purged to normal pressure and the vessel was thoroughly replaced with purified nitrogen. The whole amount of the propylene polymer component (D1) obtained in the first step was recovered through a Teflon tube under nitrogen flow into a 2-L glass flask which was preliminarily and thoroughly replaced with nitrogen. It was revealed by weighing that 181 g of the propylene polymer component (D1) was obtained in the first step. Analysis was carried out with 10 g of the component.

Second Step: Production of Propylene-Ethylene Copolymer Component (D2)

After completion of the first step, the autoclave used for the polymerization was opened and confirmed that no polymer was left inside. After cleaning, the autoclave was re-assembled and dried while heating under flow of nitrogen. After drying, the autoclave was cooled to room temperature. Thereafter 171 g of the propylene polymer component (D1) which was the remaining from 181 g obtained in the first step after keeping 10 g for analysis was charged into the autoclave though a Teflon tube under nitrogen flow.

Separately in a 20-L autoclave equipped with stirring and temperature control devices, mixed gas used for the second step was prepared. The temperature during preparation was 85° C. and the composition of mixed gas was 25 vol % of ethylene, 75 vol % of propylene and 700 ppm of hydrogen. The mixed gas was fed to a 3-L autoclave in which pressure was increased to 2.5 MPaG to initiate polymerization in the second step. Polymerization was continued at 80° C. for 54 minutes. Thereafter 10 ml of ethanol was introduced to terminate polymerization. The recovered polymer was thoroughly dried in an oven. It was revealed by weighing that 306 g of the propylene-ethylene copolymer (D) was obtained.

Among this the propylene polymer component (D1) accounted for 171 g, and thus 135 g of the propylene-ethylene copolymer component (D2) was obtained. Based on these yields, the weight ratios of the propylene polymer component (D1) and the propylene-ethylene copolymer component (D2) were calculated and it was found that W(D1) was 56 wt %- and W(D2) was 44 wt %.

The propylene polymer component (D1) kept after the first step for analysis and the propylene-ethylene copolymer (D) obtained after the second step were analyzed to obtain the values for ethylene contents E(D1) and E(D) and MFR (D1) and MFR(D).

The results are shown in Table 24. Based on the values of W(D1), W(D2), E(D1), E(D), MFR(D1) and MFR(D), E(D2) and MFR(D2) were calculated. These values are also indicated in Table 24.

The same polymerization procedure was repeated for 8 times and the products were used as a starting material of Example 3-1.

Production Examples D-2 to D-16

Sequential polymerization was carried out in the same manner as Production Example D-1 except that the polymerization conditions indicated in Tables 24 and 25 were used to produce propylene-ethylene copolymers (D).

The results are shown in Tables 24 and 25.

TABLE 24

| Production Example | | | D-1 | D-2 | D-3 | D-4 | D-5 | D-6 | D-7 | D-8 |
|---|---|---|---|---|---|---|---|---|---|---|
| 1st step polymerization conditions | Catalyst amount | mg | 25 | 45 | 40 | 20 | 16 | 25 | 25 | 25 |
| | Hydrogen amount | NmL | 70 | 60 | 30 | 50 | 100 | 70 | 70 | 70 |
| | Ethylene amount | g | 16 | 0 | 30 | 34 | 42 | 16 | 16 | 16 |
| | Polymerization temperature | ° C. | 70 | 70 | 45 | 45 | 45 | 70 | 70 | 70 |
| | Polymerization time | min | 40 | 120 | 90 | 60 | 45 | 40 | 40 | 40 |
| 2nd step Polymerization conditions | Propylene concentration | vol % | 75 | 75 | 75 | 75 | 75 | 87 | 80 | 70 |
| | Ethylene concentration | vol % | 25 | 25 | 25 | 25 | 25 | 13 | 20 | 30 |
| | Hydrogen concentration | ppm | 700 | 700 | 700 | 700 | 700 | 500 | 600 | 800 |
| | Polymerization temperature | ° C. | 80 | 80 | 80 | 80 | 80 | 80 | 80 | 80 |
| | Polymerization time | min | 54 | 30 | 35 | 71 | 87 | 130 | 65 | 46 |
| Polymerization results | 1st step polymer yield | g | 181 | 180 | 190 | 190 | 186 | 181 | 181 | 181 |

TABLE 24-continued

|  | Production Example |  | D-1 | D-2 | D-3 | D-4 | D-5 | D-6 | D-7 | D-8 |
|---|---|---|---|---|---|---|---|---|---|---|
|  | Sampling amount | g | 10 | 10 | 10 | 10 | 10 | 10 | 10 | 10 |
|  | Final polymer yield | g | 306 | 303 | 321 | 321 | 315 | 306 | 306 | 306 |
|  | 2nd step polymer yield | g | 135 | 133 | 141 | 141 | 139 | 135 | 135 | 135 |
|  | W (D1) | wt % | 56 | 56 | 56 | 56 | 56 | 56 | 56 | 56 |
|  | W (D2) | wt % | 44 | 44 | 44 | 44 | 44 | 44 | 44 | 44 |
| Polymer | E (D1) | wt % | 1.7 | 0 | 3.2 | 4 | 5.1 | 1.7 | 1.7 | 1.7 |
| analysis | E (D2) | wt % | 11 | 11 | 11 | 11 | 11 | 6 | 9 | 13 |
| results | E (D) | wt % | 5.8 | 4.8 | 6.6 | 7.1 | 7.7 | 3.6 | 4.9 | 6.7 |
|  | MFR (D1) | g/10 min | 7 | 7 | 7 | 7 | 7 | 7 | 7 | 7 |
|  | MFR (D2) | g/10 min | 7 | 7 | 7 | 7 | 7 | 7 | 7 | 7 |
|  | MFR (D) | g/10 min | 7 | 7 | 7 | 7 | 7 | 7 | 7 | 7 |
|  | Mw/Mn (D1) | — | 2.4 | 2.4 | 2.4 | 2.4 | 2.4 | 2.4 | 2.4 | 2.4 |
|  | Tg | ° C. | −8.4 | −7.5 | −8.6 | −9 | −10.2 | −1.5 | −5.7 | −10.6 |

TABLE 25

|  | Production Example |  | D-9 | D-10 | D-11 | D-12 | D-13 | D-14 | D-15 | D-16 |
|---|---|---|---|---|---|---|---|---|---|---|
| 1st step polymerization conditions | Catalyst amount | mg | 25 | 19 | 22 | 18 | 25 | 25 | 21 | 12 |
|  | Hydrogen amount | NmL | 70 | 70 | 70 | 70 | 80 | 30 | 110 | 210 |
|  | Ethylene amount | g | 16 | 16 | 16 | 16 | 16 | 16 | 16 | 17 |
|  | Polymerization temperature | ° C. | 70 | 70 | 70 | 70 | 70 | 70 | 70 | 70 |
|  | Polymerization time | min | 40 | 90 | 60 | 40 | 15 | 60 | 30 | 30 |
| 2nd step Polymerization conditions | Propylene concentration | vol % | 62 | 75 | 75 | 75 | 75 | 75 | 75 | 75 |
|  | Ethylene concentration | vol % | 38 | 25 | 25 | 25 | 25 | 25 | 25 | 25 |
|  | Hydrogen concentration | ppm | 900 | 700 | 700 | 700 | 700 | 200 | 600 | 600 |
|  | Polymerization temperature | ° C. | 80 | 80 | 80 | 80 | 80 | 80 | 80 | 80 |
|  | Polymerization time | min | 32 | 25 | 42 | 101 | 101 | 66 | 59 | 108 |
| Polymerization results | 1st step polymer yield | g | 181 | 275 | 228 | 131 | 72 | 184 | 181 | 189 |
|  | Sampling amount | g | 10 | 10 | 10 | 10 | 10 | 10 | 10 | 10 |
|  | Final polymer yield | g | 306 | 312 | 311 | 302 | 314 | 310 | 306 | 319 |
|  | 2nd step polymer yield | g | 135 | 47 | 93 | 181 | 252 | 136 | 135 | 140 |
|  | W (D1) | wt % | 56 | 85 | 70 | 40 | 20 | 56 | 56 | 56 |
|  | W (D2) | wt % | 44 | 15 | 30 | 60 | 80 | 44 | 44 | 44 |
| Polymer | E (D1) | wt % | 1.7 | 1.7 | 1.7 | 1.7 | 1.7 | 1.7 | 1.7 | 1.7 |
| analysis | E (D2) | wt % | 16 | 11 | 11 | 11 | 11 | 11 | 11 | 11 |
| results | E (D) | wt % | 8.0 | 3.1 | 4.5 | 7.3 | 9.1 | 5.8 | 5.8 | 5.8 |
|  | MFR (D1) | g/10 min | 7 | 7 | 7 | 7 | 7 | 2 | 21 | 71 |
|  | MFR (D2) | g/10 min | 7 | 7 | 7 | 7 | 7 | 2 | 10 | 10 |
|  | MFR (D) | g/10 min | 7 | 7 | 7 | 7 | 7 | 2 | 15 | 30 |
|  | Mw/Mn (D1) | — | 2.4 | 2.4 | 2.4 | 2.4 | 2.4 | 2.4 | 2.4 | 2.4 |
|  | Tg | ° C. | −7.9 −28.7 | −1.6 | −5.4 | −11.7 | −13.4 | −8.4 | −8.4 | −8.4 |

2. Propylene-Ethylene Copolymer (B)

Propylene-ethylene copolymers (B-1) to (B-31) indicated in Tables 4 to 8 were used.

Example 3-1

1. Compounding

PP(D-1) obtained in Production Example D-1 as the propylene-ethylene copolymer (D) and B-1 obtained in Production Example B-1 as the propylene-ethylene copolymer (B) were weighed so as to be 95 wt % and 5 wt % respectively. To 100 parts by weight of the mixture of the propylene-ethylene copolymer (D) and the propylene-ethylene copolymer (B) were added the following antioxidant, neutralizing agent, slip agent and anti-blocking agent (AB agent) at the amounts indicated below in a Henschel mixer and thoroughly mixed.

Antioxidant:
Tetrakis{methylene-3-(3',5'-di-t-butyl-4'-hydroxyphenyl) propionate}methane ("IRGANOX 1010") 500 wt ppm
Tris(2,4-di-t-butylphenyl)phosphite ("Irgafos 168") 500 wt ppm Neutralizing Agent:
　Calcium stearate 500 wt ppm
Slip Agent:
　Erucic amide (Nippon Fine Chemical Co., Ltd., trade name "Neutron S") wt 1000 ppm
Anti-Blocking Agent:
　Silicon oxide (Mizusawa Industrial Chemicals, Ltd., trade name "Mizupearl K-300") wt 1500 ppm

2. Granulation

A resin was melted and mixed in a "KZW" twin-screw extruder from Technovel Corporation having a screw diameter of 15 mm under the conditions of extruder temperature=200° C., screw rotation speed=300 rpm and discharge rate=3.0 kg/h and extruded from a strand die. The extruded molten resin was drawn while cooling and solidifying in a cooling water bath and the strand was cut with a strand cutter to obtain propylene-ethylene copolymer resin composition starting material pellets each having a diameter of 3 mm and a length of 2 mm.

3. Film Moulding

The obtained propylene-ethylene copolymer resin composition starting material pellets were extruded on an extruder having a nozzle diameter of 30 mm φ under the conditions of resin temperature of 180° C. and discharge rate of 8 kg/h and introduced into a monolayer T-die heated to 180° C. and adjusted to a die width of 150 mm and a lip opening of 0.8 mm to carry out melt extrusion. A shear velocity at the die wall surface calculated from the formula (1) shown above was 186 sec$^{-1}$.

The melt-extruded film was cooled and solidified on a cooling roll regulated to 30° C. and rotating at 30 m/min to obtain a monolayer unstretched film with a thickness of 40 μm.

4. Film Appearance Evaluation (1) Surface Roughness

The surface layer (sealant layer) and the substrate layer of the sample for film appearance evaluation obtained according to the above method were respectively wet with immersion oil (refractive index: 1.515, 25° C.) and a wave pattern which was not eliminated upon visual inspection was identified as a wave pattern due to interface roughness.

A wave pattern which was eliminated upon the same inspection was identified as a wave pattern due to surface roughness. With regard to interface roughness and surface roughness, the film which was judged to have no wave pattern by 8 or more people among 10 people carrying out the visual observation was rated as ○, the film which was judged to have no wave pattern by 5 or more and 7 or less people was rated as Δ and the film which was judged to have a wave pattern by 6 or more people was rated as x. The films rated as ○ and Δ do not pose practical problems. The films rated as x had inferior transparency.

(2) Oriented Crystal

Oriented crystal refers to a phenomenon where the whole film is clouded and visible crystal masses (white lumps) are observed at the outlet of the die. When oriented crystallization is extremely developed, solid-liquid separation is exhibited at the outlet of the die. When the draft ratio (ratio between the cooling roll take-up speed and the resin discharge speed) is increased to 1.5 or more on this occasion, the liquid phase is cracked and thus the film is perforated or torn.

The obtained unstretched film was visually observed by 10 people. The film which was judged to have no white lumps or cloudiness by 8 or more people was rated as ○, the film which was judged to have no white lumps or cloudiness by 5 or more and 7 or less people was rated as A, and the film which occasionally had white lumps or cloudiness or was perforated or torn was rated as x.

(3) Fisheye (FE)

The sample for film appearance evaluation obtained according to the above method was visually observed and the presence or absence of fisheye was evaluated. The film with almost no fisheye and having excellent appearance was rated as ○, the film having a few fisheyes was rated as Δ and the film with many fisheyes and thus having significantly impaired appearance was rated as x.

(4) Dispersion

The unstretched sheet obtained by moulding of the unstretched sheet as described above was visually observed by 10 people. The sheet which was judged to have no streak by 8 or more people was rated as ○, the sheet which was judged to have no streak by 5 or more and 7 or less people was rated as Δ and the sheet which was judged to have streaks overall by 6 or more people was rated as x. The films rated as ○ and Δ do not pose practical problems.

5. Film Physical Property Evaluation (1) HAZE(Transparency) Measurement

A single film was measured according to JIS K7136-2000 on a haze meter. The lower the measured value is, the higher the transparency is.

(2) Tensile Elastic Modulus (Young's Modulus)

The tensile elastic modulus (Young's modulus) in the flow direction of the film (MD) was determined according to JIS K7127-1989 under the following conditions:
　Sample shape: strip
　Sample length: 150 mm
　Sample width: 15 mm
　Distance between chucks: 100 mm
　Crosshead velocity: 1 mm/min.

(3) Blocking

Two pieces excised from the film obtained according to the above method respectively with the size of 2 cm (width)×15 cm (length) were stacked parallel to the length direction so as to obtain the overlap area of 10 cm$^2$, left under a load of 15 kg/cm$^2$ in a Geer type oven (Tabai Espec Co., Tabai Geer Oven: GPH-100) at 40° C. for 24 hours. The specimen was then strained from both edges on a tensile tester (Shimadzu Corporation, AGS-5KNG) with a tension rate of 500 mm/min to determine a force required for shear peeling (peeling by tension along the longitudinal direction relative to the overlapped portion in the specimen). The lower this value is, the better blocking resistance is.

The evaluation results of the obtained film are shown in Table 26.

The obtained film was prepared from the propylene resin composition starting material fulfilling all the properties defined in the present invention, and thus had significantly excellent film appearance and transparency, flexibility and blocking property.

Examples 3-2 to 3-5

Compounding, granulation, moulding, appearance evaluation and physical property evaluation were carried out in the same manner as Example 3-1 except that the ratios of the propylene-ethylene copolymer (D) and the propylene-ethylene copolymer (B) were varied as indicated in Table 26. The results are shown in Table 26.

In Example 3-5, some defects in dispersion were observed although the level thereof did not cause practical issues. Other than this, all evaluation results were satisfactory.

Comparative Examples 3-1 to 3-3

Compounding, granulation, moulding, appearance evaluation and physical property evaluation were carried out in the same manner as Example 3-1 except that the ratios of the propylene-ethylene copolymer (D) and the propylene-ethylene copolymer (B) were varied as indicated in Table 26. The results are shown in Table 26.

Comparative Examples 3-1 and 3-2 which contained an insufficient amount of propylene-ethylene copolymer (B) had significant surface roughness and the films were not feasible to evaluation. Comparative Example 3-3 which contained an excessive amount of propylene-ethylene copolymer (B) occasionally showed streaks resulting from deterioration in dispersion and the film was not feasible to evaluation.

TABLE 26

|  |  |  | Ex. 3-1 | Ex. 3-2 | Ex. 3-3 | Ex. 3-4 | Ex. 3-5 | Comp. Ex. 3-1 | Comp. Ex. 3-2 | Comp. Ex. 3-3 |
|---|---|---|---|---|---|---|---|---|---|---|
| Copolymer (D) | Type |  | D-1 | D-1 | D-1 | D-1 | D-1 | D-1 | D-1 | D-1 |
|  | wt % |  | 95 | 90 | 80 | 70 | 65 | 100 | 98 | 60 |
|  | E (D) | wt % | 5.8 | 5.8 | 5.8 | 5.8 | 5.8 | 5.8 | 5.8 | 5.8 |
|  | MFR (D) | g/10 min | 7 | 7 | 7 | 7 | 7 | 7 | 7 | 7 |
|  | Tg | ° C. | −8.4 | −8.4 | −8.4 | −8.4 | −8.4 | −8.4 | −8.4 | −8.4 |
|  | 1st stage | E (D1) wt % | 1.7 | 1.7 | 1.7 | 1.7 | 1.7 | 1.7 | 1.7 | 1.7 |
|  |  | W (D1) wt % | 56 | 56 | 56 | 56 | 56 | 56 | 56 | 56 |
|  |  | Mw/Mn (D1) — | 2.4 | 2.4 | 2.4 | 2.4 | 2.4 | 2.4 | 2.4 | 2.4 |
|  | 2nd stage | E (D2) wt % | 11 | 11 | 11 | 11 | 11 | 11 | 11 | 11 |
|  |  | W (D2) wt % | 44 | 44 | 44 | 44 | 44 | 44 | 44 | 44 |
| Copolymer (B) | Type |  | B-1 | B-1 | B-1 | B-1 | B-1 | B-1 | B-1 | B-1 |
|  | wt % |  | 5 | 10 | 20 | 30 | 35 | 0 | 2 | 40 |
|  | E (B) | wt % | 5.8 | 5.8 | 5.8 | 5.8 | 5.8 | 5.8 | 5.8 | 5.8 |
|  | MFR (B) | g/10 min | 6 | 6 | 6 | 6 | 6 | 6 | 6 | 6 |
|  | 1st stage | E (B1) wt % | 3.7 | 3.7 | 3.7 | 3.7 | 3.7 | 3.7 | 3.7 | 3.7 |
|  |  | MFR (B1) g/10 min | 20 | 20 | 20 | 20 | 20 | 20 | 20 | 20 |
|  | 2nd stage | E (B2) wt % | 14 | 14 | 14 | 14 | 14 | 14 | 14 | 14 |
|  |  | MFR (B2) g/10 min | 0.05 | 0.05 | 0.05 | 0.05 | 0.05 | 0.05 | 0.05 | 0.05 |
|  |  | W (B2) wt % | 20 | 20 | 20 | 20 | 20 | 20 | 20 | 20 |
| Surface roughness |  |  | ○ | ○ | ○ | ○ | ○ | x | x | — |
| Oriented crystal |  |  | ○ | ○ | ○ | ○ | ○ | — | — | — |
| FE |  |  | ○ | ○ | ○ | ○ | ○ | — | — | — |
| Dispersion |  |  | ○ | ○ | ○ | ○ | Δ | — | — | x |
| HAZE |  | % | 0.7 | 0.7 | 0.7 | 0.8 | 0.8 | — | — | — |
| Young's modulus |  | MPa | 211 | 226 | 250 | 285 | 300 | — | — | — |
| Blocking |  | gf/10 cm² | 720 | 735 | 724 | 690 | 678 | — | — | — |

Examples 3-6 to 3-9

Compounding, granulation, moulding, appearance evaluation and physical property evaluation were carried out in the same manner as Example 3-1 except that D-2 to D-5 obtained in Production Examples D-2 to D-5 were used instead of the propylene-ethylene copolymer (D) in Example 3-1 and the ratio between the propylene-ethylene copolymer (D) and the propylene-ethylene copolymer (B) was 90:10. The results are shown in Table 27.

All evaluation results were satisfactory.

TABLE 27

|  |  |  | Ex. 3-6 | Ex. 3-7 | Ex. 3-8 | Ex. 3-9 |
|---|---|---|---|---|---|---|
| Copolymer (D) | Type |  | D-2 | D-3 | D-4 | D-5 |
|  | wt % |  | 90 | 90 | 90 | 90 |
|  | E (D) | wt % | 4.8 | 6.6 | 7.1 | 7.7 |
|  | MFR (D) | g/10 min | 7 | 7 | 7 | 7 |
|  | Tg | ° C. | −7.5 | −8.6 | −9 | −10.2 |
|  | 1st stage | E (D1) wt % | 0 | 3.2 | 4 | 5.1 |
|  |  | W (D1) wt % | 56 | 56 | 56 | 56 |
|  |  | Mw/Mn (D1) — | 2.4 | 2.4 | 2.4 | 2.4 |
|  | 2nd stage | E (D2) wt % | 11 | 11 | 11 | 11 |
|  |  | W (D2) wt % | 44 | 44 | 44 | 44 |
| Copolymer (B) | Type |  | B-1 | B-1 | B-1 | B-1 |
|  | wt % |  | 10 | 10 | 10 | 10 |
|  | E (B) | wt % | 5.8 | 5.8 | 5.8 | 5.8 |
|  | MFR (B) | g/10 min | 6 | 6 | 6 | 6 |
|  | 1st stage | E (B1) wt % | 3.7 | 3.7 | 3.7 | 3.7 |
|  |  | MFR (B1) g/10 min | 20 | 20 | 20 | 20 |

TABLE 27-continued

|  |  |  |  | Ex. 3-6 | Ex. 3-7 | Ex. 3-8 | Ex. 3-9 |
|---|---|---|---|---|---|---|---|
| 2nd stage | E (B2) | | wt % | 14 | 14 | 14 | 14 |
| | MFR (B2) | | g/10 min | 0.05 | 0.05 | 0.05 | 0.05 |
| | W (B2) | | wt % | 20 | 20 | 20 | 20 |
| Surface roughness | | | | ○ | ○ | ○ | ○ |
| Oriented crystal | | | | ○ | ○ | ○ | ○ |
| FE | | | | ○ | ○ | ○ | ○ |
| Dispersion | | | | ○ | ○ | ○ | ○ |
| HAZE | | | % | 0.9 | 0.7 | 0.5 | 0.5 |
| Young's modulus | | | MPa | 312 | 171 | 150 | 120 |
| Blocking | | | gf/10 cm² | 760 | 748 | 762 | 780 |

Examples 3-10 to 3-11

Compounding, granulation, moulding, appearance evaluation and physical property evaluation were carried out in the same manner as Example 3-1 except that D-7 to D-8 obtained in Production Examples D-7 to D-8 were used instead of the propylene-ethylene copolymer (D) in Example 3-1 and the ratio between the propylene-ethylene copolymer (D) and the propylene-ethylene copolymer (B) was 90:10. The results are shown in Table 28.

All evaluation results were satisfactory.

Comparative Examples 3-4 to 3-5

Compounding, granulation, moulding, appearance evaluation and physical property evaluation were carried out in the same manner as Example 3-1 except that D-6 and D-9 obtained in Production Examples D-6 and D-9 were used instead of the propylene-ethylene copolymer (D) in Example 3-1 and the ratio between the propylene-ethylene copolymer (D) and the propylene-ethylene copolymer (B) was 90:10. The results are shown in Table 28. Comparative Example 3-4 which contained the propylene-ethylene copolymer (D) having E(D2) of as low as 6 wt % showed the Young's modulus of the film of above 350 MPa, resulting in impaired flexibility. Comparative Example 3-5 which contained the propylene-ethylene copolymer (D) having E(D2) of as high as 16 wt % and having a bimodal Tg caused phase separation of the propylene-ethylene copolymer (D) and thus had cloudiness, resulting in HAZE of the film of 2.9 which caused impaired transparency.

TABLE 28

|  |  |  |  | Ex. 3-10 | Ex. 3-11 | Comp. Ex. 3-4 | Comp. Ex. 3-5 |
|---|---|---|---|---|---|---|---|
| Copolymer (D) | Type | | | D-7 | D-8 | D-6 | D-9 |
| | wt % | | | 90 | 90 | 90 | 90 |
| | E (D) | | wt % | 4.9 | 6.7 | 3.6 | 8.0 |
| | MFR (D) | | g/10 min | 7 | 7 | 7 | 7 |
| | Tg | | ° C. | −5.7 | −7.5 | −1.5 | −13.9 |
| | | | | | | | −28.7 |
| | 1st stage | E (D1) | wt % | 1.7 | 1.7 | 1.7 | 1.7 |
| | | W (D1) | wt % | 56 | 56 | 56 | 56 |
| | | Mw/Mn (D1) | — | | 2.4 | 2.4 | 2.4 |
| | 2nd stage | E (D2) | wt % | 9 | 13 | 6 | 16 |
| | | W (D2) | wt % | 44 | 44 | 44 | 44 |
| Copolymer (B) | Type | | | B-1 | B-1 | B-1 | B-1 |
| | wt % | | | 10 | 10 | 10 | 10 |
| | E (B) | | wt % | 5.8 | 5.8 | 5.8 | 5.8 |
| | MFR (B) | | g/10 min | 6 | 6 | 6 | 6 |
| | 1st stage | E (B1) | wt % | 3.7 | 3.7 | 3.7 | 3.7 |
| | | MFR (B1) | g/10 min | 20 | 20 | 20 | 20 |
| | 2nd stage | E (B2) | wt % | 14 | 14 | 14 | 14 |
| | | MFR (B2) | g/10 min | 0.05 | 0.05 | 0.05 | 0.05 |
| | | W (B2) | wt % | 20 | 20 | 20 | 20 |
| Surface roughness | | | | ○ | ○ | ○ | ○ |
| Oriented crystal | | | | ○ | ○ | ○ | ○ |
| FE | | | | ○ | ○ | ○ | ○ |
| Dispersion | | | | ○ | ○ | ○ | ○ |
| HAZE | | | % | 0.7 | 0.6 | 0.9 | 2.9 |
| Young's modulus | | | MPa | 253 | 148 | 400 | 145 |
| Blocking | | | gf/10 cm² | 756 | 752 | 720 | 774 |

Examples 3-12 to 3-13 and 3-39

Compounding, granulation, moulding, appearance evaluation and physical property evaluation were carried out in the same manner as Example 3-1 except that D-10 to D-12 obtained in Production Examples D-10 to D-12 were used instead of the propylene-ethylene copolymer (D) in Example 3-1 and the ratio between the propylene-ethylene copolymer (D) and the propylene-ethylene copolymer (B) was 90:10. The results are shown in Table 29.

Although Examples 3-12 and 3-39 which contained the propylene-ethylene copolymer (D) having low W(D2) showed slight deterioration in flexibility, the level of flexibility did not cause practical problems. Example 3-13 which contained the propylene-ethylene copolymer (D) having an increased W(D2) showed slight deterioration in blocking property. However, the peeling property of the film taken up on a paper tube was sufficient and at a level which did not cause problems upon use.

Comparative Example 3-6

Compounding, granulation, moulding, appearance evaluation and physical property evaluation were carried out in the same manner as Example 3-1 except that D-13 obtained in Production Example D-13 was used instead of the propylene-ethylene copolymer (D) in Example 3-1 and the ratio between the propylene-ethylene copolymer (D) and the propylene-ethylene copolymer (B) was 90:10. The results are shown in Table 29.

Comparative Example 3-6 which contained the propylene-ethylene copolymer (D) having W(D2) above the range defined in the present invention showed drastic deterioration in blocking of the film. Moreover, films were fused and the overlapped portion in the specimen for evaluation of blocking was not detached and was torn from the chuck portions of the tensile tester, which was not practical.

TABLE 29

|  |  |  | Ex. 3-12 | Ex. 3-13 | Ex. 3-39 | Comp. Ex. 3-6 |
|---|---|---|---|---|---|---|
| Copolymer (D) | Type |  | D-11 | D-12 | D-10 | D-13 |
|  | wt % |  | 90 | 90 | 90 | 90 |
|  | E (D) | wt % | 4.5 | 7.3 | 3.1 | 9.1 |
|  | MFR (D) | g/10 min | 7 | 7 | 7 | 7 |
|  | Tg | ° C. | −5.4 | −11.7 | −1.6 | −13.4 |
|  | 1st stage | E (D1) wt % | 1.7 | 1.7 | 1.7 | 1.7 |
|  |  | W (D1) wt % | 70 | 40 | 85 | 20 |
|  |  | Mw/Mn (D1) | — | 2.4 | 2.4 | 2.4 |
|  | 2nd stage | E (D2) wt % | 11 | 11 | 11 | 11 |
|  |  | W (D2) wt % | 30 | 60 | 15 | 80 |
| Copolymer (B) | Type |  | B-1 | B-1 | B-1 | B-1 |
|  | wt % |  | 10 | 10 | 10 | 10 |
|  | E (B) | wt % | 5.8 | 5.8 | 5.8 | 5.8 |
|  | MFR (B) | g/10 min | 6 | 6 | 6 | 6 |
|  | 1st stage | E (B1) wt % | 3.7 | 3.7 | 3.7 | 3.7 |
|  |  | MFR (B1) g/10 min | 20 | 20 | 20 | 20 |
|  | 2nd stage | E (B2) wt % | 14 | 14 | 14 | 14 |
|  |  | MFR (B2) g/10 min | 0.05 | 0.05 | 0.05 | 0.05 |
|  |  | W (B2) wt % | 20 | 20 | 20 | 20 |
| Surface roughness |  |  | ○ | ○ | ○ | ○ |
| Oriented crystal |  |  | ○ | ○ | ○ | ○ |
| FE |  |  | ○ | ○ | ○ | ○ |
| Dispersion |  |  | ○ | ○ | ○ | ○ |
| HAZE |  | % | 1.0 | 0.4 | 1.2 | 0.4 |
| Young's modulus |  | MPa | 309 | 131 | 340 | 37 |
| Blocking |  | gf/10 cm² | 628 | 1073 | 568 | 2530 |

Examples 3-14 to 3-16

Compounding, granulation, moulding, appearance evaluation and physical property evaluation were carried out in the same manner as Example 3-1 except that D-14 to D-16 obtained in Production Examples D-14 to D-16 were used instead of the propylene-ethylene copolymer (D) in Example 3-1 and the ratio between the propylene-ethylene copolymer (D) and the propylene-ethylene copolymer (B) was 90:10. The results are shown in Table 30.

All evaluation results were satisfactory.

TABLE 30

|  |  |  | Ex. 3-14 | Ex. 3-15 | Ex. 3-16 |
|---|---|---|---|---|---|
| Copolymer (D) | Type |  | D-14 | D-15 | D-16 |
|  | wt % |  | 90 | 90 | 90 |
|  | E (D) | wt % | 5.8 | 5.8 | 5.8 |
|  | MFR (D) | g/10 min | 2 | 15 | 30 |
|  | Tg | ° C. | −8.4 | −8.4 | −8.4 |
|  | 1st stage | E (D1) wt % | 1.7 | 1.7 | 1.7 |
|  |  | W (D1) wt % | 56 | 56 | 56 |
|  |  | Mw/Mn (D1) | — | 2.4 | 2.4 | 2.4 |
|  | 2nd stage | E (D2) wt % | 11 | 11 | 11 |
|  |  | W (D2) wt % | 44 | 44 | 44 |

TABLE 30-continued

|  |  |  | Ex. 3-14 | Ex. 3-15 | Ex. 3-16 |
|---|---|---|---|---|---|
| Copolymer (B) | Type |  | B-1 | B-1 | B-1 |
|  | wt % |  | 10 | 10 | 10 |
|  | E (B) | wt % | 5.8 | 5.8 | 5.8 |
|  | MFR (B) | g/10 min | 6 | 6 | 6 |
|  | 1st stage | E (B1) wt % | 3.7 | 3.7 | 3.7 |
|  |  | MFR (B1) g/10 min | 20 | 20 | 20 |
|  | 2nd stage | E (B2) wt % | 14 | 14 | 14 |
|  |  | MFR (B2) g/10 min | 0.05 | 0.05 | 0.05 |
|  |  | W (B2) wt % | 20 | 20 | 20 |
| Surface roughness |  |  | ○ | ○ | ○ |
| Oriented crystal |  |  | ○ | ○ | ○ |
| FE |  |  | ○ | ○ | ○ |
| Dispersion |  |  | ○ | ○ | ○ |
| HAZE |  | % | 0.7 | 0.7 | 0.7 |
| Young's modulus |  | MPa | 230 | 228 | 224 |
| Blocking |  | gf/10 cm$^2$ | 740 | 758 | 735 |

Examples 3-17 to 3-21

Compounding, granulation, moulding, appearance evaluation and physical property evaluation were carried out in the same manner as Example 3-1 except that B-2 to B-6 obtained in Production Examples B-2 to B-6 were used instead of the propylene-ethylene copolymer (B) in Example 3-1 and the ratio between the propylene-ethylene copolymer (D) and the propylene-ethylene copolymer (B) was 90:10. The results are shown in Table 31.

All evaluation results were satisfactory.

TABLE 31

|  |  |  | Ex. 3-17 | Ex. 3-18 | Ex. 3-19 | Ex. 3-20 | Ex. 3-21 |
|---|---|---|---|---|---|---|---|
| Copolymer (D) | Type |  | D-1 | D-1 | D-1 | D-1 | D-1 |
|  | wt % |  | 90 | 90 | 90 | 90 | 90 |
|  | E (D) | wt % | 5.8 | 5.8 | 5.8 | 5.8 | 5.8 |
|  | MFR (D) | g/10 min | 7 | 7 | 7 | 7 | 7 |
|  | Tg | ° C. | −8.4 | −8.4 | −8.4 | −8.4 | −8.4 |
|  | 1st stage | E (D1) wt % | 1.7 | 1.7 | 1.7 | 1.7 | 1.7 |
|  |  | W (D1) wt % | 56 | 56 | 56 | 56 | 56 |
|  |  | Mw/Mn (D1) | — | 2.4 | 2.4 | 2.4 | 2.4 |
|  | 2nd stage | E (D2) wt % | 11 | 11 | 11 | 11 | 11 |
|  |  | W (D2) wt % | 44 | 44 | 44 | 44 | 44 |
| Copolymer (B) | Type |  | B-2 | B-3 | B-4 | B-5 | B-6 |
|  | wt % |  | 10 | 10 | 10 | 10 | 10 |
|  | E (B) | wt % | 2.8 | 3.2 | 4.0 | 4.8 | 6.8 |
|  | MFR (B) | g/10 min | 6 | 6 | 6 | 6 | 6 |
|  | 1st stage | E (B1) wt % | 0 | 0.5 | 1.5 | 2.5 | 5 |
|  |  | MFR (B1) g/10 min | 20 | 20 | 20 | 20 | 20 |
|  | 2nd stage | E (B2) wt % | 14 | 14 | 14 | 14 | 14 |
|  |  | MFR (B2) g/10 min | 0.05 | 0.05 | 0.05 | 0.05 | 0.05 |
|  |  | W (B2) wt % | 20 | 20 | 20 | 20 | 20 |
| Surface roughness |  |  | ○ | ○ | ○ | ○ | ○ |
| Oriented crystal |  |  | ○ | ○ | ○ | ○ | ○ |
| FE |  |  | ○ | ○ | ○ | ○ | ○ |
| Dispersion |  |  | ○ | ○ | ○ | ○ | ○ |
| HAZE |  | % | 0.7 | 0.7 | 0.7 | 0.7 | 0.7 |
| Young's modulus |  | MPa | 233 | 231 | 224 | 230 | 226 |
| Blocking |  | gf/10 cm$^2$ | 750 | 728 | 736 | 742 | 761 |

Examples 3-22 to 3-25

Compounding, granulation, moulding, appearance evaluation and physical property evaluation were carried out in the same manner as Example 3-1 except that B-9 to B-12 obtained in Production Examples B-9 to B-12 were used instead of the propylene-ethylene copolymer (B) in Example 3-1 and the ratio between the propylene-ethylene copolymer (D) and the propylene-ethylene copolymer (B) was 90:10. The results are shown in Table 32.

Although Example 3-22 showed a few white lumps resulting from oriented crystals, the level thereof did not cause problems upon use. Although Example 3-25 showed some surface roughness, the level thereof did not cause problems upon use. Other than these, all evaluation results were satisfactory.

Comparative Examples 3-7 to 3-8

Compounding, granulation, moulding, appearance evaluation and physical property evaluation were carried out in the same manner as Example 3-1 except that B-8 and B-13 obtained in Production Examples B-8 and B-13 were used instead of the propylene-ethylene copolymer (B) in Example 3-1 and the ratio between the propylene-ethylene copolymer (D) and the propylene-ethylene copolymer (B) was 90:10.

Comparative Example 3-7 showed an extreme amount of oriented crystals and the film was torn at the outlet of the die, resulting in failure of obtainment of the film. Comparative Example 3-8 showed significant surface roughness and the film was not feasible to evaluation. The results are shown in Table 32.

Although Example 3-26 showed a few white lumps resulting from oriented crystals, the level thereof did not cause problems upon use. Although Example 3-31 showed some surface roughness, the level thereof did not cause problems upon use. Other than these, all evaluation results were satisfactory.

TABLE 32

| | | | Ex. 3-22 | Ex. 3-23 | Ex. 3-24 | Ex. 3-25 | Comp. Ex. 3-7 | Comp. Ex. 3-8 |
|---|---|---|---|---|---|---|---|---|
| Copolymer (D) | Type | | D-1 | D-1 | D-1 | D-1 | D-1 | D-1 |
| | wt % | | 90 | 90 | 90 | 90 | 90 | 90 |
| | E (D) | wt % | 5.8 | 5.8 | 5.8 | 5.8 | 5.8 | 5.8 |
| | MFR (D) | g/10 min | 7 | 7 | 7 | 7 | 7 | 7 |
| | Tg | ° C. | −8.4 | −8.4 | −8.4 | −8.4 | −8.4 | −8.4 |
| | 1st stage | E (D1) wt % | 1.7 | 1.7 | 1.7 | 1.7 | 1.7 | 1.7 |
| | | W (D1) wt % | 56 | 56 | 56 | 56 | 56 | 56 |
| | | Mw/Mn (D1) — | 2.4 | 2.4 | 2.4 | 2.4 | 2.4 | 2.4 |
| | 2nd stage | E (D2) wt % | 11 | 11 | 11 | 11 | 11 | 11 |
| | | W (D2) wt % | 44 | 44 | 44 | 44 | 44 | 44 |
| Copolymer (B) | Type | | B-9 | B-10 | B-11 | B-12 | B-8 | B-13 |
| | wt % | | 10 | 10 | 10 | 10 | 10 | 10 |
| | E (B) | wt % | 4.8 | 5.2 | 6.8 | 7.6 | 4.4 | 8.2 |
| | MFR (B) | g/10 min | 6 | 6 | 6 | 6 | 6 | 6 |
| | 1st stage | E (B1) wt % | 3.7 | 3.7 | 3.7 | 3.7 | 3.7 | 3.7 |
| | | MFR (B1) g/10 min | 20 | 20 | 20 | 20 | 20 | 20 |
| | 2nd stage | E (B2) wt % | 9 | 11 | 19 | 23 | 7 | 26 |
| | | MFR (B2) g/10 min | 0.05 | 0.05 | 0.05 | 0.05 | 0.05 | 0.05 |
| | | W (B2) wt % | 20 | 20 | 20 | 20 | 20 | 20 |
| Surface roughness | | | ○ | ○ | ○ | Δ | — | x |
| Oriented crystal | | | Δ | ○ | ○ | ○ | x | — |
| FE | | | ○ | ○ | ○ | ○ | — | — |
| Dispersion | | | ○ | ○ | ○ | ○ | — | — |
| HAZE | | % | 1.0 | 0.7 | 0.7 | 0.9 | — | — |
| Young's modulus | | MPa | 228 | 228 | 216 | 220 | — | — |
| Blocking | | gf/10 cm² | 770 | 775 | 772 | 783 | — | — |

Examples 3-26 to 3-31

Compounding, granulation, moulding, appearance evaluation and physical property evaluation were carried out in the same manner as Example 3-1 except that B-14 to B-19 obtained in Production Examples B-14 to B-19 were used instead of the propylene-ethylene copolymer (B) in Example 3-1 and the ratio between the propylene-ethylene copolymer (D) and the propylene-ethylene copolymer (B) was 90:10. The results are shown in Table 33.

Comparative Example 3-9

Compounding, granulation, moulding, appearance evaluation and physical property evaluation were carried out in the same manner as Example 3-1 except that B-20 obtained in Production Example B-20 was used instead of the propylene-ethylene copolymer (B) in Example 3-1 and the ratio between the propylene-ethylene copolymer (D) and the propylene-ethylene copolymer (B) was 90:10.

Significant surface roughness was produced and the film was not feasible to evaluation.

The results are shown in Table 33.

TABLE 33

| | | | Ex. 3-26 | Ex. 3-27 | Ex. 3-28 | Ex. 3-29 | Ex. 3-30 | Ex. 3-31 | Comp. Ex. 3-9 |
|---|---|---|---|---|---|---|---|---|---|
| Copolymer (D) | Type | | D-1 | D-1 | D-1 | D-1 | D-1 | D-1 | D-1 |
| | wt % | | 90 | 90 | 90 | 90 | 90 | 90 | 90 |
| | E (D) | wt % | 5.8 | 5.8 | 5.8 | 5.8 | 5.8 | 5.8 | 5.8 |
| | MFR (D) | g/10 min | 7 | 7 | 7 | 7 | 7 | 7 | 7 |
| | Tg | ° C. | −8.4 | −8.4 | −8.4 | −8.4 | −8.4 | −8.4 | −8.4 |
| | 1st stage | E (D1) wt % | 1.7 | 1.7 | 1.7 | 1.7 | 1.7 | 1.7 | 1.7 |
| | | W (D1) wt % | 56 | 56 | 56 | 56 | 56 | 56 | 56 |
| | | Mw/Mn (D1) — | 2.4 | 2.4 | 2.4 | 2.4 | 2.4 | 2.4 | 2.4 |
| | 2nd stage | E (D2) wt % | 11 | 11 | 11 | 11 | 11 | 11 | 11 |
| | | W (D2) wt % | 44 | 44 | 44 | 44 | 44 | 44 | 44 |
| Copolymer (B) | Type | | B-14 | B-15 | B-16 | B-17 | B-18 | B-19 | B-20 |
| | wt % | | 10 | 10 | 10 | 10 | 10 | 10 | 10 |
| | E (B) | wt % | 5.8 | 5.8 | 5.8 | 5.8 | 5.8 | 5.8 | 5.8 |
| | MFR (B) | g/10 min | 2.1 | 2.9 | 4.1 | 4.7 | 7.2 | 8.7 | 11.0 |
| | 1st stage | E (B1) wt % | 3.7 | 3.7 | 3.7 | 3.7 | 3.7 | 3.7 | 3.7 |
| | | MFR (B1) g/10 min | 20 | 20 | 20 | 20 | 20 | 20 | 20 |

TABLE 33-continued

|  |  |  | Ex. 3-26 | Ex. 3-27 | Ex. 3-28 | Ex. 3-29 | Ex. 3-30 | Ex. 3-31 | Comp. Ex. 3-9 |
|---|---|---|---|---|---|---|---|---|---|
| 2nd stage | E (B2) | wt % | 14 | 14 | 14 | 14 | 14 | 14 | 14 |
|  | MFR (B2) | g/10 min | 0.00027 | 0.0012 | 0.007 | 0.014 | 0.12 | 0.31 | 1.0 |
|  | W (B2) | wt % | 20 | 20 | 20 | 20 | 20 | 20 | 20 |
| Surface roughness |  |  | ○ | ○ | ○ | ○ | ○ | Δ | x |
| Oriented crystal |  |  | Δ | ○ | ○ | ○ | ○ | ○ | — |
| FE |  |  | ○ | ○ | ○ | ○ | ○ | ○ | — |
| Dispersion |  |  | ○ | ○ | ○ | ○ | ○ | ○ | — |
| HAZE |  | % | 0.9 | 0.7 | 0.7 | 0.7 | 0.7 | 0.8 | — |
| Young's modulus |  | MPa | 230 | 227 | 232 | 218 | 224 | 219 | — |
| Blocking |  | gf/10 cm² | 720 | 687 | 715 | 762 | 752 | 748 | — |

Examples 3-32 to 3-33

Compounding, granulation, moulding, appearance evaluation and physical property evaluation were carried out in the same manner as Example 3-1 except that B-22 to B-23 obtained in Production Examples B-22 to B-23 were used instead of the propylene-ethylene copolymer (B) in Example 3-1 and the ratio between the propylene-ethylene copolymer (D) and the propylene-ethylene copolymer (B) was 90:10. The results are shown in Table 34.

All evaluation results were satisfactory.

Comparative Examples 3-10 to 3-11

Compounding, granulation, moulding, appearance evaluation and physical property evaluation were carried out in the same manner as Example 3-1 except that B-21 and B-24 obtained in Production Examples B-21 and B-24 were used instead of the propylene-ethylene copolymer (B) in Example 3-1 and the ratio between the propylene-ethylene copolymer (D) and the propylene-ethylene copolymer (B) was 90:10. The results are shown in Table 34.

Comparative Example 3-10 showed significant surface roughness and the film was not feasible to evaluation. Comparative Example 3-11 which contained the propylene-ethylene copolymer (B) having an excessive amount of component (B2) occasionally showed streaks resulting from deterioration in dispersion and the film was not feasible to evaluation.

TABLE 34

|  |  |  | Ex. 3-32 | Ex. 3-33 | Comp. Ex. 3-10 | Comp. Ex. 3-11 |
|---|---|---|---|---|---|---|
| Copolymer (D) | Type |  | D-1 | D-1 | D-1 | D-1 |
|  | wt % |  | 90 | 90 | 90 | 90 |
|  | E (D) | wt % | 5.8 | 5.8 | 5.8 | 5.8 |
|  | MFR (D) | g/10 min | 7 | 7 | 7 | 7 |
|  | Tg | ° C. | -8.4 | -8.4 | -8.4 | -8.4 |
| 1st stage | E (D1) | wt % | 1.7 | 1.7 | 1.7 | 1.7 |
|  | W (D1) | wt % | 56 | 56 | 56 | 56 |
|  | Mw/Mn (D1) |  | — | 2.4 | 2.4 | 2.4 |
| 2nd stage | E (D2) | wt % | 11 | 11 | 11 | 11 |
|  | W (D2) | wt % | 44 | 44 | 44 | 44 |
| Copolymer (B) | Type |  | B-22 | B-23 | B-21 | B-24 |
|  | wt % |  | 10 | 10 | 10 | 10 |
|  | E (B) | wt % | 4.7 | 6.8 | 3.7 | 7.8 |
|  | MFR (B) | g/10 min | 11 | 3.3 | 20 | 1.8 |
| 1st stage | E (B1) | wt % | 3.7 | 3.7 | 3.7 | 3.7 |
|  | MFR (B1) | g/10 min | 20 | 20 | 20 | 20 |
| 2nd stage | E (B2) | wt % | 14 | 14 | 14 | 14 |
|  | MFR (B2) | g/10 min | 0.05 | 0.05 | 0.05 | 0.05 |
|  | W (B2) | wt % | 10 | 30 | 0 | 40 |
| Surface roughness |  |  | ○ | ○ | x | — |
| Oriented crystal |  |  | ○ | ○ | — | — |
| FE |  |  | ○ | ○ | — | — |
| Dispersion |  |  | ○ | ○ | — | x |
| HAZE |  | % | 0.7 | 0.7 | — | — |
| Young's modulus |  | MPa | 247 | 231 | — | — |
| Blocking |  | gf/10 cm² | 697 | 716 | — | — |

Examples 3-34 to 3-38

Compounding, granulation, moulding, appearance evaluation and physical property evaluation were carried out in the same manner as Example 3-1 except that B-26 to B-30 obtained in Production Examples B-26 to B-30 were used instead of the propylene-ethylene copolymer (B) in Example 3-1 and the ratio between the propylene-ethylene copolymer (D) and the propylene-ethylene copolymer (B) was 90:10. The results are shown in Table 35.

Although Example 3-38 showed a few fine fisheyes resulting from defects in dispersion of the high molecular weight component, the level thereof did not cause problem upon use. Other than this, all evaluation results were satisfactory.

Comparative Examples 3-12 to 3-13

Compounding, granulation, moulding, appearance evaluation and physical property evaluation were carried out in the same manner as Example 3-1 except that B-25 and B-31 obtained in Production Examples B-25 and B-31 were used instead of the propylene-ethylene copolymer (B) in Example 3-1 and the ratio between the propylene-ethylene copolymer (D) and the propylene-ethylene copolymer (B) was 90:10. The results are shown in Table 35.

Comparative Example 3-12 which contained the propylene-ethylene copolymer (B) having low MFR(B) and thereby having deteriorated dispersion with the propylene-ethylene copolymer (D) occasionally showed streaks resulting from deterioration in dispersion and the film was not feasible to evaluation. Comparative Example 3-13 contained the propylene-ethylene copolymer (B) having an increased difference between MFR(B1) and MFR(B2) and thus high molecular weight gels were produced, resulting in a significant amount of fisheyes and failure of obtainment of the film that was feasible to evaluation.

TABLE 35

| | | | Ex. 3-34 | Ex. 3-35 | Ex. 3-36 | Ex. 3-37 | Ex. 3-38 | Comp. Ex. 3-12 | Comp. Ex. 3-13 |
|---|---|---|---|---|---|---|---|---|---|
| Copolymer (D) | Type | | D-1 | D-1 | D-1 | D-1 | D-1 | D-1 | D-1 |
| | wt % | | 90 | 90 | 90 | 90 | 90 | 90 | 90 |
| | E (D) | wt % | 5.8 | 5.8 | 5.8 | 5.8 | 5.8 | 5.8 | 5.8 |
| | MFR (D) | g/10 min | 7 | 7 | 7 | 7 | 7 | 7 | 7 |
| | Tg | ° C. | −8.4 | −8.4 | −8.4 | −8.4 | −8.4 | −8.4 | −8.4 |
| | 1st stage E (D1) | wt % | 1.7 | 1.7 | 1.7 | 1.7 | 1.7 | 1.7 | 1.7 |
| | W (D1) | wt % | 56 | 56 | 56 | 56 | 56 | 56 | 56 |
| | Mw/Mn (D1) | — | 2.4 | 2.4 | 2.4 | 2.4 | 2.4 | 2.4 | 2.4 |
| | 2nd stage E (D2) | wt % | 11 | 11 | 11 | 11 | 11 | 11 | 11 |
| | W (D2) | wt % | 44 | 44 | 44 | 44 | 44 | 44 | 44 |
| Copolymer (B) | Type | | B-26 | B-27 | B-28 | B-29 | B-30 | B-25 | B-31 |
| | wt % | | 10 | 10 | 10 | 10 | 10 | 10 | 10 |
| | E (B) | wt % | 5.8 | 5.8 | 5.8 | 5.8 | 5.8 | 5.8 | 5.8 |
| | MFR (B) | g/10 min | 0.7 | 1.5 | 10.1 | 13.9 | 17.0 | 0.3 | 22.0 |
| | 1st stage E (B1) | wt % | 3.7 | 3.7 | 3.7 | 3.7 | 3.7 | 3.7 | 3.7 |
| | MFR (B1) | g/10 min | 1.4 | 3.5 | 38 | 57 | 73 | 0.47 | 101 |
| | 2nd stage E (B2) | wt % | 14 | 14 | 14 | 14 | 14 | 14 | 14 |
| | MFR (B2) | g/10 min | 0.05 | 0.05 | 0.05 | 0.05 | 0.05 | 0.05 | 0.05 |
| | W (B2) | wt % | 20 | 20 | 20 | 20 | 20 | 20 | 20 |
| Surface roughness | | | ○ | ○ | ○ | ○ | ○ | — | — |
| Oriented crystal | | | ○ | ○ | ○ | ○ | ○ | — | — |
| FE | | | ○ | ○ | ○ | ○ | Δ | — | x |
| Dispersion | | | ○ | ○ | ○ | ○ | ○ | x | — |
| HAZE | | % | 0.7 | 0.7 | 0.8 | 0.7 | 1 | — | — |
| Young's modulus | | MPa | 235 | 226 | 229 | 233 | 224 | — | — |
| Blocking | | gf/10 cm$^2$ | 725 | 729 | 726 | 735 | 731 | — | — |

From comparisons between Example 3-1 and thereafter and Comparative Example 3-1 and thereafter, it is found that the propylene-ethylene copolymer resin compositions containing the propylene-ethylene copolymers (D) can provide films which, even with extrusion moulding at a temperature as low as about 180° C., do not cause appearance defects such as surface roughness and white lumps resulting from oriented crystals and exhibit excellent properties such as excellent transparency, flexibility and excellent blocking performance.

INDUSTRIAL APPLICABILITY

The propylene-ethylene copolymer resin composition of the present invention is useful as a material for moulding various films and sheets. The obtained films and sheets are suitable as packaging materials of various food products and also can be widely used as packaging materials for paper cartons, tubes, bags, cups, standing packages, trays and the like.

The propylene laminate stretched film of the present invention is useful as a film for various packaging and can be widely used as a film for overwrap packaging of food products, tobaccos, DVDs and BD disks.

The invention claimed is:

1. A propylene-ethylene copolymer resin composition comprising, based on 100 parts by weight of the sum of the following (D) and (B): 97 to 65 parts by weight of a propylene-ethylene copolymer (D) produced with a metallocene catalyst and having the following properties (D-i) to (D-ii); and 3 to 35 parts by weight of a propylene-ethylene copolymer (B) having the following properties (B-i) to (B-ii), wherein the propylene-ethylene copolymer (D) comprises: 30 to 99% by weight of a propylene polymer component (D1) having the following properties (D1-i) to (D1-ii); and 1 to 70% by weight of a propylene-ethylene copolymer component (D2) having the following property (D2-i), and the propylene-ethylene copolymer (B) comprises, based on 100% by weight of the sum of (B1) and (B2): 65 to 95% by weight of a propylene polymer component (B1) having the following property (B1-i); and 5 to 35% by weight of a propylene-ethylene copolymer component (B2) having the following properties (B2-i) and (B2-ii), (D-i) the copolymer (D) has a melt flow rate MFR(D) of from 0.1 to 100 g/10 min;

(D-ii) the copolymer (D) shows a single peak at 0° C. or less in a temperature-loss tangent (tan δ) curve in Dynamic Mechanical Analysis that represents glass transition observed in the range from −60 to 20° C.;

(D1-i) the polymer component (D1) has an ethylene content E(D1) of from 0 to 6.0 wt %;

(D1-ii) the polymer component (D1) has a ratio Mw/Mn(D1) between a weight average molecular weight Mw and a number average molecular weight Mn as measured by GPC of from 2 to 4;
(D2-i) the copolymer component (D2) has an ethylene content E(D2) of from 8 to 15 wt %;
(B-i) the copolymer (B) has an ethylene content E(B) of from 0.4 to 13 wt %;
(B-ii) the copolymer (B) has a melt flow rate MFR(B) of from 0.5 to 20 g/10 min;
(B1-i) the polymer component (B1) has an ethylene content E(B1) of from 0 to 6.0 wt %;
(B2-i) the copolymer component (B2) has an ethylene content E(B2) of from 8 to 25 wt %; and
(B2-ii) the copolymer component (B2) has a melt flow rate MFR(B2) of from 0.0001 to 0.5 g/10 min.

2. The composition according to claim 1, wherein the propylene-ethylene copolymer (B) is produced with a Ziegler-Natta catalyst.

3. The composition according to claim 1, wherein the propylene-ethylene copolymer (D) is produced by a process comprising performing a multi-stage polymerization which comprises producing the propylene polymer component (D1) and producing the propylene-ethylene copolymer component (D2).

4. The composition according to claim 1, wherein the propylene-ethylene polymer (B) is produced by a process comprising performing multi-stage polymerization which comprises producing the propylene polymer component (B1) and producing the propylene-ethylene copolymer component (B2).

5. A moulded article formed of the composition according to claim 1.

6. A film or sheet obtained by extrusion moulding of the composition according to claim 1.

7. A laminate film or laminate sheet, comprising the film or sheet according to claim 6 laminated as a surface layer.

8. A propylene laminate stretched film comprising the composition according to claim 1 laminated as a surface layer and biaxially stretched.

9. A propylene laminate stretched film comprising the composition according to claim 1, wherein the composition comprises polymer component (D1) having an ethylene content E(D1) of 0.5 to 6.0 wt %, laminated as a surface layer and being biaxially stretched, wherein
the propylene laminate stretched film has a heat seal temperature (300 g/15 mm) of 80° C. or higher and 150° C. or lower.

* * * * *